(12) United States Patent
Wada et al.

(10) Patent No.: US 7,838,172 B2
(45) Date of Patent: Nov. 23, 2010

(54) COMPOSITE POROUS BODY, GAS DIFFUSION LAYER MEMBER, CELL MEMBER, AND MANUFACTURING METHOD THEREOF

(75) Inventors: Masahiro Wada, Kitamoto (JP); Eiko Kanda, Kitamoto (JP); Takeshi Isobe, Kitamoto (JP); Komei Kato, Saitama (JP); Takumi Shibuya, Kitamoto (JP); Sakae Akiyama, Kuki (JP); Kazuichi Hamada, Okegawa (JP)

(73) Assignee: Mitsubishi Materials Corporation, Tokyo (JP)

( * ) Notice: Subject to any disclaimer, the term of this patent is extended or adjusted under 35 U.S.C. 154(b) by 943 days.

(21) Appl. No.: 10/556,565

(22) PCT Filed: May 7, 2004

(86) PCT No.: PCT/JP2004/006036
§ 371 (c)(1), (2), (4) Date: Oct. 12, 2006

(87) PCT Pub. No.: WO2004/100295
PCT Pub. Date: Nov. 18, 2004

(65) Prior Publication Data
US 2007/0065712 A1 Mar. 22, 2007

(30) Foreign Application Priority Data

| | | | |
|---|---|---|---|
| May 12, 2003 | (JP) | | 2003-133239 |
| May 26, 2003 | (JP) | | 2003-147633 |
| Jun. 18, 2003 | (JP) | | 2003-173265 |
| Jun. 18, 2003 | (JP) | | 2003-173266 |
| Jun. 20, 2003 | (JP) | | 2003-176363 |
| Jun. 30, 2003 | (JP) | | 2003-188135 |
| Jul. 11, 2003 | (JP) | | 2003-195937 |
| Jul. 11, 2003 | (JP) | | 2003-195938 |
| Dec. 24, 2003 | (JP) | | 2003-428307 |
| Dec. 24, 2003 | (JP) | | 2003-428308 |
| Mar. 31, 2004 | (JP) | | 2004-107788 |
| Apr. 16, 2004 | (JP) | | 2004-121670 |

(51) Int. Cl.
*H01M 8/00* (2006.01)
*H01M 8/10* (2006.01)

(52) U.S. Cl. .................... 429/535; 429/480

(58) Field of Classification Search .................. 429/36, 429/38, 40, 42, 44, 535; 502/101; 428/306.6, 428/311.11
See application file for complete search history.

(56) References Cited

U.S. PATENT DOCUMENTS

| | | | |
|---|---|---|---|
| 2002/0090542 A1 | 7/2002 | Mosdale et al. | |
| 2003/0012999 A1 | 1/2003 | Yoshioka et al. | |
| 2003/0027032 A1* | 2/2003 | Sugita et al. | 429/35 |
| 2003/0099873 A1 | 5/2003 | Brambilla et al. | |
| 2006/0014908 A1 | 1/2006 | Rotermund et al. | |

FOREIGN PATENT DOCUMENTS

| | | |
|---|---|---|
| EP | 0909465 B1 | 4/2003 |
| JP | 48-13956 | 2/1973 |
| JP | 58-005976 | 1/1983 |
| JP | 58-5976 | 1/1983 |
| JP | 01-163971 | 6/1989 |
| JP | 4-3826 | 1/1992 |
| JP | 04-003826 | 1/1992 |
| JP | 04-233163 A | 8/1992 |
| JP | 05-041221 | 2/1993 |
| JP | H06-005289 A | 1/1994 |
| JP | 07-029580 | 1/1995 |
| JP | 7-198145 | 8/1995 |
| JP | 07-198145 | 8/1995 |
| JP | 7-220724 | 8/1995 |
| JP | 7-220742 | 8/1995 |
| JP | 8-53723 | 2/1996 |
| JP | 8-78028 | 3/1996 |
| JP | 09-170153 A | 6/1997 |
| JP | 9-213352 A | 8/1997 |
| JP | 10-074527 | 3/1998 |
| JP | 10-74527 | 3/1998 |
| JP | 10-199551 | 7/1998 |

| JP | 11-309746 | 11/1999 |
| JP | 2000-061226 | 2/2000 |
| JP | 2000-61226 | 2/2000 |
| JP | 2001-093532 | 4/2001 |
| JP | 2002-035518 A | 2/2002 |
| JP | 2002-56855 | 2/2002 |
| JP | 2002-056855 | 2/2002 |
| JP | 2002-280025 | 9/2002 |
| JP | 2003-7328 | 1/2003 |
| JP | 2003-007328 | 1/2003 |
| JP | 2003-31237 | 1/2003 |
| JP | 2003-031237 A | 1/2003 |
| JP | 2003-115312 A | 4/2003 |
| JP | 2003-515912 A | 5/2003 |
| JP | 2003-220311 A | 8/2003 |
| JP | 2006-512265 A | 4/2006 |
| WO | WO-97/50139 | 12/1997 |
| WO | WO 97/50139 A1 | 12/1997 |
| WO | WO-03/005470 | 1/2003 |

OTHER PUBLICATIONS

International Search Report dated Aug. 24, 2004 issued for corresponding International Application No. PCT/JP2004/006036 (Submitted Dec. 6, 2006).

Japanese Office Action mailed Jul. 8, 2008 for the corresponding Japanese Application No. 2003-188135.

Japanese Office Action mailed Feb. 9, 2010 for the corresponding Japanese Application No. 2004-121670.

Japanese Office Action mailed Oct. 20, 2009 for the corresponding Japanese Application No. 2003-173265.

Japanese Office Action mailed Dec. 1, 2009 for the corresponding Japanese Application No. 2004-107788.

Japanese Office Action mailed Mar. 3, 2009 for the corresponding Japanese Application No. 2003-173266.

* cited by examiner

*Primary Examiner*—Patrick Ryan
*Assistant Examiner*—Thomas H. Parsons
(74) *Attorney, Agent, or Firm*—Leason Ellis LLP

(57) ABSTRACT

A composite porous body, a gas diffusion layer member of a polymer electrolyte fuel cell, a cell member for the polymer electrolyte fuel cell, and manufacturing methods thereof are provided. The composite porous body is a metallic composite porous body in which a sheet-like metal portion composed of a composite porous body having a three-dimensional mesh structure and a resin portion extending in an in-plane direction of the metal portion are integrally formed with each other. The gas diffusion layer member of a polymer electrolyte fuel cell is composed of a composite porous body in which a sheet-like metal portion composed of a composite porous body having a three-dimensional mesh structure and a resin portion extending in an in-plane direction of the metal portion are integrally formed with each other. Also, the gas diffusion layer member of a polymer electrolyte fuel cell has a separator plate, and the conductive porous body placed on at least one surface of the separator plate. A resin frame is integrally provided so as to cover the peripheries of separator plate and the conductive porous body.

28 Claims, 36 Drawing Sheets

| | | Example 1 | Example 2 |
|---|---|---|---|
| Filler | Kind | Glass fiber | Talc |
| | Outer diameter | 1μm | 10μm |
| | Aspect ratio | 10 | 1 |
| Molding condition | Molding temperature | 300°C | |
| | Mold temperature | 150°C | |
| | Injection pressure | 100MPa | |
| Effect 1 | | 300μm | 500μm |
| Effect 2 | | ◎ | ○ |

COMPOSITE POROUS BODY, GAS DIFFUSION LAYER MEMBER, CELL MEMBER, AND MANUFACTURING METHOD THEREOF

CROSS-REFERENCE TO PRIOR APPLICATION

This is a U.S. national phase application under 35 U.S.C. §371 of International Patent Application No. PCT/JP2004/006036 filed May 7, 2004, and claims the benefit of Japanese Patent Application Nos. 2003-133239 filed May 12, 2003; 2003-147633 filed May 26, 2003; 2003-173266 filed Jun. 18, 2003; 2003-173265 filed Jun. 18, 2003; 2003-176363 filed Jun. 20, 2003; 2003-188135 filed Jun. 30, 2003; 2003-195938 filed Jul. 11, 2003; 2003-195937 filed Jul. 11, 2003; 2003-428308 filed Dec. 24, 2003; 2003-428307 filed Dec. 24, 2003; 2004-107788 filed Mar. 31, 2004 and 2004-121670 filed Apr. 16, 2004, all of which are incorporated by reference herein. The International Application was published in Japanese on Nov. 18, 2004 as WO 2004/100295 A1 under PCT Article 21(2).

BACKGROUND OF THE INVENTION

1. Field of the Invention

The present invention relates to a composite porous body, a gas diffusion layer member of a polymer electrolyte fuel cell, a cell member for the polymer electrolyte fuel cell, and manufacturing methods thereof.

2. Description of the Related Art

Sheet-like conductive porous bodies having a three-dimensional mesh structure are applied to various kinds of use, such as filters, heat-radiating members, water-absorbing members, and gas diffusion layer members for polymer electrolyte fuel cells and are provided in various apparatuses. However, since these types of conductive porous bodies generally have properties of low-strength and easy deformation, difficulties in handling of the conductive porous bodies such as a difficulty in incorporating the conductive porous bodies into apparatuses have conventionally been indicated. As means for solving this problem, there has been known, for example, a configuration in which a dissimilar material is filled into an end area of a conductive porous body to reinforce the conductive porous body as disclosed in Patent Document 1 (see JP-A No. 48-13956), or a configuration in which a solid such as metal or plastic is filled into fine pores of the conductive porous body to provide holes for fixation to an apparatus to the conductive porous body, thereby providing the conductive porous body with a portion with increased strength, as disclosed in Patent Document 2 (see JP-A No. 08-53723).

Also, the polymer electrolyte fuel cells using the gas diffusion layer members have been paid attention to as domestic stationary power sources, power sources of an electric vehicle, or power sources for small-sized portable equipment. The polymer electrolyte unit cells include a so-called stacked type fuel cell (for example, see Patent Document 3: JP-A No. 08-78028) in which a plurality of unit cells are stacked on each other, as one of structures for sequentially connecting the unit cells.

In recent years, portable, small-sized polymer electrolyte fuel cells have been developed with use of a polymer electrolyte. Generally, since a pair of electrodes (unit cells) in a polymer electrolyte fuel cell causes a small electromotive force, the fuel cell has a structure of a plurality of unit cells being connected in series. Meanwhile, if the stacked type fuel cell is adopted, a separator plate should be disposed between stacked unit cells, and a methanol aqueous solution as fuel or air is required to be fed through stacked narrow fluid channels, which needs an auxiliary mechanism such as a pump. For this reason, this is disadvantageous in volume, weight, cost and the like. Thus, so-called flat fuel cells have now been developed for saving space by arranging unit cells in a plane without using such a separator plate to connect the unit cells to each other.

As the flat fuel cells, for example, the following configuration (for example, see Patent Document 4: JP-A No. 2002-56855) is suggested. That is, according to disclosure in Patent Document 4, unit cells are configured that such an electrolyte layer is interposed between a fuel electrode and an air electrode, connecting plates are disposed on the surfaces of the fuel and air electrodes of each of the unit cells opposite to the electrolyte layer, and the fuel electrodes and the air electrodes of adjacent unit cells are connected sequentially by the connecting plates.

Further, the electrodes (unit cells) of the polymer electrolyte unit cells are manufactured by, for example, basic composite elements having an electrolyte layer, a pair of (two) flat plate-shaped electrodes adjacent to both sides of the electrolyte layer, a sealing portion provided around the electrolyte layer and the electrodes to air-tightly hold the electrolyte layer and the electrodes (for example, see Patent Document 5: JP-A No. 2002-280025).

However, in the configuration described in Patent Documents 1 and 2, a dissimilar material is filled into pores of the conductive porous body, and the pores of the conductive porous body having a three-dimensional mesh structure are then crushed, whereby the crushed portion is used as a reinforcing portion to increase the strength of the conductive porous body. Therefore, the effective use area of the conductive porous body is inevitably reduced. Accordingly, new problems have occurred in that desired functions in the above use of the conductive porous body may deteriorate, or the size of the conductive porous body may be made large for supplementing such a reduced number of pores of the conductive porous body. Also, a dissimilar material, for instance, resin, is filled into the conductive porous body, and this portion is used as a reinforcing portion to increase the strength of the conductive porous body. Thus, if holes for fixation to an apparatus are bored in the reinforcing portion, there is a problem that it is difficult to realize high-precision working, for example, a problem that a cut end of the conductive porous body is exposed to inner peripheral edges of the holes.

In the configuration described in Patent Document 3, the separator plate disposed between the stacked unit cells is provided with grooves for supplying fuel (hydrogen) or air (oxygen) to the gas diffusion layer. In this case, a problem also occurs in that the volume and weight of the separator plate required to have a certain degree of thickness for the grooves hinder that a fuel cell is made small-sized and lightweight.

Moreover, since the conductive porous body, such as a carbon sheet, constituting the gas diffusion layer, has properties of low strength and easy deformation, there is a problem in that its handling is difficult, which may result in a difficulty in manufacturing fuel cells.

In the configuration described in Patent Document 4, a number of processes should be carried out, including, first, forming a plurality of unit cells in which gas seal part, a fuel electrode and an air electrode are integrated into one, then arranging the unit cells at predetermined intervals on a plane, then sequentially disposing Z-shaped connecting plates to be connected to one bottom face and the other top face of each of adjacent unit cells, and filling a sealing agent into a gap between the connecting plates, and the number of members to be assembled is large. Therefore, the manufacture of the flat fuel cell is not easy.

When the fuel cell is intended to be made smaller, it is difficult to surely fill a sealing agent into a minute gap between unit cells having a multi-layered structure. Thus, there is a fear that problems such as poor insulation between the unit cells and leakage of fluid fuel due to insufficient filling of the sealing agent may be caused. Moreover, in the configuration described in Patent Document 4, since the conductive porous body, such as a carbon sheet, constituting the gas diffusion layer, has properties of low strength and easy deformation, there is a problem in that its handling is difficult, which may result in a difficulty in manufacturing fuel cells.

In the configuration described in Patent Document 5, in sequentially connecting a plurality of unit cells, there is a stacked type fuel cell in which the unit cells are stacked on each other, and a separator plate is disposed between adjacent unit cells.

However, when the stacked type fuel cell is constituted with the basic composite elements in which the electrolyte layer and the electrodes are integrated into one, since a gas diffusion layer should be disposed in each electrode for supplying fuel or air (oxygen) to the electrodes and further a separator plate should be disposed between the stacked unit cells, the volume or weight occupied by the separator plate in a whole fuel cell may increase.

Further, since a methanol aqueous solution as fuel or air is required to be fed through the stacked narrow fluid channels and thus an auxiliary mechanism such as a pump is required, this is disadvantageous in volume, weight, cost and the like. Moreover, since a number of the basic composite elements, the gas diffusion layer and the separator plate should be assembled while the sealing performance between these members is ensured, fuel cells of a configuration which can be more easily manufactured with high-productivity are needed.

SUMMARY OF THE INVENTION

The invention has been achieved in consideration of the foregoing problems. It is therefore an object of the invention to provide a composite porous body and a manufacturing method thereof that handleability of a conductive porous body is ensured while its effective use area is improved, to realize a fuel cell which can be simply configured, can be made small-sized, can be easily manufactured, and can supply power efficiently, and to provide a cell member which is excellent in productivity and enables a fuel cell to be made small-sized and lightweight.

In order to solve the problems of the invention, a composite porous body according to a first aspect of the invention includes: a sheet-like conductive porous body having a three-dimensional mesh structure, and a resin portion extending in an in-plane direction of the conductive porous body. The conductive porous body and the resin portion are integrally formed.

Further, in the composite porous body according to a second aspect of the invention, inorganic filler is contained in the resin portion.

According to the first and second aspects of the invention, since the resin portion is provided at an outer peripheral edge of the conductive porous body, the conductive porous body can be reinforced, and its handleability can be improved. Also, since the resin portion extends in the in-plane direction so as to protrude from the outer peripheral edge of the conductive porous body, a portion where holes for fixation to an apparatus are bored can be limited to the resin portion of the composite porous body, the holes for fixation to an apparatus can be bored easily with high precision, and a reduction in the effective use area of the conductive porous body can be suppressed to a minimum. In particular, if the resin portion is caused to contain the inorganic filler, the strength of the resin portion can be increased. As a result, the composite porous body can be increased, and its handleability can be further improved.

In addition, the place where the resin portion is provided is limited to neither the entire periphery of the conductive porous body nor the outer peripheral edge thereof, but it can be partially provided if necessary. Also, a plurality of conductive porous bodies may be connected to the resin portion.

In the composite porous body according to a third aspect of the invention, the inorganic filler is fibrous, and the inorganic filler is contained in a ratio of about 5 wt % to 60 wt % of the resin portion in the resin portion.

According to the third aspect of the invention, an increase in the strength of the resin portion itself can be realized excellently and surely.

A gas diffusion layer member of a polymer electrolyte fuel cell according to a fourth aspect of the invention includes the composite porous body according to any one of the first to third aspects of the invention.

A fifth aspect of the invention is the gas diffusion layer member of a polymer electrolyte fuel cell according to the fourth aspect of the invention in which the resin portion is a resin frame which surrounds the periphery of the conductive porous body.

According to the fourth and fifth aspects of the invention, the gas diffusion layer member of a polymer electrolyte fuel cell can be configured using the conductive porous body.

A sixth aspect of the invention is the gas diffusion layer member of a polymer electrolyte fuel cell according to the fifth aspect of the invention in which a terminal tab is provided so as to protrude from the conductive porous body and the terminal tab is exposed to an outer face of the resin frame.

A seventh aspect of the invention is the gas diffusion layer member of a polymer electrolyte fuel cell according to the sixth aspect of the invention in which a plurality of the conductive porous bodies are arranged, and the resin frame is provided around the conductive porous bodies.

According to the sixth and seventh aspect of the invention, since a terminal tab is caused to protrude from the conductive porous body serving as both a gas diffusion layer and a collector and the terminal tab is surrounded by the resin frame, its manufacture is easy. Also, a unit cell whose end faces is sealed by the resin frame against leakage of gas can be easily realized using the gas diffusion layer member simply by forming a catalyst layer on one surface of the conductive porous body, disposing an electrolytic membrane between two gas diffusion layer members whose surfaces with the catalyst layer are caused to face each other, and joining them together by hot pressing or the like.

Further, if a plurality of the conductive porous bodies and the terminal tabs are arranged on a plane, and the resin frame provided therearound holds the conductive porous bodies simultaneously, it is possible to easily realize a so-called flat cell that a plurality of unit cells are arranged two-dimensionally while they are insulated from each other, simply by performing formation of the catalyst layer and a joining process such as hot pressing.

In addition, the terminal tab may be exposed at any portion, such as the surfaces (top and bottom faces) and side face of the resin frame. For example, only an end of a terminal tab may be exposed while the remaining whole terminal tab is buried in the resin frame, or a terminal tab may be exposed at only any one of the top and bottom faces without being exposed at the side face.

An eighth aspect of the invention is the gas diffusion layer member of a polymer electrolyte fuel cell according to the fifth aspect of the invention in which the resin frame is provided with a first fluid supply channel and a first fluid discharge channel which are connected to a gas diffusion electrode using one surface of the conductive porous body as an electrode surface, and a second fluid supply channel and a second fluid discharge channel which are not connected to the gas diffusion electrode.

A ninth aspect of the invention is the gas diffusion layer member of a polymer electrolyte fuel cell according to the eighth aspect of the invention in which the first fluid supply channel, the first fluid discharge channel, the second fluid supply channel, and the second fluid discharge channel are provided as four through holes penetrating the resin frame.

A tenth aspect of the invention is the gas diffusion layer member of a polymer electrolyte fuel cell according to the ninth aspect of the invention in which any two of the through holes are provided are located at a symmetrical distance from the center line and are aligned with respect to the other two through holes.

An eleventh aspect of the invention is a polymer electrolyte fuel cell including at least one unit cell formed by disposing the gas diffusion layer member according to any one of the eighth to tenth aspects of the invention on each of front and back surfaces of an electrolyte layer made of a polymer electrolyte. The unit cell is provided with a fuel supply channel which communicates the first fluid supply channel provided in one of the gas diffusion layer members with the second fluid supply channel provided in the other gas diffusion layer member; an oxygen supply channel which communicates the second fluid supply channel provided in the one gas diffusion layer member with the first fluid supply channel provided in the other gas diffusion layer member; a fuel discharge channel which communicates the first fluid discharge channel provided in the one gas diffusion layer member with the second fluid discharge channel provided in the other gas diffusion layer member; and an oxygen discharge channel which communicates the second fluid discharge channel provided in the one gas diffusion layer member with the first fluid discharge channel provided in the other gas diffusion layer member.

According to the eighth to eleventh aspects of the invention, since the periphery of the porous gas diffusion electrode having low strength is reinforced by the resin frame, it is possible to realize a fuel cell with easy handleability during its manufacture and high productivity. Also, since the resin frame can be bonded to the electrolyte layer, the sealing performance can be improved, leakage of fuel in a fuel cell can be effectively prevented, and fuel can be supplied efficiently.

Further, since the conductive porous body has a three-dimensional mesh structure, fluid such as fuel or air is uniformly diffused and supplied to an interface between electrolyte and catalyst, which cause an electrode reaction.

Moreover, when a fuel cell is composed by stacking a plurality of the gas diffusion layer members of the invention, it is possible to easily form fluid supply channels or fluid discharge channels extending in the thickness direction of the gas diffusion layer members by causing the through holes to communicate with each other, and it is possible to realize a fuel cell which can supply fuel more efficiently.

Further, if the gas diffusion layer members of the invention in which the through holes are provided at positions symmetrical with respect to a line are used, it is possible to use one of the gas diffusion layer members as a fuel electrode and the other gas diffusion layer member as an oxygen electrode to form two systems of a fluid supply channel and a fluid discharge channel leading to any one of the fuel electrode and the air electrode simply by stacking the gas diffusing layer members while their both front and back sides are made different from each other.

A twelfth aspect of the invention is the gas diffusion layer member of a polymer electrolyte fuel cell according to the fourth aspect of the invention. The gas diffusion layer member further includes: an oxygen diffusion electrode using one surface of the conductive porous body as an oxygen supply surface and the other surface thereof as an electrode surface; a resin portion made of a non-conductive material and provided in at least two of side portions of the oxygen diffusion electrode; and a lattice-shaped frame portion provided on the oxygen diffusion surface, connected to the resin portion and having openings which open the oxygen supply surface to the outside.

According to the twelfth aspect of the invention, since the oxygen diffusion electrode serves as both the gas diffusion electrode and the collector, the configuration is simple, and the fuel cell can be made small-sized. Also, since the oxygen diffusion electrode is reinforced by the resin portion and the lattice-shaped frame portion, the handleability is excellent, and the productivity of fuel cells can be improved. Moreover, since the trouble of air-tightly assembling a number of members can be saved by integrally forming the resin portion and the lattice-shaped frame portion with the oxygen diffusion electrode while they are connected to each other, the productivity of fuel cells can be more improved.

A thirteenth aspect of the invention is the gas diffusion layer member of a polymer electrolyte fuel cell according to the twelfth aspect in which a plurality of the split oxygen diffusion electrodes are provided, and a connecting frame made of a non-conductive material is provided to connect the oxygen diffusion electrodes to each other.

According to the thirteenth aspect of the invention, by providing one gas diffusion layer member with a plurality of oxygen diffusion electrodes, it is possible to easily manufacture a flat fuel cell of a structure in which a plurality of electrodes are arranged in the in-plane direction and connected in series.

A fourteenth aspect of the invention is the gas diffusion layer member of a polymer electrolyte fuel cell according to the twelfth or thirteenth aspect of the invention in which the lattice-shaped frame portion is made of a non-conductive material.

According to the fourteenth aspect of the invention, since the lattice-shaped frame portion is made of a non-conductive material, even if the oxygen diffusion electrode is split into a plurality of oxygen diffusion electrodes, the oxygen supply surface can be protected without causing short-circuiting between the oxygen diffusion electrodes.

A fifteenth aspect of the invention is the gas diffusion layer member of a polymer electrolyte fuel cell according to the twelfth or thirteenth aspect in which the lattice-shaped frame portion is made of a conductive material, and a plurality of the split lattice-shaped frame portions are provided corresponding to the plurality of oxygen diffusion electrodes.

According to the fifteenth aspect of the invention, since split lattice-shaped frame portions are provided in the oxygen diffusion electrodes, respectively, for example, a high-strength member such as a conductive metallic mesh can be used as the lattice-shaped frame portions to protect the oxygen supply surface without causing short-circuiting between the oxygen diffusion electrodes.

A sixteenth aspect of the invention is the gas diffusion layer member of a polymer electrolyte fuel cell according to the fourth or fifth aspect in which a collector having a two-dimensional structure extending in the in-plane direction is disposed on the surface of the conductive porous body.

According to the sixteenth aspect of the invention, since the resin portion is integrally formed at the outer peripheral edge of the conductive porous body, the number of assembling processes when the polymer electrolyte fuel cell is assembled using the gas diffusion layer member can be reduced, and the assembling precision can be improved.

Further, since the resin portion is disposed over at least the entire outer peripheral edge of the conductive porous body, only the resin portion can also be processed to easily give shape such as holes for fixation to an apparatus. Moreover, since the collector has a two-dimensional mesh structure extending in the in-plane direction, a current generated in a polymer electrolyte fuel cell can be conducted well in the in-plane direction by the collector.

Furthermore, in a configuration in which the resin portion is integrally formed with the outer peripheral edge of the collector as well as the outer peripheral edge of the conductive porous body, mutually facing surfaces of the conductive porous body and the collector can be substantially uniformly connected to each other. Accordingly, the electrical resistance between the conductive porous body and the collector can be suppressed to a minimum.

A seventeen aspect of the invention is the gas diffusion layer member of a polymer electrolyte fuel cell according to the sixteenth aspect in which at least a portion of the collector bites into the surface of the conductive porous body.

According to the seventeenth aspect of the invention, since at least a portion of the collector bites into the surface of the conductive porous body, a good electrical connection state between the conductive porous body and the collector can be more surely realized. Also, since the collector has a two-dimensional mesh structure extending in the in-plane direction, a current generated in a polymer electrolyte fuel cell can be conducted well in the in-plane direction by the collector.

From the foregoing, it is possible to realize a polymer electrolyte fuel cell with a small electrical resistance and a high output.

Further, since the resin portion is integrally formed with at least the outer peripheral edge of the conductive porous body, the handleability of the gas diffusion layer member can be improved, the number of assembling processes when the polymer electrolyte fuel cell is assembled using the gas diffusion layer member can be reduced, and the assembling precision can be improved. Particularly, in a configuration where the resin portion is integrally formed with the outer peripheral edge of the collector as well as the outer peripheral edge of the conductive porous body, mutually facing surfaces of the conductive porous body and the collector can be substantially uniformly connected to each other, and the connected state between the surfaces can be maintained over a prolonged period of time. Accordingly, as the collector bites into the surface of the conductive porous body, the electrical resistance between the conductive porous body and the collector can be suppressed to a minimum, the output of the polymer electrolyte fuel cell can be further increased, and the life span of the fuel cell can be prolonged.

An eighteenth aspect of the invention is a gas diffusion layer member of a polymer electrolyte fuel cell including: a separator plate; and a conductive porous body placed on at least one surface of the separator plate. A resin frame is integrally provided so as to cover the peripheries of the separator plate and the conductive porous body.

According to the eighteenth aspect of the invention, since the separator plate and conductive porous body are integrated into one by the resin frame, it is possible to realize a fuel cell in which its handleability is easy, damage to the gas diffusion layer member when manufacturing the fuel cell is prevented, and its productivity is high. Also, since the side faces of the conductive porous body are covered with the resin frame, open pores opened to the side faces can be sealed to effectively prevent leakage of fuel. Moreover, since channels for fluid (fuel, air, or the like) are formed in the gas diffusion electrode of the conductive porous body, it is not necessary to form fluid channels such as grooves in the separator plate. This enables a thin separator plate to be used, thereby making the fuel cell small-sized and lightweight.

Further, it is preferable that a first fluid channel for allowing a first fluid to pass therethrough and a second fluid channel for allowing a second fluid to pass therethrough be provided in the gas diffusion layer member of the invention. It is preferable that the first fluid channel and the second fluid channel be formed in the resin frame. Moreover, it is more preferable that the first fluid channel and the second fluid channel be provided so as to be connected to the oxygen diffusion electrode and penetrate the resin frame.

A nineteenth aspect of the invention is the gas diffusion layer member of a polymer electrolyte fuel cell according to the eighteenth aspect of the invention in which the resin frame is provided with a first fluid channel for allowing a first fluid to pass therethrough, and a second fluid channel for allowing a second fluid to pass there through.

According to the nineteenth aspect of the invention, different kinds of fluid (fuel and air) are allowed to pass through the gas diffusion electrodes, respectively, from the outside of the gas diffusion layer member to cause an electrode reaction. The first and second fluid channels are provided in various shapes. If the places where the fluid channels are formed are the resin frame, this is easy in working and more advantageous in cost than working a generally high-priced conductive porous body. It is also possible to effectively utilize the surface of the conductive porous body related to the conducting efficiency of an electrode by providing the first and second fluid channels so as to penetrate the resin frame, when gas diffusion layer electrodes are stacked to form a fuel cell, the fluid channels which communicate with each other in the thickness direction can be easily formed, and thus a simple-structured and high-productive fuel cell can be realized.

A twentieth aspect of the invention is a polymer electrolyte fuel cell including: a plurality of the gas diffusion layer members according to the eighteenth or nineteenth aspect of the invention, which are overlapped with each other in their thickness direction, an electrolyte layer made of a polymer electrolyte and disposed between the gas diffusion layer members, and a catalyst layer provided on an interface between the electrolyte layer and the oxygen diffusion electrode of each of the gas diffusion layer members.

According to the twentieth aspect of the invention, in the polymer electrolyte fuel cell of the invention, unit cells can be formed with such a simple configuration of components that the electrolyte layer and the catalyst layer are simply disposed between two gas diffusion layer members. Also, if a plurality of gas diffusion layer members are overlapped with each other and the electrolyte layer is disposed between these members, it is possible to easily form a stacked type fuel cell in which a plurality of unit cells are stacked on each other.

A twenty-first aspect of the invention is a cell member of a polymer electrolyte fuel cell including: the electrolyte layer;

at least a pair of the conductive porous bodies which pinch the electrolyte layer, with a catalyst layer interposed between each conductive porous body and the electrolyte layer; and a resin frame extending in an in-plane direction so as to surround the peripheries of the conductive porous bodies.

A twenty-second aspect of the invention is the gas diffusion layer member of a polymer electrolyte fuel cell according to the twenty-first aspect of the invention in which a plurality of the conductive porous bodies are arranged, and the resin frame is provided around the conductive porous bodies.

A twenty-third aspect of the invention is the gas diffusion layer member of a polymer electrolyte fuel cell according to the twenty-first or twenty-second aspect in which the resin frame is provided so as to surround the peripheries of the conductive porous body and the electrolyte layer.

According to the twenty-first to twenty-third aspects of the invention, since the conductive porous body serves as both a gas diffusion layer and a collecting member, not only unit cells with high collecting efficiency can be realized with small thickness and a simple configuration, but also fuel (hydrogen) or air (oxygen) can be efficiently supplied to the entire conductive porous body (gas diffusion layer) without using an auxiliary mechanism, such as a pump for feeding fuel or air. Moreover, by a configuration including a plurality of pairs of conductive porous bodies, a number of unit cells can be connected in series simply by connecting electrodes sequentially.

In addition, a terminal for connecting electrodes with each other may be exposed at any portion, such as the surfaces (top and bottom faces) or a side face of the resin frame so that a connection with other terminals or external circuits can be made. For example, only an end of a terminal may be exposed while the remaining whole terminal is buried in the resin frame, or a terminal tab may be exposed at only any one of the top and bottom faces without being exposed at the side face. Moreover, it is possible to adopt a configuration in which a whole terminal is buried in the resin frame, the terminal is provided with a through hole penetrating the resin frame, and the terminal is exposed to the inner peripheral surface of the through hole. Also, it is not necessary to separately provide terminals if only they can be directly wired to the conductive porous body.

Further, if the resin frame is provided so as to surround the periphery of the electrolyte layer as well as the periphery of the conductive porous body, the handleability of the cell member can be further improved.

A twenty-fourth aspect of the invention is a composite porous body manufacturing method of manufacturing the composite porous body according to any one of the first to third aspects of the invention, by using the conductive porous body as an inserted part to perform insert-molding that injects resin so as to be connected to an edge of the conductive porous body.

According to the twenty-fourth aspect of the invention, since the composite porous body is formed by insert molding, the resin portion can be formed with high precision, and the composite porous body can be easily formed. Also, since the melted resin enters pores opened to the side portion a conductive porous body at a portion where the conductive porous body is connected to the resin portion and is cured in the pores, a metal portion and the resin portion can be securely connected to each other by an anchoring effect to realize a high-strength composite porous body. Moreover, when the resin portion contains inorganic filler, even if the melted resin will flow into the conductive porous body from the pores opened to the outer peripheral edge of the conductive porous body during insert molding, the inorganic filler is caught in the meshes defining the pores to reduce the opening area of the pores in the outer peripheral edge of the conductive porous body. Accordingly, the melted resin can be inhibited from flowing into the conductive porous body during insert molding, and a reduction in the effective use area of the conductive porous body can be suppressed to a minimum.

Moreover, as previously described, since the inorganic filler is caught in the meshes defining the pores opened to the outer peripheral edge of the conductive porous body during insert molding, the melted resin is cured in that state. As a result, the secure bonding between the resin portion and the conductive porous body can be realized irrespective of whether the melted resin is inhibited from flowing into the conductive porous body to a minimum.

A twenty-fifth aspect of the invention is a manufacturing method of a gas diffusion layer member of a polymer electrolyte fuel cell of manufacturing the gas diffusion layer member according to the fourth or fifth aspect of the invention, by using the conductive porous body as an inserted part to perform insert-molding that injects resin so as to be connected to an edge of the conductive porous body.

According to the twenty-fifth aspect of the invention, since the melted resin enters pores opened to the side portion the conductive porous and is cured in the pores, sealing of the conductive porous body against leakage of gas can be ensured, and the conductive porous body and the resin frame can be securely connected to each other by an anchoring effect. Also, by arranging a plurality of conductive porous bodies and injecting resin onto the peripheries of the conductive porous bodies to form a resin frame, it is possible to manufacture a gas diffusion layer member, which facilitates manufacture of a flat cell having a plurality of unit cells.

In the manufacturing method, when a terminal tab is provided, the terminal tab can be formed on a resin frame by various methods, such as plating, vapor deposition, sputtering or the like, after the resin frame is formed by insert molding. Alternatively, after the terminal tab is integrally formed with the conductive porous body, insert molding may be performed using the conductive porous body and the terminal tab as inserted parts.

When the terminal tab is formed after the resin frame is formed, it is possible to inject resin onto the periphery of a conductive porous body with the conductive porous body sandwiched between molds for molding. Also, when a conductive porous body having a terminal tab formed thereon is used as an inserted part, resin can be injected while a portion of the terminal tab protruding from the conductive porous body is sandwiched between the molds. Moreover, in this manufacturing method, a terminal tab made of conductive resin and a resin frame made of non-conductive resin can be injection-molded by a so-called two-color molding.

A twenty-sixth aspect of the invention is a manufacturing method of a gas diffusion layer member of a polymer electrolyte fuel cell of manufacturing the gas diffusion layer member according to the twelfth aspect of the invention, by using the conductive porous body as an inserted part to inject resin onto an edge of the conductive porous body and the oxygen supply surface, thereby integrally forming a resin portion and a lattice-shaped frame portion.

According to the twenty-sixth aspect of the invention, since the melted resin enters pores opened to the surfaces of a conductive porous body at a portion where the injection resin is connected to the conductive porous body and is cured in the pores, the gas diffusion electrode and the resin portion can be securely connected to each other by an anchoring effect to provide a high-strength gas diffusion layer member.

A twenty-seventh aspect of the invention is a manufacturing method of a gas diffusion layer member of a polymer electrolyte fuel cell according to the sixteenth or seventeenth aspect of the invention. The method includes a mold clamping step of using, as an inserted part, a stacked body in which the collector is disposed on the surface of the conductive porous body, compressing and fixing the inserted part disposed on molds in a thickness direction of the stacked body by surfaces of the molds, and forming a cavity by the mold surfaces; and after the mold clamping step, injecting a melted resin into the cavity to integrally form a resin portion extending in an in-plane direction with an outer peripheral edge of the stacked body over its entire periphery.

According to the twenty-seventh aspect of the invention, the gas diffusion layer member of a polymer electrolyte fuel cell in which the conductive porous body, the collector and the resin portion are integrally formed can be formed well. In particular, since the inserted parts are compressed and fixed in a thickness direction by surfaces of the molds during the mold clamping process and a melted resin is then injected into the cavity in that state, the mold surfaces can be brought into close contact with the inserted part. Accordingly, the melted resin can be inhibited from entering spaces among the mold surfaces, the conductive porous body and the collector, and the inserted part can be inhibited from being deviated by the injection pressure of the melted resin in the cavity. As a result, the gas diffusion layer member can be surely formed with high precision. Also, since the collector is caused to bite into the surface of the conductive porous body at the time of clamping of the molds, a close contact state between the mold surfaces and the surface of the inserted part can be realized. As a result, a good electrical connection state between the collector and the conductive porous body can be surely realized, and the gas diffusion layer member can be formed with a high precision without causing any inconvenience in its manufacture.

Also, since the melted resin is impregnated into and cured in the pores opened to the side portion of the conductive porous body at a portion where the conductive porous body and the resin portion are connected to each other, the conductive porous body and the resin portion are securely connected connected to each other by an anchoring effect. Accordingly, if the resin portion is formed at the outer peripheral edge of the collector as well as the outer peripheral edge of the conductive porous body, the strength of connection between respective members of the gas diffusion layer member composed of the conductive porous body and the collector, and the resin portion can be increased, and the life span of these members can be prolonged.

A twenty-eighth aspect of the invention is a manufacturing method of a cell member for a polymer electrolyte fuel cell of manufacturing the cell member according to any one of the twenty-first to twenty-third aspect of the invention, by using, as inserted parts, the electrolyte layer, and the at least pair of conductive porous bodies which pinch the electrolyte layer, with the catalyst layer interposed between the conductive porous bodies and the electrolyte layer to perform insert-molding that injects resin so as to be connected to edges of the conductive porous bodies to mold the resin frame.

A twenty-ninth aspect of the invention is the manufacturing method of a cell member for a polymer electrolyte fuel cell according to the twenty-eighth aspect of the invention in which the electrolyte layer and the conductive porous bodies are joined together by hot pressing during insert molding, with the catalyst layer interposed therebetween.

According to the twenty-eighth and the twenty-ninth aspects of the invention, since the melted resin is impregnated into and cured in the pores opened to the side portion of the conductive porous body and the electrolyte layer, the catalyst layer and the conductive porous body are integrated into one, sealing of fuel gas and fuel liquid can be ensured, and the conductive porous body and the resin frame can be securely connected to each other by an anchoring effect.

Further, by arranging a plurality of conductive porous bodies at predetermined intervals and injecting resin onto the peripheries of the conductive porous bodies to mold a resin frame, a flat cell member having a plurality of integral unit cells can be manufactured easily. In addition, by joining the electrolyte layer and the conductive porous bodies together by hot pressing during insert molding, the electrolyte layer and the conductive porous bodies can be integrally formed with the catalyst layer therebetween.

In the manufacturing method, when terminals are provided separately from the conductive porous bodies, the terminals can be formed on a resin frame by various methods, such as plating, vapor deposition, sputtering or the like, after the resin frame is formed. Alternatively, after the terminals are integrally formed with the conductive porous bodies, insert molding may be performed using the conductive porous bodies and the terminals as inserted parts.

In addition, when the conductive porous bodies having the terminals as separate members fixed thereto are used as inserted parts, portions of the terminals can be fixed with pins or the like in order to prevent the conductive porous bodies from being deviated due to the injection pressure. Also, if the conductive porous bodies are sandwiched between molds for molding, the resin frame can be formed so as to surround the conductive porous bodies without leaving a trace of holding by the pins. Moreover, in this manufacturing method, terminals made of conductive resin and a resin frame made of non-conductive resin can be injection-molded by a so-called two-color molding.

A thirtieth aspect of the invention is a manufacturing method of a gas diffusion layer member of a polymer electrolyte fuel cell of manufacturing the gas diffusion layer member according to any one of the eighteenth to twentieth aspects of the invention, by using, as an inserted part, a stacked body in which the separator plate is disposed on the surface of the conductive porous body to perform insert-molding that injects resin so as to be connected to an edge of the conductive porous body.

According to a thirtieth aspect of the invention, in the polymer electrolyte fuel cell of the invention, unit cells can be formed with such a simple configuration of components that the electrolyte layer and the catalyst layer are simply disposed between two gas diffusion layer members. Also, if a plurality of gas diffusion layer members are overlapped with each other and the electrolyte layer is disposed between these members, it is possible to easily form a stacked type fuel cell in which a plurality of unit cells are stacked on each other.

In addition, there are two kinds of fuel, i.e., hydrogen gas and a methanol aqueous solution, as typical fuel used in the above-described polymer electrolyte fuel cell.

When the methanol aqueous solution is used, the fuel flowing through the conductive porous body is liquid, but the conductive porous body is commonly called a gas diffusion layer. In the invention, even though the fuel includes liquid fuel, the conductive porous body is commonly called a gas diffusion layer. Therefore, the fuel is not limited to gaseous fuel.

DESCRIPTION OF THE PREFERRED EMBODIMENTS

First, a conductive porous body and a resin portion used in the invention will be described.

Although a carbon porous body called as carbon paper or carbon cloth may be used as the conductive porous body used in the invention, it is desirable to use a metallic porous body having a three-dimensional mesh structure, which are excellent in both gas diffusivity and electrical conductivity, for example, a metal-powder sintered sheet, a metallic non-woven fabric, a stacked mesh, or the like. Among these, the metal-powder sintered sheet of which porosity or thickness can be appropriately adjusted and available raw material metals are also various is more suitable as the conductive porous body of the gas diffusion layer member. Furthermore, a foamed-metal sintered sheet obtained by adding a binder, a solvent and the like to a metal powder to knead them, then mixing the kneaded material with a foaming agent to obtain a foaming slurry, and then sintering the slurry after foamed molding thereof is more preferable because it can be manufactured with a high porosity.

Further, the material for forming the resin portion used in the invention includes, for example, thermoplastic resin, thermosetting resin, and elastomer, which can be appropriately selected according to use of a composite porous body 10'.

The thermoplastic resin includes, for example, general-purpose plastics, such as polyethylene, polystyrene, AS resin, ABS resin, polypropylene, vinyl chloride resin, and methacrylic resin, and polyethylene terephthalate; general purpose engineering plastics, such as polyamide, polycarbonate, polyacetal, denatured polyphenylene ether, and polybutylene terephthalate; super engineering plastics, such as polyphenylene sulfide, polyarylate, polysulfone, polyethersulfone, polyetheretherketone, polyetherimide, polyamidoimide, liquid crystal polymers, polyimide, and polyphthalamide; and other resins, such as fluoric resin, ultra high-molecular-weight polyethylene, thermoplastic elastomer, polymethylpentene, biodegradable plastic, polyacrylonitrile, and cellulose-based plastic.

The thermosetting resin includes, for example, phenol resin, urea resin, melamine resin, epoxy resin, unsaturated polyester resin, polyurethane, diallyphthalate resin, silicone resin, and alkyd resin are given. The elastomer includes, for example, natural rubber, isoprene rubber, butadiene rubber, butyl rubber, ethylene-propylene rubber, ethylene vinyl acetate copolymer, chloroprene rubber, and chlorosulfonated polyethylene.

Hereinafter, examples of the invention will be described in detail.

Example 1

Figure 1:
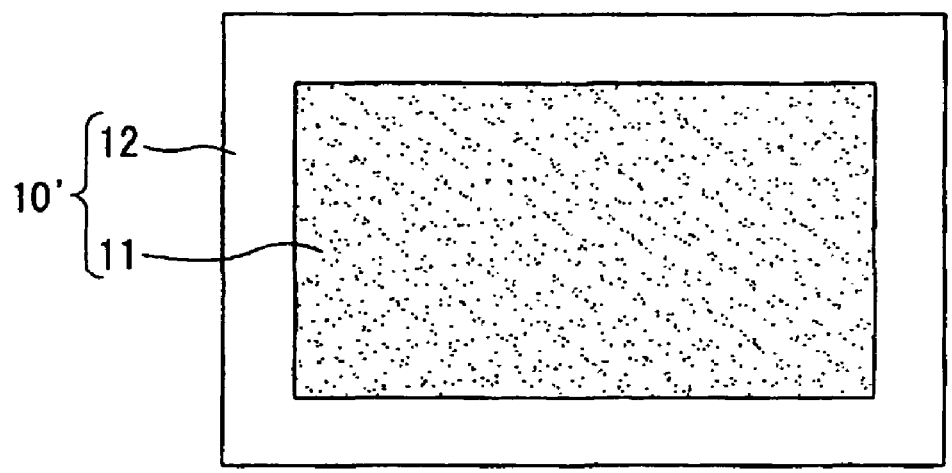
FIG. 1 is a plan view showing a composite porous body according to Example 1 of the invention.

As shown in FIG. 1, a composite porous body 10' according to the invention includes a sheet-like conductive porous body 11 and a resin portion 12 extending in the in-plane direction of the conductive porous body 11, which are integrally formed in the shape of a rectangular thin plate.

The conductive porous body 11 is a rectangular thin plate having a three-dimensional mesh structure, has air permeability and a water absorption property by virtue of mutual communication between laterally opened pores in various directions, and has features that are lightweight and large in surface area. In addition, the conductive porous body 11 may be made of metals, carbon substances containing crystalline graphite or non-crystalline amorphous carbons, and further metallic non-woven fabrics.

The resin portion 12 is formed in the shape of a thin plate connected to an outer peripheral edge of the conductive porous body 11 and is formed with almost the same thickness as the conductive porous body 11 without any height difference therebetween. Further, the resin portion 12 contains inorganic filler (not shown). The inorganic filler is fibrous, and is contained in a ratio of 5 wt % to 60 wt % in the resin portion 12. Here, the "fibrous" means that the resin portion has an aspect ratio of 5 or more. In the present embodiment, the inorganic filler has an outer diameter of 3.5 nm to 30 µm, and more preferably, 3.5 nm to 10 µm. In addition, although the resin portion 12 may be flat as shown in FIG. 1, the resin portion may be provided with holes for allowing screws to be inserted therethrough, grooves for fitting to an apparatus, ribs for improving strength, bosses, etc. during insert molding which will be described below.

The composite porous body 10' in which the conductive porous body 11 and the resin portion 12 are integrally formed forms a single thin-plate member as a whole, and is attached to various apparatuses by, for example, fixing or sandwiching the resin portion 12 so as to be used as filters, water-absorbing members, or heat-radiating elements, and the like.

Next, a manufacturing method of the metallic conductive porous body 11 will be described. The conductive porous body 11 can be manufactured by various methods. The conductive porous body 11 can be manufactured by calcinating the resulting green sheet G that is formed, for example, by molding slurry S containing a metal powder thinly and then drying it.

Figure 2:
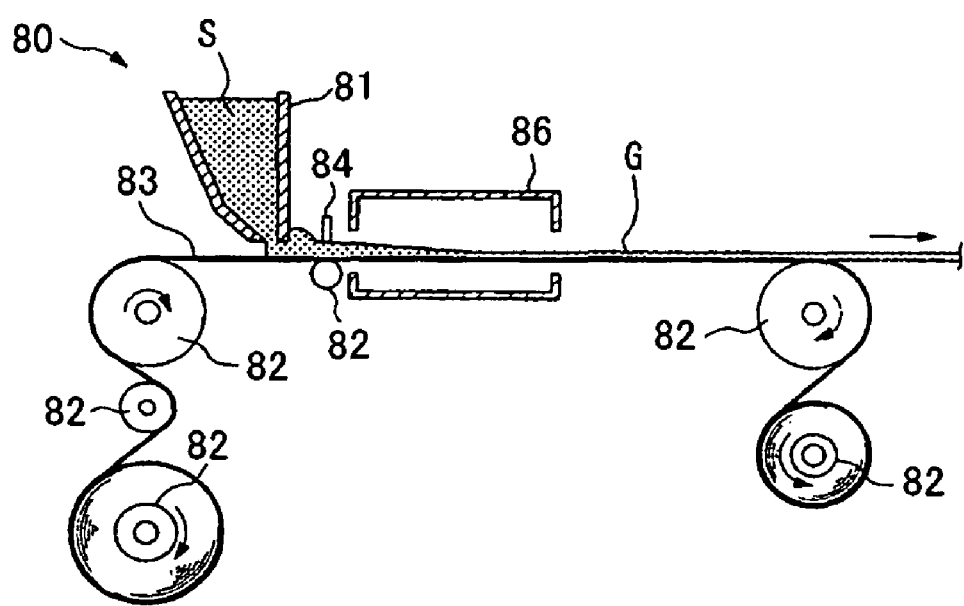
FIG. 2 is a schematic diagram showing a method of manufacturing the porous body shown in FIG. 1.

FIG. 2 shows a schematic configuration of a green-sheet manufacturing apparatus 80 that molds the slurry S thinly by a doctor blade method.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based organic solvent with five to eight carbons (for example, neopentane, hexane, and heptane)) that are evaporated or sublimated by heating treatment or a defoaming agent (ethanol) can be added if needed.

In the green-sheet manufacturing apparatus 80, first, the slurry S is supplied from a hopper 81 that stores the slurry S onto a carrier sheet 83 to be conveyed by rollers 83. The slurry S on the carrier sheet 83 is extended between the carrier sheet 83 to be moved and a doctor blade 84 so as to be formed with a required thickness.

The molded slurry S is further conveyed by the carrier sheet 83 to pass through a heating furnace 86. Then, the slurry is dried in the heating furnace 86 to form a green sheet G in which the SUS316L powder is joined by an organic binder. In addition, when a foaming agent is contained in the slurry S, the slurry S extended on the carrier sheet 83 is subjected to heating treatment in a high humidity atmosphere and then foamed by a foaming agent to form foamed slurry, before it is dried. Thereafter, the foamed slurry is subjected to drying treatment, thereby forming a green sheet G.

After the green sheet G is detached from the carrier sheet 83, it is degreased and calcinated in a vacuum furnace (not shown) whereby the organic binder is removed to form a conductive porous body 11 in which the metal powder particles are sintered together.

Next, one embodiment of the method, which manufactures the composite porous body 10' shown in FIG. 1 by arranging a resin portion 12 over the entire periphery of an outer peripheral edge of the conductive porous body 11, will be described with reference to FIG. 3.

The conductive porous body 11 as an inserted part is disposed in a cavity 72 defined between a pair of molds 71 and 70, and a melted resin 75 injected through a gate 74 from a runner 73 is then filled in the cavity 72, thereby forming a composite porous body 10' in which the conductive porous body 11 and the resin portion 12 are integrated into one body. It is noted herein that the melted resin 75 injected into the cavity 72 contains inorganic filler (not shown). The inorganic filler is fibrous (has an aspect ratio of 5 or more), and is contained in a ratio of 5 wt % to 60 wt % in the melted resin 75. Further, the outer diameter of the inorganic filler is 3.5 nm to 30 µm, and more preferably, 3.5 nm to 10 µm. This allows the inorganic filler to be evenly dispersed in the melted resin 75 to make the fluidity of the resin 75 uniform. This also allows the inorganic filler to be caught in the meshes defining the pores opened to the outer peripheral edge of the conductive porous body 11 during insert molding to reduce the opening area of the pores in the outer peripheral edge of the conductive porous body 11. In this state, the melted resin 75 is cured to bond the outer peripheral edge of the conductive porous body 11 and the resin portion 12 together.

In addition, when the composite porous body 10' is formed by insert molding, the thickness of the cavity 72 (the size of the cavity in a direction that molds are opened or closed) at the time of closing of the molds is slightly smaller than that of the conductive porous body 11, and thus the conductive porous body 11 is compressed up to 3 to 90% between the molds 70 and 71 at the time of closing of the molds. In this case, even if the injection pressure of the melted resin 75 is applied to the conductive porous body 11, it is possible to suppress positional deviation in the cavity 72 of the conductive porous body 11, to improve the flatness of a surface of the conductive porous body 11, and to adjust the pore diameter or porosity of the conductive porous body 11.

Further, the pore diameter or porosity of the conductive porous body 11 after the adjustment, and the size of the inorganic filler or the additive amount of the inorganic filler to the melted resin 75 (resin portion 12) are relatively determined, in other words, are determined so that the inorganic filler can be caught in meshes defining pores opened to the outer peripheral edge of the conductive porous body 11 during insert molding, as mentioned above, to reduce the opening area of the pores in the outer peripheral edge of the conductive porous body 11. For example, if the pore diameter of the conductive porous body 11 is in the range of 10 µm to 2 mm and the porosity thereof is in the range of 40% to 98%, the inorganic filler may have the above-described size and content.

Here, the inorganic filler includes, for example, fibrous substances, such as glass fibers, carbon fibers, carbon nanotubes and staple metal fibers; metal oxides, such as aluminum oxide, zirconium oxide, zinc oxide, potassium titanate, and ammonium borate; capillary crystal (so-called whisker) substances of nonoxide ceramics such as silicon carbides and aluminum nitrides.

As described above, according to the composite porous body 10' of the present embodiment, since the resin portion 12 is provided, the rigidity of the conductive porous body 11 is increased and the handleability thereof can be improved. Further, since the resin portion 12 extends in the in-plane direction so as to protrude from the outer peripheral edge of the conductive porous body 11, a portion where holes for fixation to an apparatus are bored can be limited to the resin portion 12 of the composite porous body 10', the holes for fixation to an apparatus can be easily bored with high precision, and a reduction in the effective use area of the conductive porous body 11 can be suppressed to a minimum. In particular, since the resin portion 12 contains the inorganic filler, the strength of the resin portion 12 can be increased. As a result, the composite porous body 10' can be increased as a whole, and its handleability can be further improved.

Furthermore, according to the manufacturing method of the composite porous body 10' of the present embodiment, since the composite porous body 10' is formed by insert molding, it is possible to form the resin portion 12 with high precision and to easily form the composite porous body 10'. In addition, since the resin portion 12 contains the inorganic filler, even if the melted resin 75 will flow into the conductive porous body 11 from the pores opened to the outer peripheral edge of the conductive porous body 11 during insert molding, the inorganic filler is caught in the meshes defining the pores to reduce the opening area of the pores in the outer peripheral edge of the conductive porous body 11. Accordingly, the melted resin 75 can be inhibited from flowing into the conductive porous body 11 without any restriction during insert molding, and a reduction in the effective use area of the conductive porous body 11 can be suppressed to a minimum (an effect of suppressing a reduction in effective use area). Moreover, as previously described, since the inorganic filler is caught in the meshes defining the pores opened to the outer peripheral edge of the conductive porous body 11 during insert molding, the melted resin 75 is cured in that state. As a result, the secure bonding between the resin portion 12 and the conductive porous body 11 can be realized irrespective of whether the melted resin 75 is inhibited from flowing into the conductive porous body 11 to a minimum (an effect of increasing the joining strength).

In addition, the shapes or combinations of these members shown in the above-described embodiments are just exemplary. Therefore, various modifications may be made thereto on the basis of design requirements without departing from the sprit and scope of the invention. For example, in the above embodiment, the resin portion 12 is provided over the entire outer peripheral edge of the conductive porous body 11. However, a predetermined length of the resin portion may be disposed at a predetermined peripheral position of the conductive porous body 11.

Among the effects described hitherto, a test for verifying the effects of suppressing a reduction in effective use area (hereinafter, simply referred to as "Effect 1"), and the effect of increasing the joining strength (hereinafter, simply referred to as "Effect 2") were carried out. As the composite porous body for this test, two types of examples were prepared. Both the examples were formed as composite porous bodies having a porous body and a resin portion made substantially flush with each other and having a thickness of about 0.2 mm, by the aforementioned insert molding. FIG. 4 shows the results, including the forming conditions during the insert molding, the types of fillers contained in the resin portions, the outer diameter of the fillers, etc. In FIG. 4, numerical values of the Effect 1 represent inflow depth of the resin portions from the outer peripheral edges of the conductive porous bodies. In addition, the amount of fillers to be filled was set to about 40% wt in both the present example and comparative example, and the resin portions are made of syndiotactic polystyrene. It can be understood from this drawing that the above effects are further improved in the case of the fibrous inorganic filler. In addition, if the inorganic filler is contained in the resin portions, the above Effects 1 and 2 are improved. However, even if the resin portions do not contain the inorganic filler, they have the Effects 1 and 2.

Next, an application of the composite porous body 10' will be described.

Figure 5:
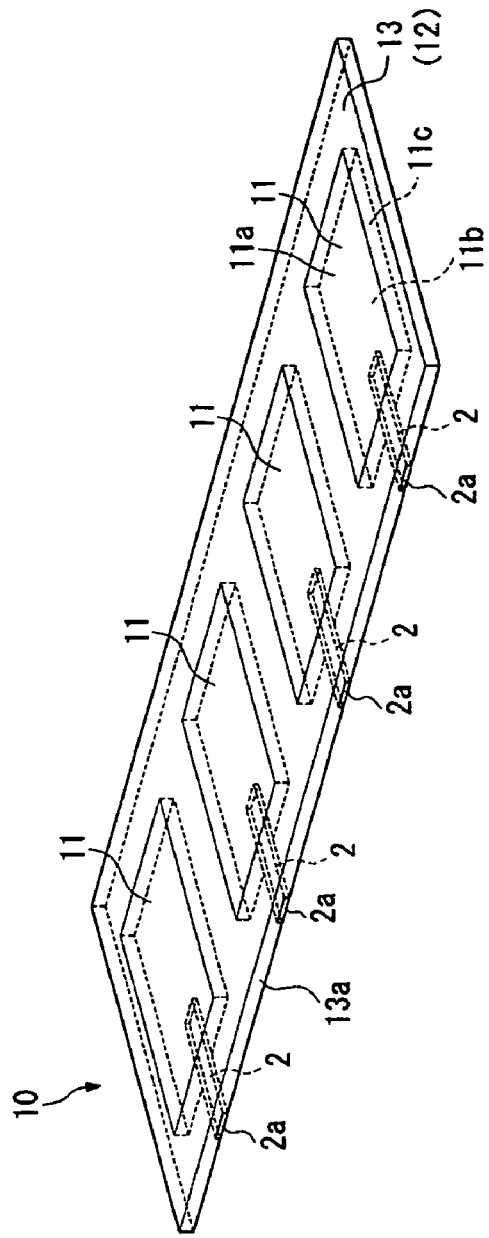
FIG. 5 is a perspective view showing a gas diffusion layer member according to Example 2 of the invention.

FIG. 5 shows a composite porous body applied to a gas diffusion layer member 10 of a polymer electrolyte fuel cell. In the gas diffusion layer member 10, with a plurality of sheets of conductive porous bodies 11 arranged at predetermined intervals in the in-plane direction of the gas diffusion layer member 10, a resin portion 12 is provided so as to bury spaces between the conductive porous bodies 11 and surround the entire outer periphery thereof. Also, a terminal tab 2 extending to the outer periphery of the resin portion 12 is connected to one end of each conductive porous body 11. The terminal tab 2 is welded to each conductive porous body 11 before insert molding so as to be integrally formed with the resin portion 12 by the insert molding.

In addition, although the present application is directed to provision of the terminal tab 2 in each conductive porous body 11, the gas diffusion layer member of the polymer electrolyte fuel cell may dispense with the terminal tab 2. That is, in a stacked type fuel cell that is a stacked structure of unit cells, conductive separators are disposed between adjacent unit cells. Thus, the unit cells can be connected in series without providing the terminal tab 2 to the conductive porous bodies 11. Further, since wiring lines are connected directly to the conductive porous bodies 11 as in a flat cell member 10" shown in FIGS. 54 and 55, the need for provision of the terminal tab 2 is eliminated. Connecting members, such as U-shaped conductive connecting members 18 (FIG. 54) which connect the conductive porous bodies 11 to each other in a cross-shape, or conductive clips 19 (FIG. 55) each having a pinching portion 19a which pinches a portion of a resin frame 13 in the vicinity of two pairs of the adjacent conductive porous bodies 11 and a connecting portion 19b which extends toward each conductive porous body 11 from the pinching portion 19a, can be used.

Further, an application of the composite porous body 10' is not limited to a gas diffusion layer member of the polymer electrolyte fuel cell. For example, the composite porous body can be used in various applications, such as a filter of an air purifier, a packing supporting plate of a packed tower, a water-absorbing member used in a humidifier or the like, and a heat sink for cooling a CPU and the like of a computer.

Example 2

FIG. 5 shows a gas diffusion layer member 10 according to Example 2 of the invention. The gas diffusion layer member 10 includes sheet-like conductive porous bodies 11, terminal tabs 2 protruding from the conductive porous bodies 11, and a resin frame 13 provided so as to surround the peripheries of the conductive porous bodies 11. An end 2a of each terminal tab 2 is adapted to be exposed to an outer face 13a of the resin frame 13.

Since the gas diffusion layer member 10 causes electrons collected in the conductive porous body 11 to flow out from the terminal tab 2, or causes electrons flowing in from the terminal tab 2 to flow out into conductive porous body 11, the conductive porous body 11 and the terminal tab 2 are formed of a material having excellent electrical conductivity. In addition, when corrosion is problematic, a corrosion-resistant material such as stainless steel is preferably used.

Figure 6:
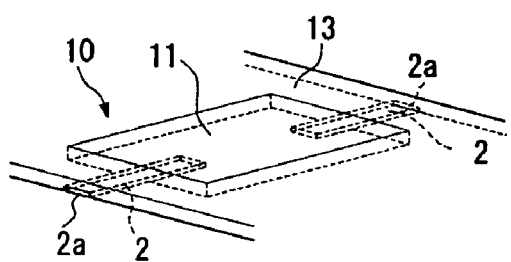
FIG. 6 is a perspective view showing another embodiment of the gas diffusion layer member according to Example 2 of the invention.
Figure 7:
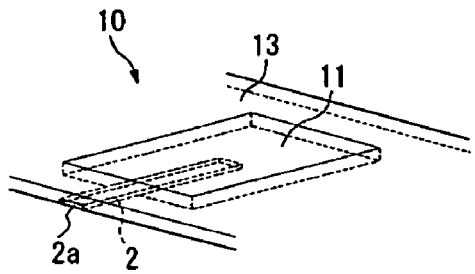
FIG. 7 is a perspective view of still another embodiment of the gas diffusion layer member according to Example 2 of the invention.
Figure 8:
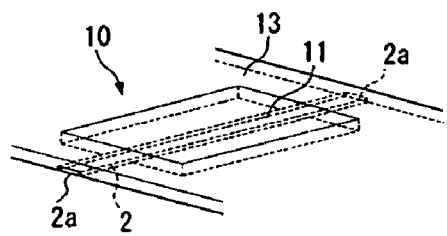
FIG. 8 is a perspective view of still another embodiment of the gas diffusion layer member according to Example 2 of the invention.

In the embodiment of the gas diffusion layer member 10 shown in FIG. 5, each conductive porous body 11 is provided with one terminal tab 2. However, when the electrical conductivity of the conductive porous body 11 is low, in order to prevent the collecting efficiency from being lowered, various configurations can be adopted in such a manner that a terminal tab 2 is caused to protrude from each of both ends of a conductive porous body 11 as shown in FIG. 6, the contact surface between a conductive porous body 11 and a terminal tab 2 is increased as shown in FIG. 7, or the shape of a terminal tab 2 is formed so as to extend in the longitudinal direction of a conductive porous body 11 and protrude from both ends thereof as shown in FIG. 8, or the like.

Figure 9:
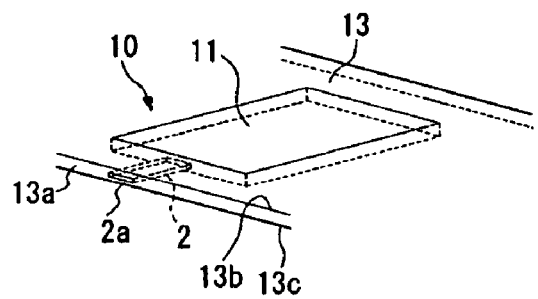
FIG. 9 is a perspective view of still another embodiment of the gas diffusion layer member according to Example 2 of the invention.
Figure 10:
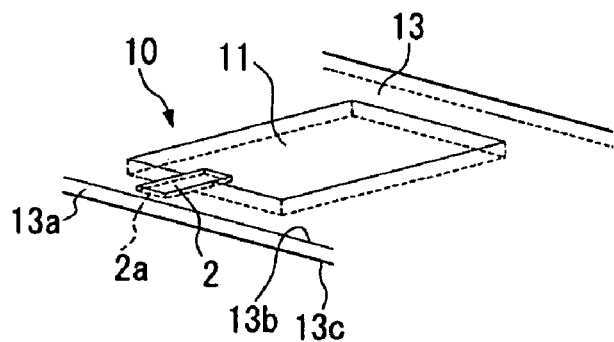
FIG. 10 is a perspective view of still another embodiment of the gas diffusion layer member according to Example 2 of the invention.
Figure 11:
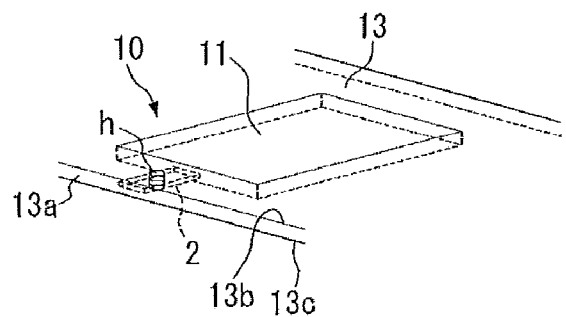
FIG. 11 is a perspective view of still another embodiment of the gas diffusion layer member according to Example 2 of the invention.

Further, a terminal tab 2 may be exposed at any portion, such as a side face 13a or surfaces (top and bottom faces) 13b or 13c of the resin frame 13. For example, only an end 2a of a terminal tab 2 may be exposed while the remaining whole terminal tab is buried in the resin frame 13 (FIG. 9), or a terminal tab may be exposed at only any one of the top and bottom faces 13a and 13c without being exposed at the side face 13a (FIG. 10). Moreover, as shown in FIG. 11, it is possible to adopt a configuration in which a whole terminal tab 2 is buried in the resin frame 13, the terminal tab 2 is provided with a through hole h penetrating the resin frame 13, and the terminal tab 2 is exposed to the inner peripheral surface of the through hole h.

In the polymer electrolyte fuel cell, the conductive porous body 11 is a sheet-like member that serves as both a gas diffusion layer and a collector plate because it has electrical conductivity and air permeability by virtue of the three-dimensional mesh structure. Specifically, the conductive porous body is obtained, for example, by forming a metal-powder sintered sheet, a foamed-metal sintered sheet, a metallic non-woven fabric, a stacked mesh, or the like in a required shape.

Hereinafter, as an example of the conductive porous body 11, a foamed-metal sintered sheet 11 (conductive porous body 11) manufactured by sintering a metal powder will be described. The foamed-metal sintered sheet 11 is manufactured, for example, by sintering a green sheet S obtained after slurry S containing a metal powder is formed thinly and dried.

Figure 12:
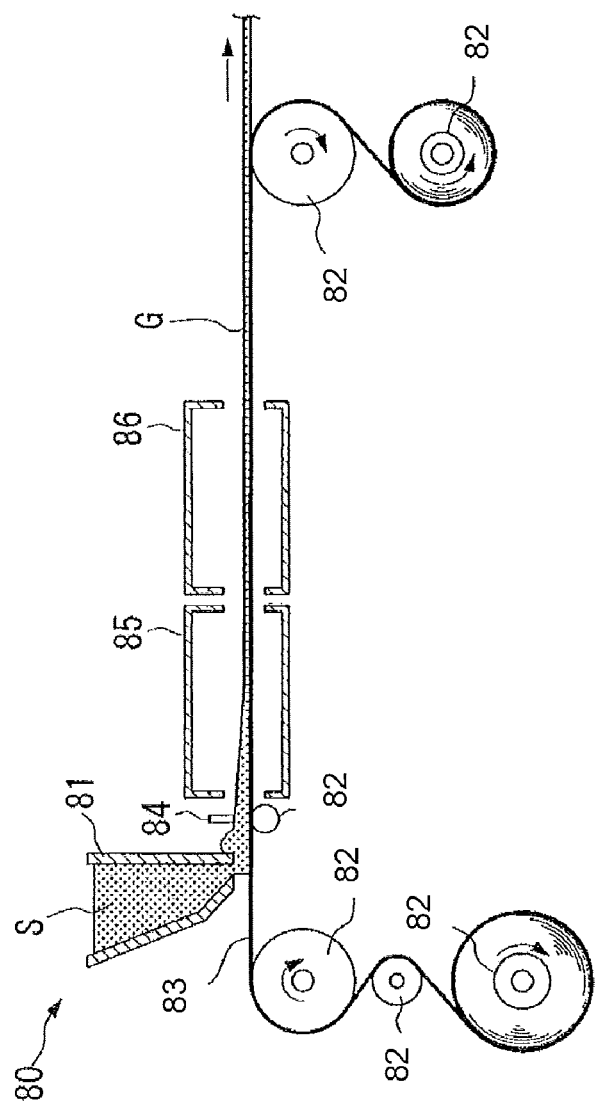
FIG. 12 is a schematic diagram showing an apparatus used in manufacturing a conductive porous body of the invention.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based organic solvent with five to eight carbons (for example, neopentane, hexane, and heptane) that are evaporated or sublimated by heating treatment or a defoaming agent (ethanol) can be added if needed. FIG. 12 shows a green-sheet manufacturing apparatus 80 that molds the slurry S thinly by the doctor blade method.

In the green-sheet manufacturing apparatus 80, first, the slurry S is supplied from a hopper 81 that stores the slurry S onto a carrier sheet 82 to be conveyed by rollers 83. The slurry S on the carrier sheet 82 is extended between the carrier sheet 82 to be moved and a doctor blade 84 so as to be formed with a required thickness.

The molded slurry S is further conveyed by the carrier sheet 82 to pass through a foaming bath 85 and a heating furnace 86 performing heat treatment sequentially. In the foaming bath 85, the slurry is subjected to heating treatment in a high humidity atmosphere. Thus, the slurry S can be foamed with a foaming agent without being cracked. Then, when the slurry S having cavities formed by the foaming is dried in the heating furnace 86, a green sheet G in which metal powder particles defining the cavities among them are joined together by an organic binder is formed.

After the green sheet G is detached from the carrier sheet 82, it is degreased and calcinated in a vacuum furnace (not shown) whereby the organic binder is removed to form a conductive porous body in which the metal powder particles are sintered together. The conductive porous body can be cut into a plurality of foamed-metal sintered sheets 11 with an appropriate size.

A terminal tab 2 is connected to each of the foamed-metal sintered sheets 11 formed as described above. The terminal tab 2 is made of sheet metal or conductive resin having excellent electrical conductivity without air permeability, and is provided so as to protrude from each conductive porous body 11.

The terminal tab 2 of the present embodiment is made of sheet metal, and welded by spot welding or the like so as to protrude from the conductive porous body 11 in the in-plane direction thereof while it partially overlaps the conductive porous body 11.

The resin frame 13 is made of resin having electrical insulation without air permeability, and is provided to extend in the in-plane direction of the conductive porous body 11, to bury spaces between the plurality of conductive porous bodies 11 arranged in the in-plane direction at predetermined intervals, and to surround the peripheries (edges) of the conductive porous bodies 11 so that the air permeability of a side portion 11c of the conductive porous bodies 11 can be sealed. The end 2a of the terminal tab 2 connected to each conductive porous body 11 is exposed to the outer face 13a of the resin frame 13. The resin frame 13 may be provided with screw holes for pinching gas diffusion layers or fixing the position thereof. Also, in order to improve the sealing performance against the peripheries, the resin frame may be provided with grooves for O-rings, or may be provided with convex portions made of soft resin.

Next, a manufacturing method of the gas diffusion layer member 10 according to Example 2 of the invention will be described. This method performs insert molding using a foamed-metal sintered sheet 11 as an inserted part. It is assumed herein that four foamed-metal sintered sheets 11 are inserted into one gas diffusion layer member 10.

Figure 13:
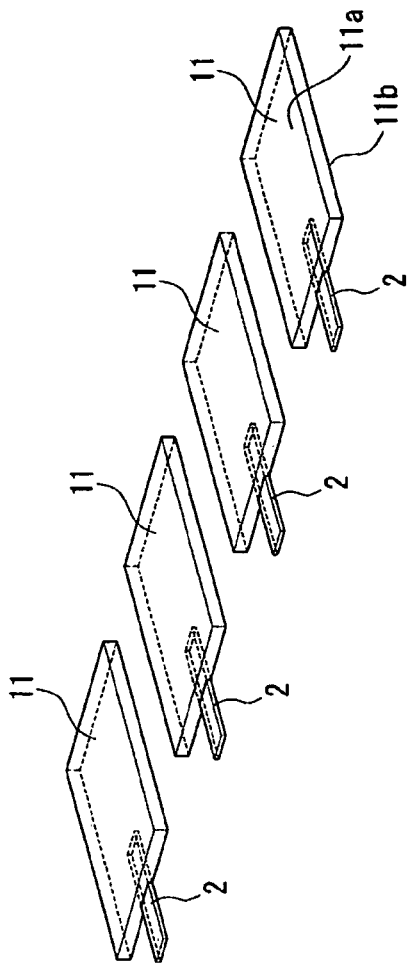
FIG. 13 is a perspective view for explaining the manufacturing method of the gas diffusion layer member according to Example 2 of the invention.
Figure 14:
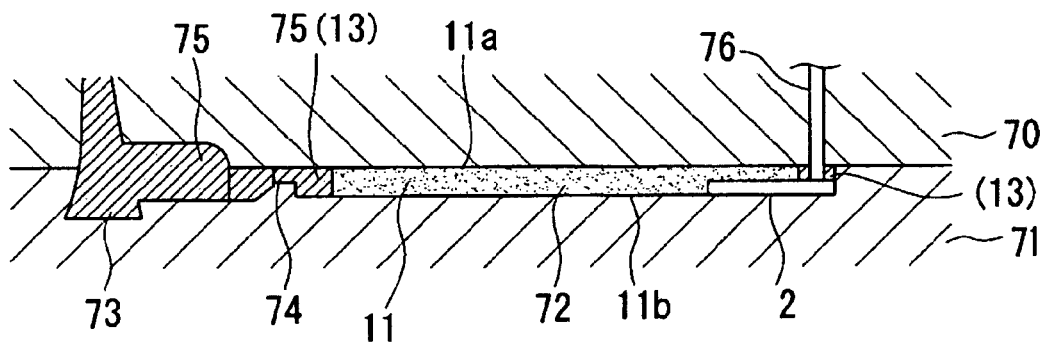
FIG. 14 is a schematic diagram showing injection molds which manufactures the gas diffusion layer member according to Example 2 of the invention.

First, as shown in FIG. 13, a terminal tab 2 is welded to each of the foamed-metal sintered sheets 11 so as to be integrated therewith. Then, the four foamed-metal sintered sheets 11 having the terminal tab 2 welded thereto are arranged at predetermined intervals in the in-plane direction within a cavity 72 defined between a pair of molds 70 and 71 that are molds for insert molding as shown in FIG. 14.

Within the cavity 72, each terminal tab 2 is held down by a pin member 76 protruding into the cavity 72 and each foamed-metal sintered sheet 11 is sandwiched between the pair of molds 70 and 71 so that the foamed-metal sintered sheet 11 and the terminal tab 2 are fixed by the pressure of injected resin to be prevented from being moved in the cavity 72. Accordingly, since the melted resin can be filled with almost the same thickness as the foamed-metal sintered sheet 11, most of both surfaces 11a and 11b of the foamed-metal sintered sheet 11 can be exposed to the surface of the gas diffusion layer member 10.

In addition, if the thickness of the cavity 72 at the time of closing of the molds is made slightly smaller than that of the conductive porous body 11 so that the foamed-metal sintered sheet 11 is compressed up to 3 to 90% between the molds 70 and 71 during closing the molds, the foamed-metal sintered sheet 11 can be fixed within the cavity 72 against the injection pressure of resin and the flatness of the foamed-metal sintered sheet 11 can be improved.

Then, a melted resin 75 injected through a gate 74 from a runner 73 is filled in the closed cavity 72, thereby integrally forming a resin frame 13 with the same thickness as the that of the foamed-metal sintered sheet 11 around each foamed-metal, sintered sheet 11.

At this time, since both the surfaces 11a and 11b of the foamed-metal sintered sheet 11 touch the molds 70 and 71, the entire surfaces 11a and 11b are not coated with the resin and thus the surfaces 11a and 11b of the foamed-metal sintered sheet 11 are exposed from the resin frame 13. Further, the melted resin enters the pores opened to the side portion 11c of the foamed-metal sintered sheet 11 to a depth of about 5 μm to 1000 μm and is cured whereby the foamed-metal sintered sheet 11 and the resin frame 13 are securely joined together and the entire side portion 11c of the foamed-metal sintered sheet 11 is covered by the resin frame 13.

In that case, the end 2a of the terminal tab 2 is not required to coincide with the outer face (side face) 13a of the resin frame 13, and may protrude further than the outer face. Further, when the end 2a is not exposed to the outer face 13a of the resin frame 13 because melted resin goes around to the end 2a of the terminal tab 2, the end 2a may be exposed, for example, by grinding the resin frame 13.

In addition, since the melted resin will not enter the pores if the pore diameter or porosity of the foamed-metal sintered sheet 11 is too small, there is a fear that a gas-sealing effect and an anchoring effect become insufficient. In contrast, if the pore diameter or porosity is too large, there is a fear that the foamed-metal sintered sheet may be deformed because it cannot endure the molding pressure of the resin or compression during curing of the resin due to its insufficient strength. Accordingly, the foamed-metal sintered sheet 11 has more preferably a pore diameter of about 10 μm to 2 mm, and a porosity of about 40 to 98%.

Further, since the material of the resin frame 13 is simply required to be a material, such as thermoplastic resin or elastomer (including rubber), which can be injection-molded and to have no electrical conductivity and air permeability, it can be appropriately selected in consideration of allowable temperature limit, hardness, and the like. For example, when soft resin is used as the material of the resin frame, the sealing performance against the side portion 11c of the conductive porous body 11 can be improved.

The above embodiment employs a method in which sheet metal is welded to the conductive porous body 11 when the terminal tab 2 is formed. In contrast, the following manufacturing method of a gas diffusion layer member 10 according to other embodiments of the invention can also be adopted.

That is, after a resin frame 13 is formed by insert molding while only a conductive porous body 11 is used as an inserted part, a wiring line is formed on the resin frame 13 by plating, vapor deposition, sputtering or the like such that it extends from the surfaces 11a and 11b and is exposed to the outer face 13a of the resin frame 13, thereby obtaining a terminal tab 2. Accordingly, deformation of the conductive porous body 11 can be suppressed. Further, since the terminal tab 2 is formed on the surface of the resin frame 13, the end 2a can be reliably and easily exposed to the outer face 13a.

Moreover, as another embodiment of the manufacturing method of a gas diffusion layer member 10, the following method can be adopted. In this method, by two-color molding, conductive resin is injection-molded to form a terminal tab 2, and non-conductive resin is injection-molded to form a resin frame 13.

In the gas diffusion layer member 10 manufactured as described above, a flat cell of a polymer electrolyte fuel cell can be configured by forming a catalyst layer on one surface of each of the foamed-metal sintered sheet 11 to use it as an air electrode or a fuel electrode, and then sequentially connecting the terminal tabs 2 with an electrolyte layer therebetween.

The gas diffusion layer member of the invention can also be applied to a polymer electrolyte fuel cell, as shown in FIGS. 64 to 68, of a structure in which a fuel supply part 30 is disposed in the in-plane direction of a gas diffusion layer member.

Figure 64:
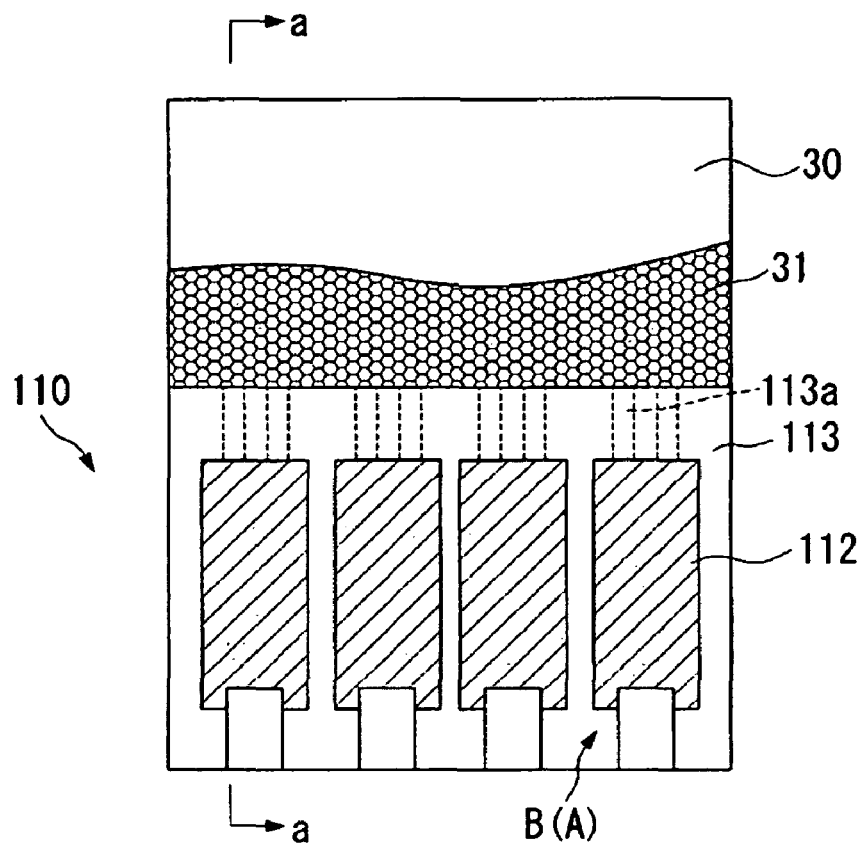
FIG. 64 is a view showing principal parts of a polymer electrolyte fuel cell in which a fuel supply part is disposed in the in-plane direction of the cell member according to Example 7 of the invention.
Figure 65:
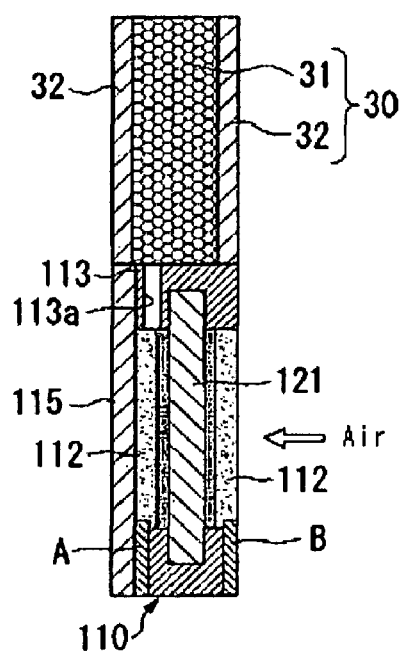
FIG. 65 is a cross-sectional view taken along a line a-a shown in FIG. 64.

In this case, as shown in FIG. 64, a foamed-metal sintered sheets (conductive porous bodies) 112 of the gas diffusion layer member 110 having a fuel electrode A does not come into direct contact with a porous part 31 of the fuel supply part 30. Thus, as shown in FIG. 65 (cross-sectional view taken along the line a-a shown in FIG. 64), communicating holes 113a are provided to pass through a resin frame 113 in the in-plane direction thereof whereby the porous part 31 and the foamed-metal sintered sheets 112 can be communicated with each other through the communicating holes 113a so as to be supplied with fuel, and carbon dioxide gas that is a by-product during power generation can be exhausted.

Moreover, since a plate-shaped member 115 covering the surfaces of the foamed-metal sintered sheets 112 can be attached so as to seal the space between itself and a resin portion 32 of the fuel supply part 30 to prevent fuel from leaking from the foamed-metal sintered sheets 112, for example, it is possible to realize a structure in which the plate-shaped member 115 is disposed on the back surface of a liquid crystal display device, thereby realizing application of the gas diffusion layer member to a thin notebook computer.

Figure 66:
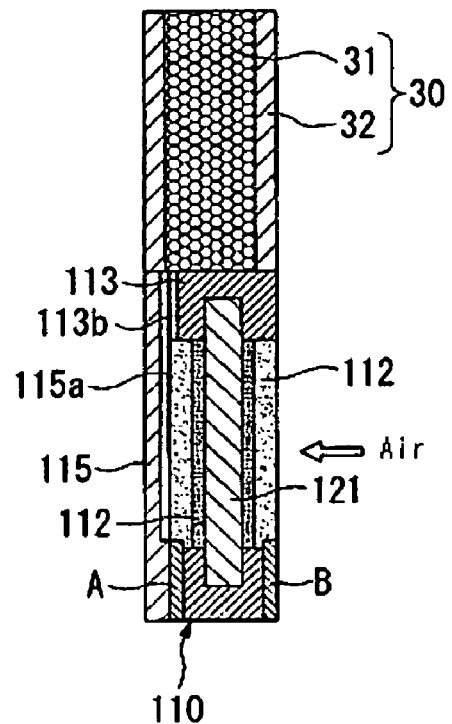
FIG. 66 is a view showing principal parts of a polymer electrolyte fuel cell in which a fuel supply part is disposed in the in-plane direction of the cell member according to Example 7 of the invention.

Further, as a structure in which communicates the porous part 31 with the foamed-metal sintered sheets 112, as shown in FIG. 66, grooves 113a may be provided on the surface of the resin frame 113 so as to extend in the in-plane direction thereof. In this case, if grooves 115a extending in the in-plane direction thereof are also formed on the surface of the plate-shaped member 115 on the side of the gas diffusion layer member 110 so that the grooves 115a can be communicated with the grooves 113a of the resin frame 113 and the surfaces of the foamed-metal sintered sheets 112, fuel can be more efficiently supplied to the surfaces of the foamed-metal sintered sheets 112, and carbon dioxides can be exhausted therefrom.

Figure 67:
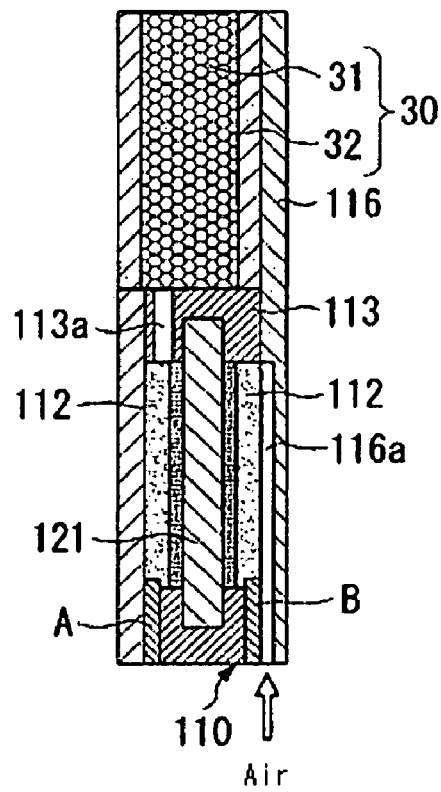
FIG. 67 is a view showing principal parts of a polymer electrolyte fuel cell in which a fuel supply part is disposed in the in-plane direction of the cell member according to Example 7 of the invention.
Figure 68:
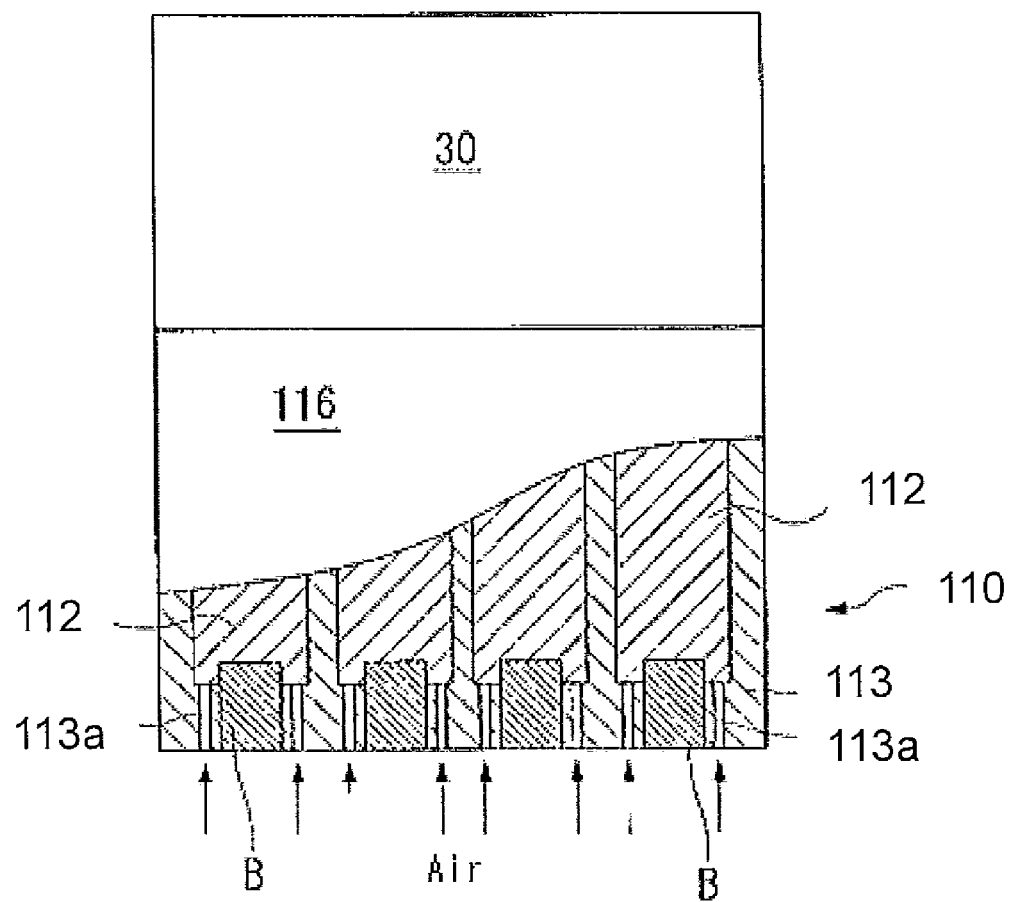
FIG. 68 is a view showing principal parts of a polymer electrolyte fuel cell in which a fuel supply part is disposed in the in-plane direction of the cell member according to Example 7 of the invention.

In addition, as shown FIGS. 67 and 68, when a member, such as a plat-shaped member 116, is disposed at a gas diffusion layer member 110 having an air electrode B so as to cover the surface of foamed-metal sintered sheets (conductive porous bodies) 112, in order to supply the foamed-metal sintered sheets 112 with air, it is advantageous to adopt a structure in which grooves 116a leading to the foamed-metal sintered sheets 112 are formed on the surface of the plat-shaped member 116 (FIG. 67), or grooves 213a are formed on the surface of the resin frame 213 of the gas diffusion layer member 210 (FIG. 68).

Example 3

Figure 15:
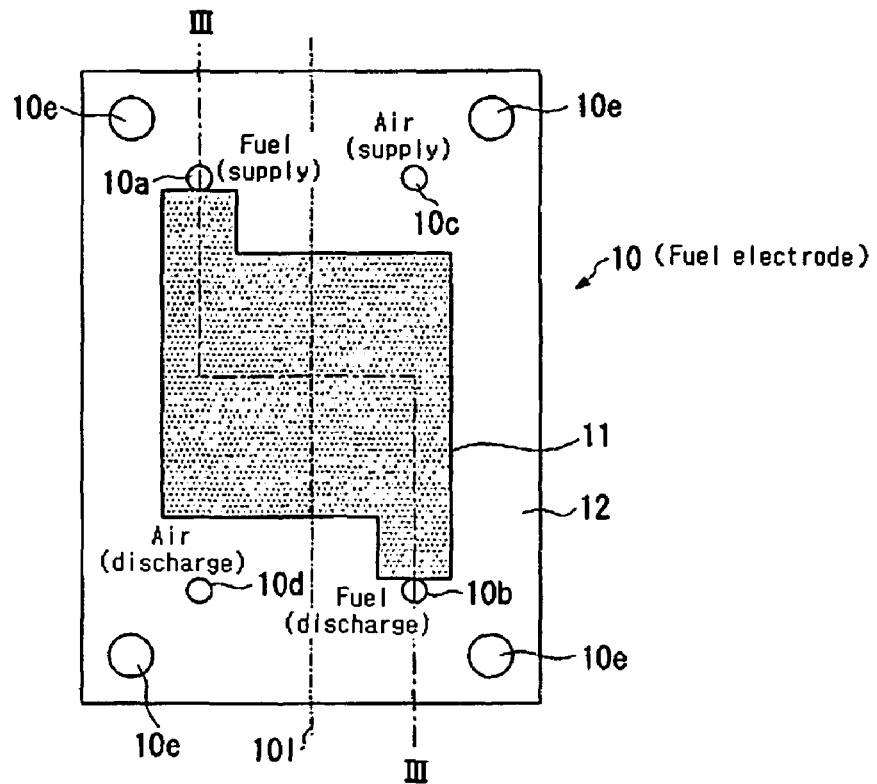
FIG. 15 is a plan view showing a gas diffusion layer member (for a fuel electrode) according to Example 3 of the invention.
Figure 16:
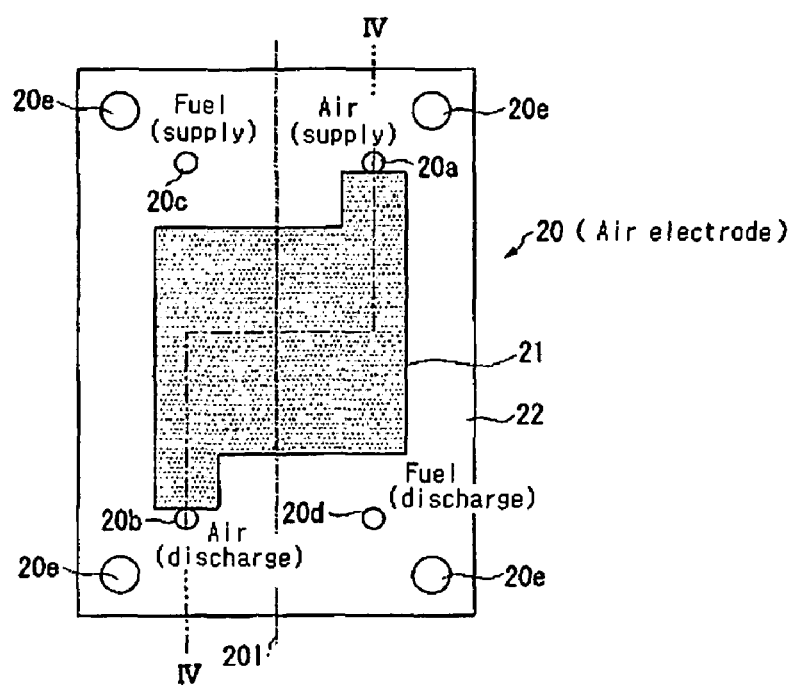
FIG. 16 is a plan view showing a gas diffusion layer member (for an air electrode) according to Example 3 of the invention.

As shown in FIGS. 15 and 16, each of the gas diffusion layer members 10 and 20 according to Example 3 of the invention is a rectangular thin plate-like member in which a gas diffusion electrode 11 or 21 made of a sheet-like conductive porous body and a resin portion 12 or 22 extending in the in-plane direction to cover the periphery of the gas diffusion electrode 11 or 21 are integrally formed with each other.

Figure 17:
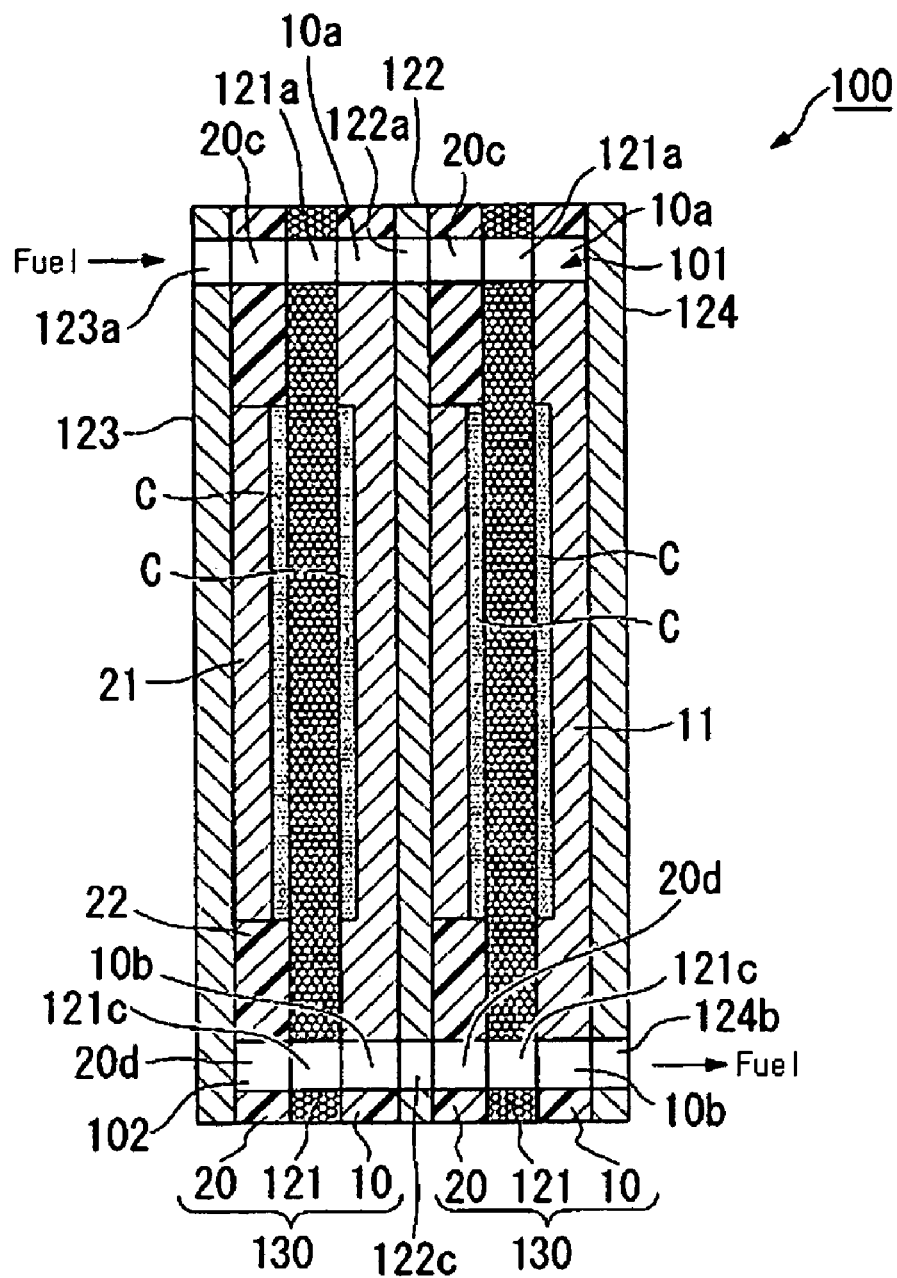
FIG. 17 is a cross-sectional view showing a fuel supply channel and a fuel discharge channel taken along a line III-III shown in FIG. 15 in an example of a stacked type fuel cell according to Example 3 of the invention.
Figure 18:
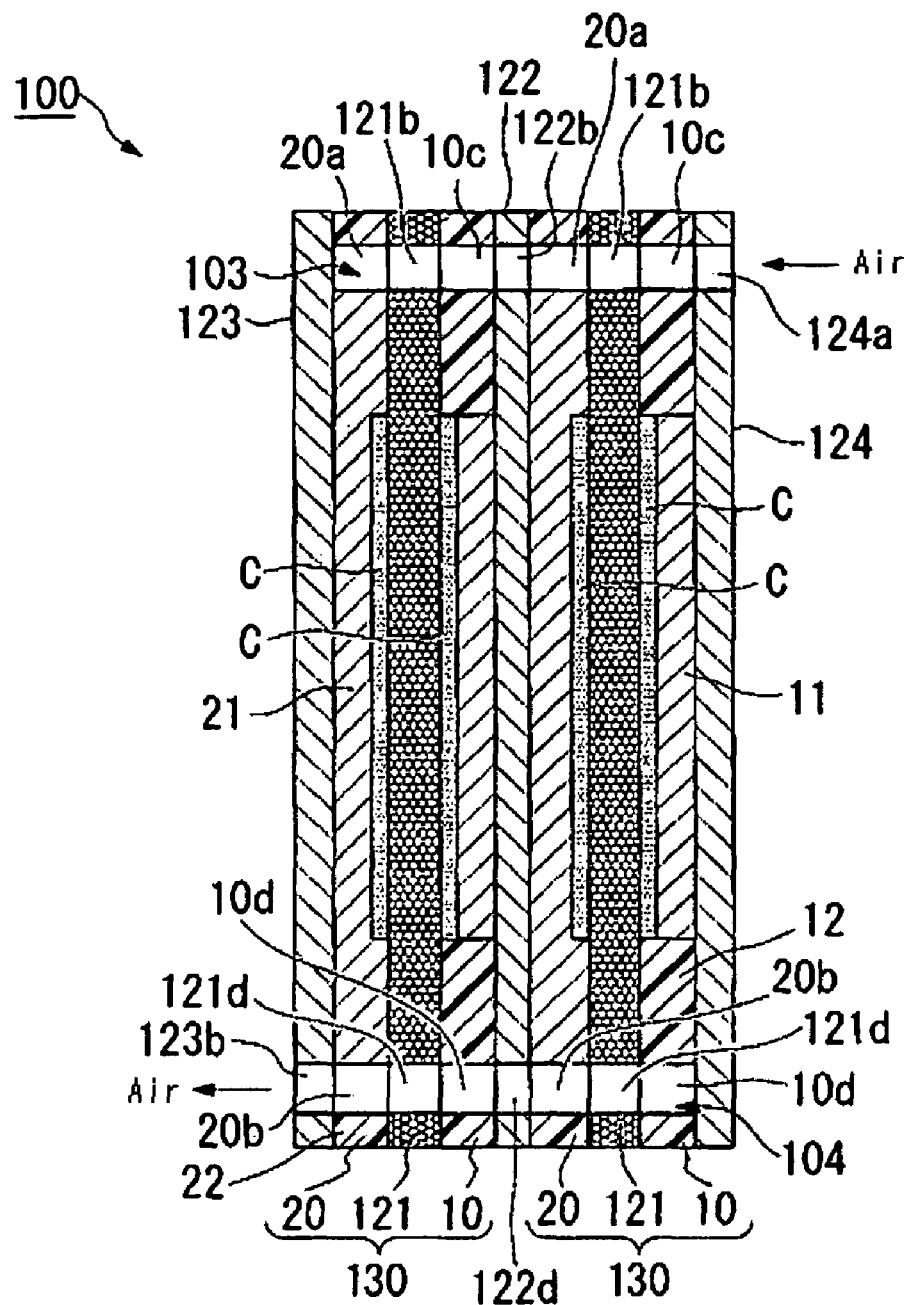
FIG. 18 is a cross-sectional view taken along a line IV-IV shown in FIG. 16 in an example of the stacked type fuel cell according to Example 3 of the invention.

The cross-sections of principal parts of a polymer electrolyte fuel cell 100 of the invention including the gas diffusion layer members 10 and 20 are shown in FIGS. 17 and 18.

The polymer electrolyte fuel cell 100 adopts a stacked structure in which unit cells 130 each having the gas diffusion layer members 10 and 20 and an electrolyte layer 121 are stacked with separator plates 122, 123 and 124 disposed therebetween between. In addition, FIG. 17 is a cross-sectional view taken along a line shown in the gas diffusion layer member 10 of FIG. 15, and FIG. 18 is a cross-sectional view taken along a line IV-IV shown in the gas diffusion layer member 20 of FIG. 16. In FIG. 18, the fuel cell 100 is shown in a different cross-section.

The fuel cell 100 shown in FIGS. 17 and 18 has two sets of unit cells 130 in which the electrolyte layer 121 is disposed between the gas diffusion layer member 10 and the gas diffusion layer member 20 with a catalyst layer C disposed between the electrolyte layer and the gas diffusion layer member 10 or 20. Also, the unit cells 130 are spaced from each other by the separator plate 122, and the outsides of the stacked unit cells 130 are closed by separator plates 123 and 124. In addition, the separator plates 122, 123 and 124 are made of a carbon plate having electrical conductivity, a corrosion-resistant metal plate, or the like without allowing gas or liquid as air or fuel to pass therethrough.

The electrolyte layer 121 is formed of, for example, a fluorocarbon-resin-based polymeric electrolytic membrane, and has a property that hydrogen ions can be migrated in the membrane, while electrons are not allowed to pass through the membrane. The catalyst layer C is provided on an interface (the surface of the gas diffusion electrode 11 or 21 in the present embodiment) between the electrolyte layer 121 and the gas diffusion layer member 10 or 20. The catalyst layer C is formed by coating the surface of the gas diffusion electrode 11 or 21 with a polymeric electrolyte solution containing carbon particles having palladium-based catalyst particles carried therein, and is closely fixed to the electrolyte layer 121 by hot pressing. Further, the electrolyte layer 121 and resin portion 12 or 22 of the gas diffusion layer member 10 or 20 are closely fixed to each other by ultrasonic joining.

The gas diffusion electrode 11 or 21 is a rectangular thin plate made of a conductive porous body having a three-dimensional mesh structure, and has characteristics of being air-permeable by communication between pores opened to the surface in various directions, lightweight and large in surface area.

The resin portion 12 or 22 provided to cover the periphery of the gas diffusion electrode 11 or 21 is formed without any height difference with almost the same thickness as that of the gas diffusion electrode 11 or 21 in the shape of a thin plate connected to the outer peripheral edge of the gas diffusion electrode 11 or 21.

Also, the gas diffusion layer member 10 or 20 in which the gas diffusion electrode 11 or 21 and the resin portion 12 or 22 are integrally formed with each other forms one sheet of a thin plate member as a whole.

In the fuel cells shown in FIGS. 17 and 18, the gas diffusion electrode 11 of the gas diffusion layer member 10 serves as a fuel electrode to which fuel is supplied through a fuel supply channel 101. On the other hand, the gas diffusion electrode 21 of the gas diffusion layer member 20 serves as an air electrode to which air is supplied through an oxygen supply channel 103. Hereinafter, the gas diffusion electrode as the fuel electrode is referred to as fuel diffusion electrode and the gas diffusion electrode as the air electrode is referred to as oxygen diffusion electrode.

As shown in FIG. 15, the gas diffusion layer member 10 is provided with a fuel-supplying through hole (first fluid supply channel) 10a and a fuel-discharging through hole (first fluid discharge channel) 10b, both of which are connected to the fuel diffusion electrode 11 to communicate with the pores thereof, an air-supplying through hole (second fluid supply channel) 10c and an air-discharging through hole (second fluid discharge channel) 10d, both of which are provided at positions away from the fuel diffusion electrode 11 without being connected thereto, and bolt insertion holes 10e which are provided at four corners of the resin portion 12 and through which fixing bolts or the like are inserted. All the above through holes are provided so as to penetrate the resin portion 12.

On the other hand, as shown in FIG. 16, the gas diffusion layer member 20 is provided with an air-supplying through hole (second fluid supply channel) 20a and an air-discharging through hole (second fluid discharge channel) 20b, both of which are connected to the oxygen diffusion electrode 21 to communicate with the pores thereof, a fuel-supplying through hole (first fluid supply channel) 20c and a fuel-discharging through hole (first fluid discharge channel) 20d, both of which are provided at positions away from the oxygen diffusion electrode 21 without being connected thereto, and bolt insertion holes 20e which are provided at four corners of the resin portion 22 and through which fixing bolts or the like are inserted. All the above through holes are provided so as to penetrate the resin portion 22.

The gas diffusion layer members 10 and 20 have the same shape, and can be respectively used as the fuel electrode and the air electrode by reversing their both front and back sides. That is, in the gas diffusion layer member 10 or 20, two through holes that communicate with the fuel diffusion electrode 11 and the oxygen diffusion electrode 21 and two through holes that do not communicate therewith are provided at positions axisymmetrical with respect to a straight line 101 or 201 as an axis of symmetry. In other words, the fuel-supplying/fuel-discharging through holes and the air-supplying/air-discharging through holes are formed symmetrically with respect to the straight lines 101 or 201. Therefore, by reversing one of the two gas diffusion layer members to be stacked, it is possible to communicate the individual through holes with each other by overlapping two gas diffusion layer members, one of which is reversed and in which the through boles to communicate the gas diffusion electrode are switched with the through holes not to communicate with the gas diffusion electrode.

Moreover, the electrolyte layer 121 to be disposed between the gas diffusion layer members 10 and 20 is provided with through holes which communicates with the through holes of the gas diffusion layer members 10 and 20 and the bolt insertion holes. In other words, the electrolyte layer 121 is provided with a fuel-supplying through hole 121a which communicates with the through holes 10a and 20c of the gas diffusion layer members 10 and 20, an air-supplying through hole 121b which communicates with the through holes 10c and 20a, a fuel-supplying through hole 121c which communicates with the through holes 10b and 20d, an air-discharging through hole 121d which communicates with the through holes 10d and 20b, and bolt insertions holes (not shown) which communicate with the bolt insertion holes 10e and 20e.

Further, the separator plate 122 is also provided with through holes that communicate with the through holes of the gas diffusion electrode and the bolt insertion holes. That is, the separator plate 122 is provided with a through hole 122a which communicates with the through holes 10a and 20c of the gas diffusion layer members 10 and 20, a through hole 122b which communicates with the through holes 10c and 20a, a through hole 122c which communicates with the through holes 10b and 20d, a through hole 122d which communicates with the through holes 10d and 20b, and bolt insertion holes (not shown) which communicates with the bolt insertion holes 10e and 20e.

Moreover, the shielding plate 123 which closes the surface of the gas diffusion layer member 20 having an air electrode is provided with a through hole 123a which communicate with the fuel-supplying through hole 20c, and a through hole 123b which communicates with the air-discharging through hole 20b, and bolt insertion holes (not shown) which communicates the bolt insertion holes 20e.

Moreover, the shielding plate 124 which closes the surface of the gas diffusion layer member 10 having a fuel electrode is provides with a through hole 124a which communicate with the air-supplying through hole 10c, and a through hole 124b which communicates with the fuel-discharging through hole 10b, and bolt insertion holes (not shown) which communicates the bolt insertion holes 10e.

The gas diffusion layer members 10 and 20, the electrolyte layer 121, the separator plate 122, and the shielding plates 123 and 124, all of which are stacked such that their through holes are communicated with each other, can be integrally fixed together by inserting bolts through the bolt insertion holes and then fixing the bolts with nuts. In addition, a joined surface between the resin portion 12 or 22 and the separator plate 122 and a joined surface between the resin portion 12 or 22 and the electrolyte layer 121 are closely contacted to each other by ultrasonic joining. Moreover, the surface of the fuel diffusion electrode 11 or the oxygen diffusion electrode 21 and the electrolyte layer 121 are closely contacted to each other by hot pressing.

By stacking the gas diffusion layer members 10 and 20, the electrolyte layer 121, and the separator plates 122, 123 and 124 as described above, the fuel cell 100 is provided with the fuel supply channel 101, a fuel discharge channel 102, the oxygen supply channel 103, and an oxygen discharge channel 104.

The fuel supply channel 101 is formed such that the through hole 123a of the shielding plate 123, the through hole 10a of each gas diffusion layer member 10, the through hole 20c of each gas diffusion layer member 20, the through hole 121a of the electrolyte layer 121, and the through hole 122a of the separator plate 122 communicate with each other.

Further, the fuel discharge channel 102 is formed such that the through hole 10b of each gas diffusion layer member 10, the through hole 20d of each gas diffusion layer member 20, the through hole 122c of the separator plate 122, and the through hole 124b of the shielding plate 124 communicate with each other.

The fuel supply channel 101 and the fuel discharge channel 102 communicate with the fuel diffusion electrode (fuel electrode) 11 of the gas diffusion layer member 10, while they do not communicate with the oxygen diffusion electrode (air electrode) 21 of the gas diffusion layer member 20.

On the other hand, the oxygen supply channel 103 is formed such that the through hole 124a of the shielding plate 124, the through hole 10c of each gas diffusion layer member 10, the through hole 20a of each gas diffusion layer member 20, the through hole 121b of the electrolyte layer 121, and the through hole 122b of the separator plate 122 communicate with each other.

Further, the oxygen discharge channel 104 is formed such that the through hole 10d of each gas diffusion layer member 10, the through hole 20b of each gas diffusion layer member 20, the through hole 122d of the separator plate 122, and the through hole 123b of the shielding plate 123 communicate with each other.

The oxygen supply channel 103 and the oxygen discharge channel 104 communicate with the oxygen diffusion electrode (air electrode) 21 of the gas diffusion layer member 20, while they do not communicate with the fuel diffusion electrode (fuel electrode) 11 of the gas diffusion layer member 10.

Accordingly, the fuel supplied through the through hole 123a of the shielding plate 123 supplies hydrogen to an interface between the electrolyte layer 121 and the catalyst layer C while passing through the communicating pores of the fuel diffusion electrode (fuel electrode) 11. The hydrogen is ionized by an electrode reaction on the catalyst layer C to move toward the oxygen diffusion electrode (air electrode) 21 through the electrolyte layer 121. The fuel after the electrode reaction are discharged to the outside of the fuel cell 100 through the fuel discharge channel 102 from the through hole 124b of the shielding plate 124.

On the other hand, the air supplied from the through hole 124a of the shielding plate 124 supplies oxygen to an interface between the electrolyte layer 121 and the catalyst layer C while passing through the communicating pores of each oxygen diffusion electrode (air electrode) 21, and is discharged through the oxygen discharge channel 104 along with water generated by a reaction.

Then, the hydrogen that has reached the oxygen diffusion electrode (air electrode) 21 disposed on the other side of the electrolyte layer 121 from the fuel diffusion electrode (fuel electrode) 11 electrode-reacts with the oxygen of the air supplied to the oxygen diffusion electrode 21, on the interface between the electrolyte layer 121 and the catalyst layer C, thereby generating water.

On the other hand, electrons generated by the ionization of hydrogen moves through a circuit (not shown) provided outside of the gas diffusion layer members 10 and 20 to the oxygen diffusion electrode (air electrode) 21 from the fuel diffusion electrode (fuel electrode) 11. This movement of the electrons makes it possible to generate electric energy.

Meanwhile, although a carbon porous body called as carbon paper or carbon cloth may be used as the conductive porous body for forming the gas diffusion electrode 11 or 21, it is desirable to use a metallic porous body having a three-dimensional mesh structure, which are excellent in both gas diffusivity and electrical conductivity, for example, a metal-powder sintered sheet, a metallic non-woven fabric, a stacked mesh, or the like. Among these, the metal-powder sintered sheet of which porosity or thickness can be appropriately adjusted and available raw material metals are also various is more suitable as the conductive porous body of the gas diffusion layer member.

Furthermore, a foamed-metal sintered sheet obtained by adding a binder, a solvent and the like to a metal powder to knead them, then mixing the kneaded material with a foaming agent to obtain a foaming slurry, and then sintering the slurry after foamed molding thereof is more preferable because it can be manufactured with a high porosity.

The foamed-metal sintered sheet of which porosity or thickness can be appropriately adjusted and available raw material metals are also various is adopted in the present embodiment.

Hereinafter, a manufacturing method of the foamed-metal sintered sheet will be described with reference to FIG. 12.

The foamed-metal sintered sheet is obtained by adding a binder, a solvent and the like to a metal powder to knead them, then mixing the kneaded material with a foaming agent to obtain a foaming slurry S, and then sintering the slurry after foamed molding thereof.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based organic solvent with five to eight carbons (for example, neopentane, hexane, and heptane)) that are evaporated or sublimated by heating treatment or a defoaming agent (ethanol) can be added if needed. FIG. 12 shows a green-sheet manufacturing apparatus 80 that molds the slurry S thinly by the doctor blade method.

In the green-sheet manufacturing apparatus 80, first, the slurry S is supplied from a hopper 81 that stores the slurry S onto a carrier sheet 83. The carrier sheet is conveyed by rollers 82, and the slurry S on the carrier sheet 83 is extended between the carrier sheet 83 to be moved and a doctor blade 84 so as to be formed with a required thickness.

The molded slurry S is further conveyed by the carrier sheet 83 to pass through a foaming bath 85 and a heating furnace 86 performing heat treatment sequentially. In the foaming bath 85, the slurry is subjected to heating treatment in a high humidity atmosphere. Thus, the slurry S can be foamed with a foaming agent without being cracked. Then, when the slurry S having cavities formed by the foaming is dried in the heating furnace 86, a green sheet G in which metal powder particles defining the cavities among them are joined together by an organic binder is formed.

After the green sheet G is detached from the carrier sheet 82, it is degreased and calcinated in a vacuum furnace (not shown) whereby the organic binder is removed to form a foamed-metal sintered sheet (conductive porous body) having a three-dimensional mesh structure in which the metal powder particles are sintered together.

By performing insert molding with use of a plurality of conductive porous bodies obtained by cutting the thus formed conductive porous body in a predetermined shape as an inserted part, it is possible to manufacture the gas diffusion layer member 10 or 20 in which the gas diffusion electrode 11 or 21 made of the conductive porous body and the resin portion 12 or 22 are integrally formed.

Figures 3, 4:
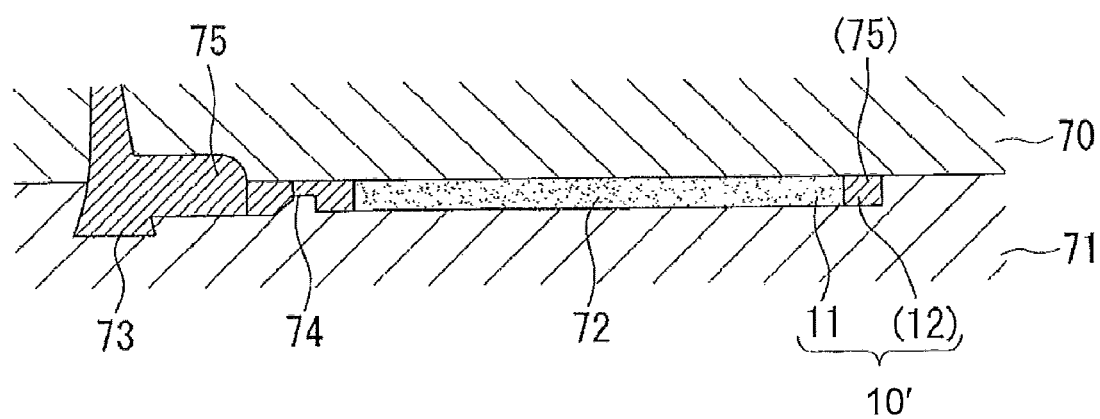
FIG. 3 is a schematic diagram showing a manufacturing method of the composite porous body according to Example 1 of the invention.
FIG. 4 shows the results of a verification test for the effects resulting from the composite porous body and its manufacturing method according to Example 1 of the invention.

That is, by disposing, as an inserted part, a conductive porous body within a cavity 72 defined between a pair of molds 70 and 71 as shown in FIG. 3 and filling the interior of the cavity 72 with a melted resin 75 injected through a gate 74 from a runner 72, a gas diffusion layer member 10 (gas diffusion layer member 20) is formed in which a fuel diffusion electrode 11 (oxygen diffusion electrode 21) made of the conductive porous body and a resin portion 12 (resin portion 22) are integrated into one body. The fuel diffusion electrode 11 and the resin portion 12 are securely joined together by impregnation and curing of the melted resin into the pores opened to the side portion of the fuel diffusion electrode 11 to a depth of about 5 μm to 1000 μm. The through holes that penetrate the resin portion 12 (resin portion 22) can be formed by molds during the injection molding.

For example, if polypropylene is used as the material of the resin portion 12, a composite porous body 10' is obtained when molds are clamped together with 80 kN at a molding temperature of 180° C., and injection molding is performed at a molding pressure of 250 kg/cm$^2$.

In addition, when the gas diffusion layer member 10 or 20 is formed by insert molding, the thickness of the cavity 72 (the size of the cavity in a direction that molds are opened or closed) at the time of closing of the molds is slightly smaller than that of the gas diffusion electrode 11 or 21, and thus the gas diffusion electrode 11 or 21 is compressed up to 3 to 90% between the molds 70 and 71 at the time of closing of the molds. In this case, the gas diffusion electrode 11 or 21 can be fixed to the cavity 73 against the injection molding pressure, and the flatness of a surface of the gas diffusion electrode 11 or 21 can be improved.

Further, if the pore diameter or porosity of the gas diffusion electrode 11 or 21 is too small, melted resin will not enter the pores. Thus, there is a fear that the anchoring effect becomes insufficient so that the joining strength between the gas diffusion electrode and the resin portion 12 or 22 cannot be sufficiently obtained, which leads to peeling in a joined portion between the gas diffusion electrode and the resin portion. On the other hand, if the pore diameter or porosity is too large, there is a fear that the gas diffusion electrode may be deformed because it cannot endure the molding pressure of the resin or compression during curing of the resin due to its insufficient strength. Accordingly, the gas diffusion electrode has more preferably a pore diameter of about 10 μm to 2 mm, and a porosity of about 40 to 98%.

Further, since the material of the resin portion 12 or 22 is not particularly limited as long as it is a material, such as thermoplastic resin or elastomer, which can be injection-molded, it can be appropriately selected according to use in consideration of allowable temperature limit, hardness, and the like.

In addition, the shapes or combinations of these members shown in the above-described embodiments are just exemplary. Therefore, various modifications may be made thereto on the basis of design requirements without departing from the sprit and scope of the invention.

For example, in the above embodiment, the supply channels or discharge channels of fuel or air are formed by communicating the through holes penetrating the resin portion with each other. However, it is possible to adopt a structure in which grooves communicating an outer edge of the resin portion with the gas diffusion electrode is formed in the surface of the resin portion, and the grooves is used as the supply channels or discharge channels to forcibly feed air or fuel by a pump or the like.

Further, the above embodiment adopts the structure in which the catalyst layer C is coated on the surface of the gas diffusion electrode. However, for example, a product in which catalyst slurry is impregnated in carbon paper (conductive porous body) may be disposed as a catalyst layer between an electrolyte layer and a gas diffusion electrode. In this case, if a fuel cell is configured such that the catalyst layer (carbon paper) is joined to the electrolyte layer by hot pressing and it applies pressure to the gas diffusion electrode (foamed-metal sintered sheet) so as to touch it, electrons or fluid (fuel or oxygen) can be circulated smoothly.

Example 4

Figure 19:
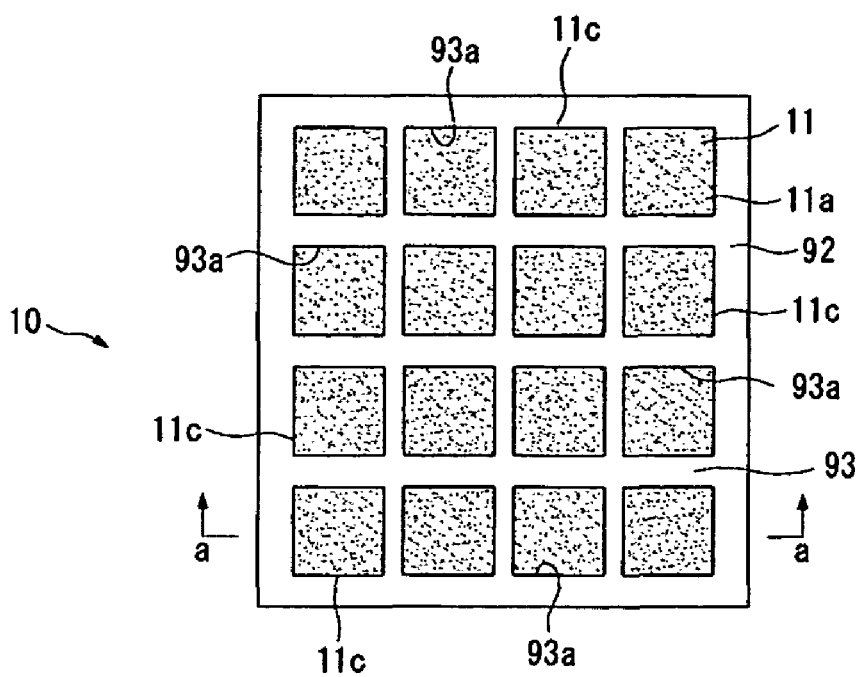
FIG. 19 is a plan view showing the oxygen supply surface of a gas diffusion layer member according to a first embodiment in Example 4 of the invention.
Figure 20:
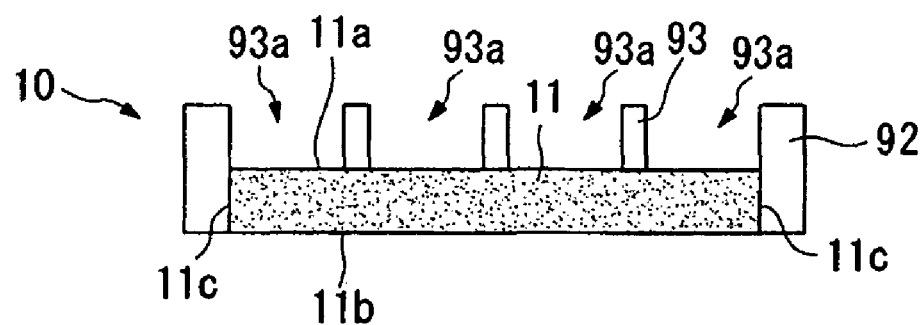
FIG. 20 is a cross-sectional view taken along a line a-a oxygen supply surface in FIG. 19.
Figure 21:
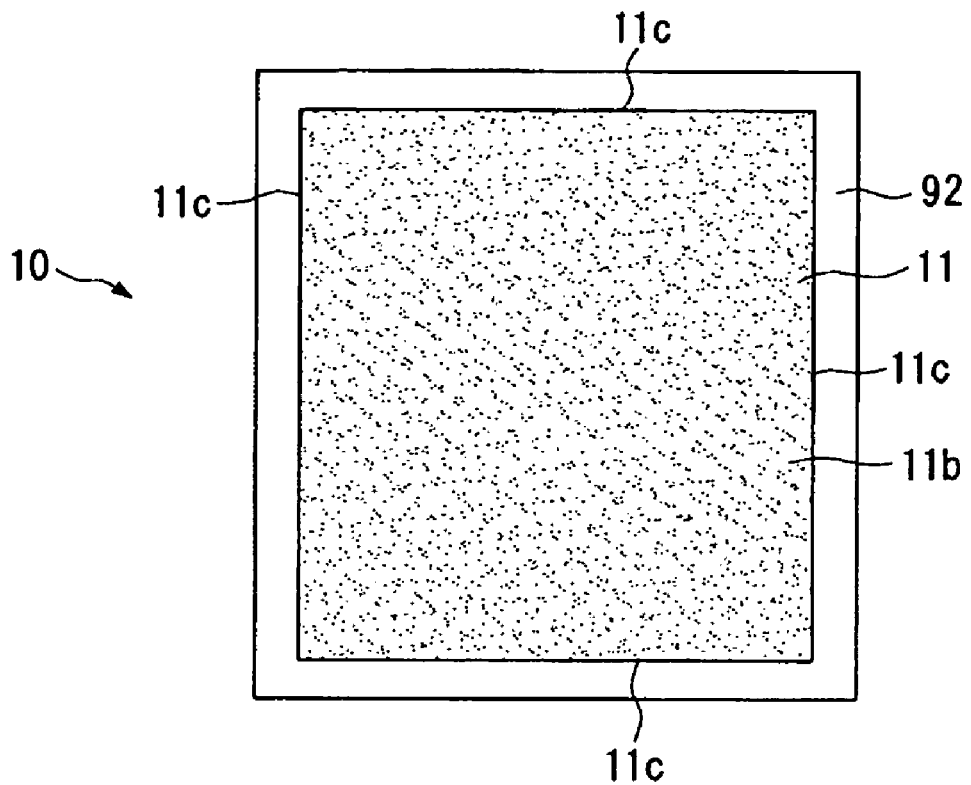
FIG. 21 is a plan view showing the fuel supply surface of the gas diffusion layer member shown in FIG. 19.

FIGS. 19 to 21 shows a gas diffusion layer member 10 according to a first embodiment of Example 4 of the invention. The gas diffusion layer member 10 includes a sheet-like oxygen diffusion electrode 11, a resin portion 92 which is provided at a side portion 11c of the oxygen diffusion electrode (conductive porous body) 11 and made of a non-conductive material, and a lattice-shaped frame portion 93 which is provided on one surface (oxygen supply surface) 11a of the oxygen diffusion electrode 11.

The oxygen diffusion electrode 11 provided in the gas diffusion layer member 10 is made of a conductive porous material having a three-dimensional mesh structure, and has one surface serving as an oxygen supply surface 11a and the other surface serving as an electrode surface 11b. In addition, in the present embodiment, a foamed-metal sintered sheet of which porosity or thickness can be appropriately adjusted and available raw material metals are also various can be adopted as the conductive porous material. The foamed-metal sintered sheet is obtained by adding a binder, a solvent and the like to a metal powder to knead them, then mixing the kneaded material with a foaming agent to obtain a foaming slurry S, and then sintering the slurry after foamed molding thereof.

The resin portion 92 is integrally formed with the oxygen diffusion electrode 11 with use of a non-conductive resin material, and coats the side portion 11c of the oxygen diffusion electrode 11.

Similar to the resin portion 92, the lattice-shaped frame portion 93 is integrally formed with the oxygen diffusion electrode 11 and the resin portion 92 with use of a non-conductive resin material, and provided on the side of the oxygen supply surface 11a of the oxygen diffusion electrode 11. The lattice-shaped frame portion 93 is a lattice-shaped framework disposed on the surface of the oxygen supply surface 11a, and has an arrangement in which a plurality of openings 93a are formed to open the oxygen supply surface 11a to the outside as shown in FIG. 19 and FIG. 20 (cross-sectional view taken along a line a-a shown in FIG. 19).

That is, the outer edge of the gas diffusion layer member 10 is protected by the resin portion 92, and as shown in FIG. 19, the oxygen supply surface 11a is protected by the lattice-shaped frame portion 93, while as shown in FIG. 21, the entire electrode surface 11b is opened.

Figure 22:
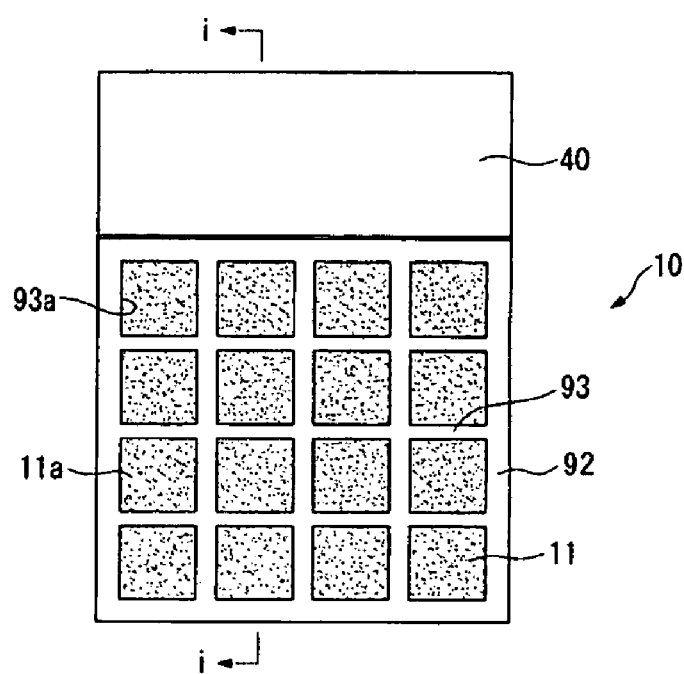
FIG. 22 is a plan view showing the oxygen supply surface of principal parts of a polymer electrolyte fuel cell in which an air electrode is constituted with the gas diffusion layer member shown in FIG. 19.
Figure 23:
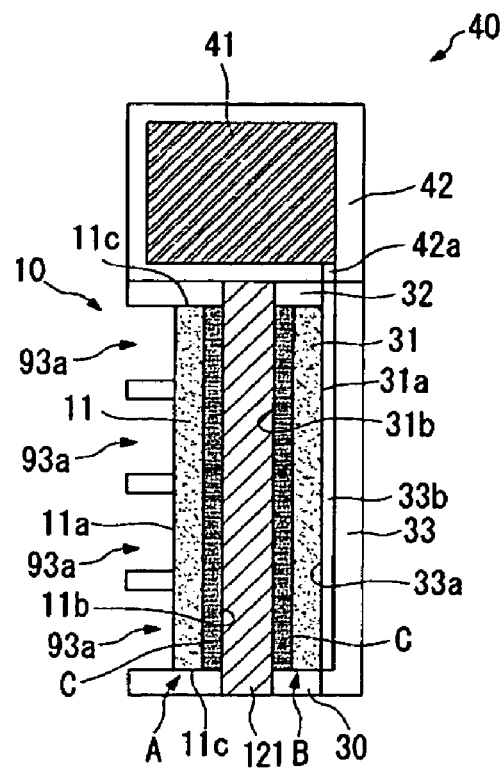
FIG. 23 is a cross-sectional view taken along a line i-i shown in FIG. 22.

Principal parts of a polymer electrolyte fuel cell to which the gas diffusion layer members 10 are applied are shown in FIG. 22 and FIG. 23 (cross-sectional view taken along a line i-i shown in FIG. 22). The polymer electrolyte fuel cell adopts a structure in which an air electrode A and a fuel electrode B are arranged to sandwich an electrolyte layer 121 therebetween, and a fuel supply part 40 is provided to hold and supply fuel (here, a methanol aqueous solution). The electrolyte layer 121 is formed of, for example, a fluorocarbon-resin-based polymeric electrolytic membrane, and has a property that hydrogen ions are migrated in the membrane, while electrons are not allowed to pass through the membrane.

The air electrode A is composed of the gas diffusion layer member 10 of the present embodiment, and is disposed such that the electrode surface 11b faces the electrolyte layer 121. The electrode surface 11b is provided with a catalyst layer C coated with a polymeric electrolyte solution containing carbon particles having palladium-based catalyst particles carried therein. The electrode surface 11b (catalyst layer C) of the oxygen diffusion electrode 11 and the electrolyte layer 121 are closely fixed to each other by hot pressing. Further, the air electrode A allows the air (oxygen) supplied to the oxygen diffusion electrode 11 through the openings 93a of the lattice-shaped frame portion 93 to reach the electrolyte layer 121.

The fuel electrode B is composed of a flat plate-shape gas diffusion layer member 30. The gas diffusion layer member 30 includes a fuel diffusion electrode 31 made of the same foamed-metal sintered sheet as that of the air electrode A and disposed so as to oppose the oxygen diffusion electrode 11, and a resin portion 32 which covers a side portion of the fuel diffusion electrode 31. The resin portion 32 is integrally formed with the fuel diffusion electrode 31 with use of resin having no electrical conductivity and air permeability.

The fuel diffusion electrode 31 has one surface serving as a fuel supply surface 31a and the other surface serving as an electrode surface 31b, and similar to the oxygen diffusion electrode 11, a catalyst layer C coated with a polymeric electrolyte solution containing carbon particles having palladium-based catalyst particles carried therein is provided on the electrode surface 31b. The electrode surface 31b (catalyst layer C) of the fuel diffusion electrode 31 and the electrolyte layer 121 are closely fixed to each other by hot pressing.

The gas diffusion layer member 30 is disposed such that the electrode surface 31b of the fuel diffusion electrode 31 faces the electrolyte layer 121, and the entire fuel supply surface 31a is closed by a closure plate 33 disposed on the back surface of the gas diffusion layer member. Similar to the resin portion 32, the closure plate 33 is made of resin having no electrical conductivity and air permeability. The inner surface 33a facing the fuel diffusion electrode 31 is provided with a fuel supply groove 33b which defines a space with the fuel supply surface 31a of the fuel diffusion electrode 31 to circulate fuel. Also, the resin portion 32 and the closure plate 33 are closed fixed to each other by ultrasonic joining.

The fuel supply part 40 has a structure in which a porous part 41 made of felt holding fuel (here, a methanol aqueous solution) and supplying it to the fuel diffusion electrode 31 of the fuel electrode B is coated with a resin frame 42. Accordingly, the fuel held in the porous part 41 can be supplied to the fuel diffusion electrode 31 through the fuel supply groove 33b from a fuel supply channel 42a provided in the resin frame 42 of the fuel supply part 40. The resin frame 42 of the fuel supply part 40 and the gas diffusion layer member 30, and the resin portion 32 and the closure plate 33 are closely fixed to each other by ultrasonic joining.

In the fuel cell having the above-described configuration, each of the oxygen diffusion electrode 11 of the air electrode A and the fuel diffusion electrode 31 of the fuel electrode B is a member serving as both the gas diffusion layer and the collector plate because it has electrical conductivity and air permeability by virtue of the three-dimensional mesh structure.

Electrical energy is generated in the fuel cell by the following reaction.

That is, the hydrogen in the fuel supplied to the fuel diffusion electrode 31 (fuel electrode B) from the fuel supply part 40 is ionized by an electrode reaction on the catalyst layer C to move toward the oxygen diffusion electrode 11 (air electrode A) through the electrolyte layer 121. Then, the hydrogen which has reached the oxygen diffusion electrode 11 (air electrode A) disposed on the other side of the electrolyte layer 121 reacts with the oxygen in the air supplied from the oxygen supply surface 11a of the oxygen diffusion electrode 11, on the interface between the electrolyte layer 121 and the catalyst layer C, thereby generating water.

On the other hand, electrons generated by the ionization of hydrogen moves through a circuit (not shown) provided outside of the gas diffusion layer member 30 to the air electrode A (oxygen diffusion electrode 11) from the fuel electrode B (fuel diffusion electrode 31). This movement of the electrons makes it possible to generate electric energy.

Furthermore, in this case, the catalyst layer C is coated on the surfaces of the oxygen diffusion electrode 11 and the fuel diffusion electrode 31. However, the catalyst layer C may be formed on the surface of the electrolyte layer 121 as long as it is provided on the interface between the oxygen diffusion electrode 11 or fuel diffusion electrode 31 and the electrolyte layer 121.

Figure 24:
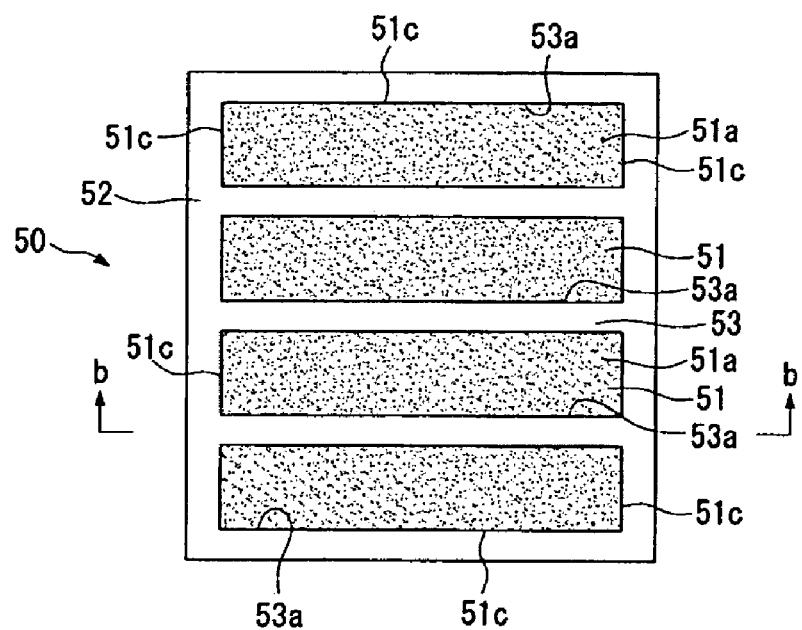
FIG. 24 is a plan view showing the oxygen supply surface of a gas diffusion layer member according to a second embodiment in Example 4 of the invention.
Figure 25:
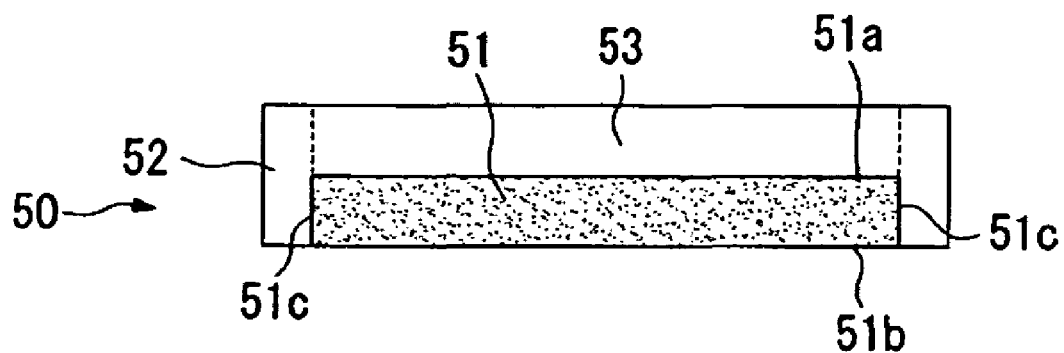
FIG. 25 is a cross-sectional view taken along a line b-b shown in FIG. 24.
Figure 26:
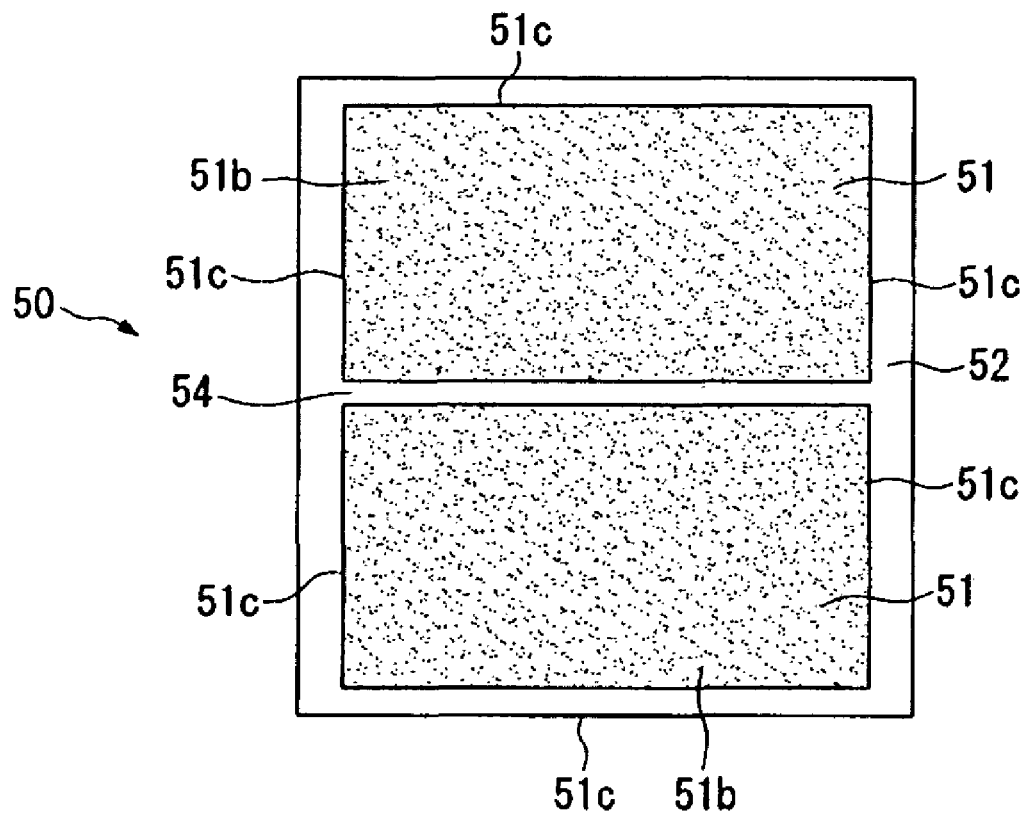
FIG. 26 is a plan view showing the fuel supply surface of the gas diffusion layer member shown in FIG. 24.

Next, FIGS. 24 to 26 show a gas diffusion layer member 50 according to a second embodiment of Example 4 of the invention. The gas diffusion layer member 50 includes two split sheet-like oxygen diffusion electrodes 51 and 51, a resin portion 52 provided at a side portion 51c of each oxygen diffusion electrode 51 and made of a non-conductive material, a lattice-shaped frame portion 53 provided on the one surface 51a (oxygen supply surface) of each oxygen diffusion electrode 51, and a connecting part 54 which connects the oxygen diffusion electrodes 51 and 51 with each other.

Similar to the oxygen diffusion electrode 11, each oxygen diffusion electrode 51 provided in the gas diffusion layer member 50 is made of a conductive porous material (foamed-metal sintered sheet) having a three-dimensional mesh structure, and has one surface serving an oxygen supply surface 51a and the other surface serving as an electrode surface 51b.

Similar to the resin portion 92, the resin portion 52 is also integrally formed with the oxygen diffusion electrode 51 with use of non-conductive resin, and coats the side portion 51c of the oxygen diffusion electrode 51.

Similar to the resin portion 52, the lattice-shaped frame portion 53 is integrally formed with the oxygen diffusion electrode 51 and the resin portion 52 with use of non-conductive material, and is provided on the oxygen supply surface 51a of the oxygen diffusion electrode 51. The lattice-shaped frame portion 53 is a lattice-shaped framework disposed on the surface of the oxygen supply surface 51a, and has an arrangement in which a plurality of openings 53a are formed to open the oxygen supply surface 51a to the outside as shown in FIG. 24 and FIG. 25 (cross-sectional view taken along a line b-b shown in FIG. 24).

Unlike the gas diffusion layer member 10 of the first embodiment, the gas diffusion layer member 50 of the present embodiment is configured such that the two split oxygen diffusion electrodes 51 are provided and the oxygen diffusions electrodes 51 and 51 are connected to each other by the connecting part 54 so as to be integrally fixed to each other. Similar to the resin portion 52 and the lattice-shaped frame portion 53, the connecting part 54 is integrally formed with the oxygen diffusions electrodes 51 and the resin portion 52 with use of non-conductive resin. That is, the outer edge of the gas diffusion layer member 50 of the present embodiment is protected by the resin portion 52, and as shown in FIGS. 24 and 25, the oxygen supply surface 51a is provided by the lattice-shaped frame portion 53, while as shown in FIG. 26, the entire electrode surface 51b is opened. In the polymer electrolyte fuel cell constituting the air electrode with use of the gas diffusion layer member 50, a gas diffusion layer member having two fuel diffusion electrodes is also disposed in the fuel electrode whereby the pair of gas electrode layer members can form two sets of unit cells arranged in the in-plane direction.

In addition, in order to connect unit cells to each other in series or in order to form electrodes of a cell, the gas diffusion layer member may be provided with terminals (not shown). The terminals can be formed, for example, by joining strip-shaped metallic foil to a conductive porous body by resistance welding or the like.

Figure 27:
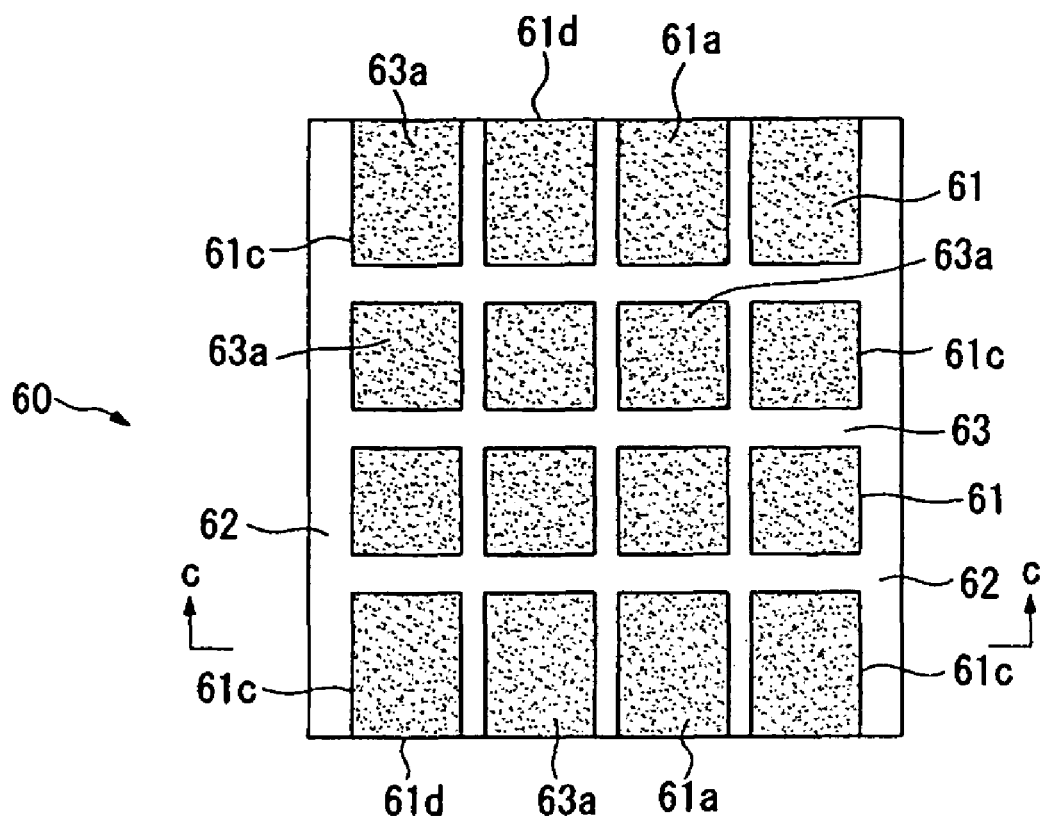
FIG. 27 is a plan view showing the oxygen supply surface of a gas diffusion layer member according to a third embodiment in Example 4 of the invention.
Figure 28:
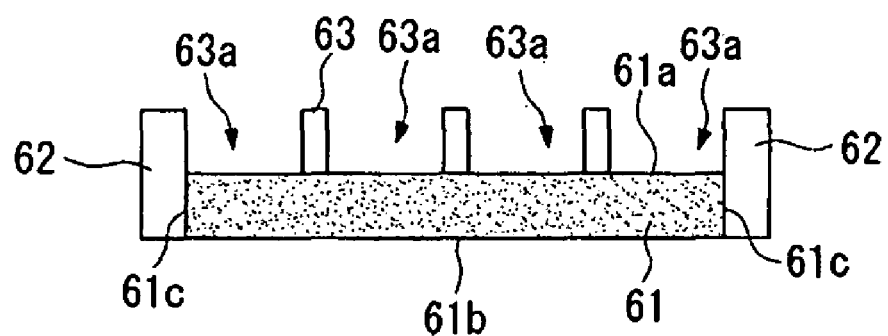
FIG. 28 is a cross-sectional view taken along a line c-c shown in FIG. 28.
Figure 29:
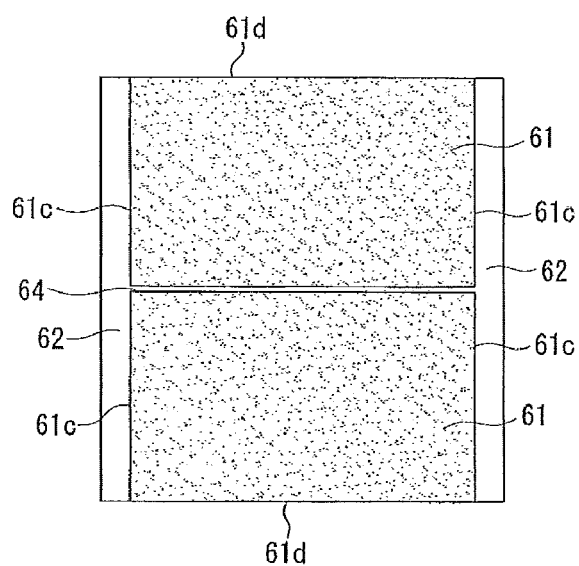
FIG. 29 is a plan view showing the fuel supply surface of the gas diffusion layer member shown in FIG. 27.

FIGS. 27 to 29 show a gas diffusion layer member 60 according to a third embodiment of Example 4 of the invention. Similar to the second embodiment, the gas diffusion layer member 60 includes two-split sheet-like oxygen diffusion electrodes 61 and 61, resin portions 62 provided at two side portions 61c of each oxygen diffusion electrode 61 and made of a non-conductive material, a lattice-shaped frame portion 63 provided at the one surface 61a (oxygen supply surface) of each oxygen diffusion electrode 61, and a connecting part 64 which connects the oxygen diffusion electrodes 61 and 61 with each other.

That is, two side edges of the gas diffusion layer member 60 of the present embodiment are protected by the resin portions 62, and end faces of the oxygen diffusion electrode 61 opened without providing any resin portion in the remaining two side portions 61d and 61d. Also, as shown in FIG. 27 and FIG. 28 (cross-sectional view taken along a line c-c shown in FIG. 27), the oxygen supply surface 61a is opened through openings 63a while being protected by the lattice-shaped frame portion 63, while as shown in FIGS. 28 and 29, an entire electrode surface 61b is opened. In the polymer electrolyte fuel cell constituting the air electrode with use of the gas diffusion layer member 60, a gas diffusion layer member having two fuel diffusion electrodes is also disposed in the fuel electrode whereby the pair of gas electrode layer members can form two sets of unit cells arranged in the in-plane direction. Moreover, in the gas diffusion layer member 60 of the present embodiment, since the side portions 61d of the oxygen diffusion electrodes 61 are exposed to the outside, the side portion 61d can be used to form wiring lines connecting the oxygen diffusion electrodes 61.

Hereinafter, a manufacturing method of the gas diffusion layer member 10 of Example 4 of the invention will be described referring to FIG. 30.

The gas diffusion layer member 10 is manufactured as an integral part by performing insert-molding using a conductive porous body as an inserted part, and by forming other portions (resin portion 92 and lattice-shaped frame portion 93) using the conductive porous body as the oxygen diffusion electrode 11.

Figure 30:
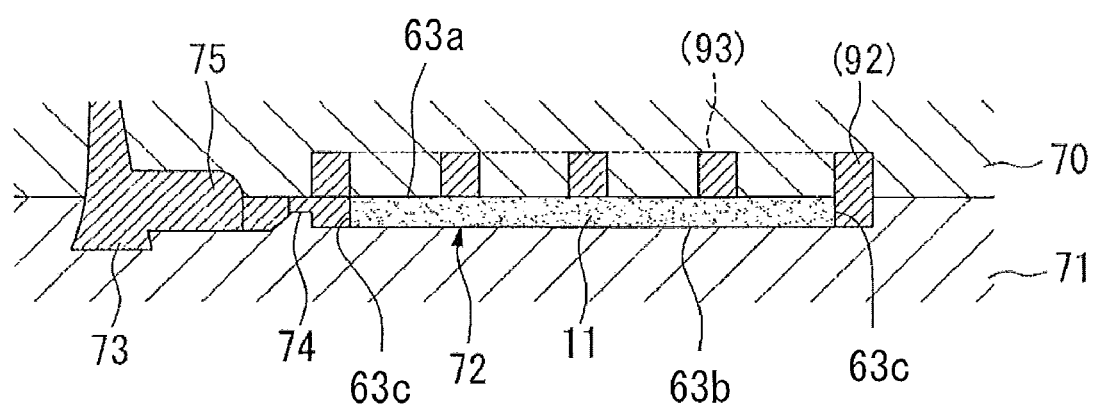
FIG. 30 is a schematic diagram showing a section of principal parts of injection molds for manufacturing the gas diffusion layer member shown in FIG. 19.

FIG. 30 shows molds for the insert molding. By disposing a conductive porous body as an inserted part within a cavity 72 defined between a pair of molds 70 and 71 and filling the interior of the cavity 72 with a melted resin 75 injected through a gate 74 from a runner 73, a gas diffusion layer member 10 is formed in which a conductive porous body 11 and resin portions (resin portion 92 and lattice-shaped frame portion 93) are integrated into one body. Since the melted resin is impregnated into and cured in the pores opened to the side portion of the conductive porous body 11 to a depth of about 5 μm to 1000 μm, the fuel diffusion electrode 11 and the resin portions (resin portion 92 and lattice-shaped frame portion 93) are more securely joined together by an anchoring effect.

In addition, injection molding conditions such as injection pressure and molding temperature are selected according to kinds of resin. For example, if the injection pressure is too high, a conductive porous body cannot exhibit its function as a porous body well because the resin may be excessively filled in the conductive porous body, which deteriorates the air permeability. Further, for example, when thermoplastic resin is used, surfaces of molds touching the thermoplastic resin are partially cooled, and when thermosetting resin such as silicon rubber is used, infiltration of resin into a conductive porous body can be controlled by partially heating the surfaces of the molds.

In addition, if the pore diameter or porosity of the conductive porous body 11 is too small, melted resin will not enter the pores. Thus, there is a fear that the anchoring effect becomes insufficient. On the other hand, if the pore diameter or porosity is too large, there is a fear that the conductive porous body may be deformed because it cannot endure the molding pressure of the resin or compression during curing of the resin due to its insufficient strength. Accordingly, the conductive porous body 11 has more preferably a pore diameter of about 10 μm to 2 mm, and a porosity of about 40 to 98%.

Further, since the material of the resin portion 92 and the lattice-shaped frame portion 93 is simply required to be a material, such as thermoplastic resin or elastomer (including rubber), which can be injection-molded, and not to have electrical conductivity, it can be appropriately selected in consideration of allowable temperature limit, hardness, and the like. For example, when soft resin is used, the sealing performance against the side portion of the conductive porous body can be improved.

Next, the material of oxygen diffusion electrode 11 will be described. Although a carbon porous body called as carbon paper or carbon cloth may be used as the conductive porous body for forming the oxygen diffusion electrode 11, it is desirable to use a metallic porous body having a three-dimensional mesh structure, which are excellent in both gas diffusivity and electrical conductivity, for example, a metal-powder sintered sheet, a metallic non-woven fabric, a stacked mesh, or the like. Among these, the metal-powder sintered sheet of which porosity or thickness can be appropriately adjusted and available raw material metals are also various is more suitable as the conductive porous body of the gas diffusion layer member. Furthermore, a foamed-metal sintered sheet obtained by adding a binder, a solvent and the like to a metal powder to knead them, then mixing the kneaded material with a foaming agent to obtain a foaming slurry, and then sintering the slurry after foamed molding thereof is more preferable because it can be manufactured with a high porosity.

Hereinafter, a manufacturing method of a foamed-metal sintered sheet suitable for the oxygen diffusion electrode 11 will be described. For example, the foamed-metal sintered sheet can be manufactured by calcinating the resulting green sheet G that is obtained by molding slurry S containing a metal powder thinly, and drying it.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based organic solvent with five to eight carbons (for example, neopentane, hexane, and heptane)) that is evaporated or sublimated by heating treatment or a defoaming agent (ethanol) can be added if needed. FIG. 12 shows a green-sheet manufacturing apparatus 80 that molds the slurry S thinly by the doctor blade method.

In the green-sheet manufacturing apparatus 80, first, the slurry S is supplied from a hopper 81 that stores the slurry S onto a carrier sheet 83. The carrier sheet 83 is conveyed by rollers 82, and the slurry S on the carrier sheet 83 is extended between the carrier sheet 83 to be moved and a doctor blade 84 so as to be formed with a required thickness.

The molded slurry S is further conveyed by the carrier sheet 83 to pass through a foaming bath 85 and a heating furnace 86 performing heat treatment sequentially. In the foaming bath 85, the slurry is subjected to heating treatment in a high humidity atmosphere. Thus, the slurry S can be foamed with a foaming agent without being cracked. Then, when the slurry S having cavities formed by the foaming is dried in the heating furnace 86, a green sheet G in which metal powder particles defining the cavities among them are joined together by an organic binder is formed.

After the green sheet G is detached from the carrier sheet 83, it is degreased and calcinated in a vacuum furnace (not shown) whereby the organic binder is removed to form a foamed-metal sintered sheet (conductive porous body 11) of a three-dimensional mesh structure in which the metal powder particles are sintered together.

In addition, the shapes or combinations of these members shown in the above-described embodiments are just exemplary. Therefore, various modifications may be made thereto on the basis of design requirements without departing from the sprit and scope of the invention. For example, insert forming can be performed using, as an inserted part, a latticework such as a non-woven fabric, a resinous mesh, a wire netting or a metallic non-woven mesh, a metallic mesh without forming the lattice-shaped member by injecting molding.

In other words, if a lattice-shaped part is formed by the inserted part, it is possible to manufacture a gas diffusion layer member having a lattice-shaped part made of a material different from the resin portion.

Figure 31:
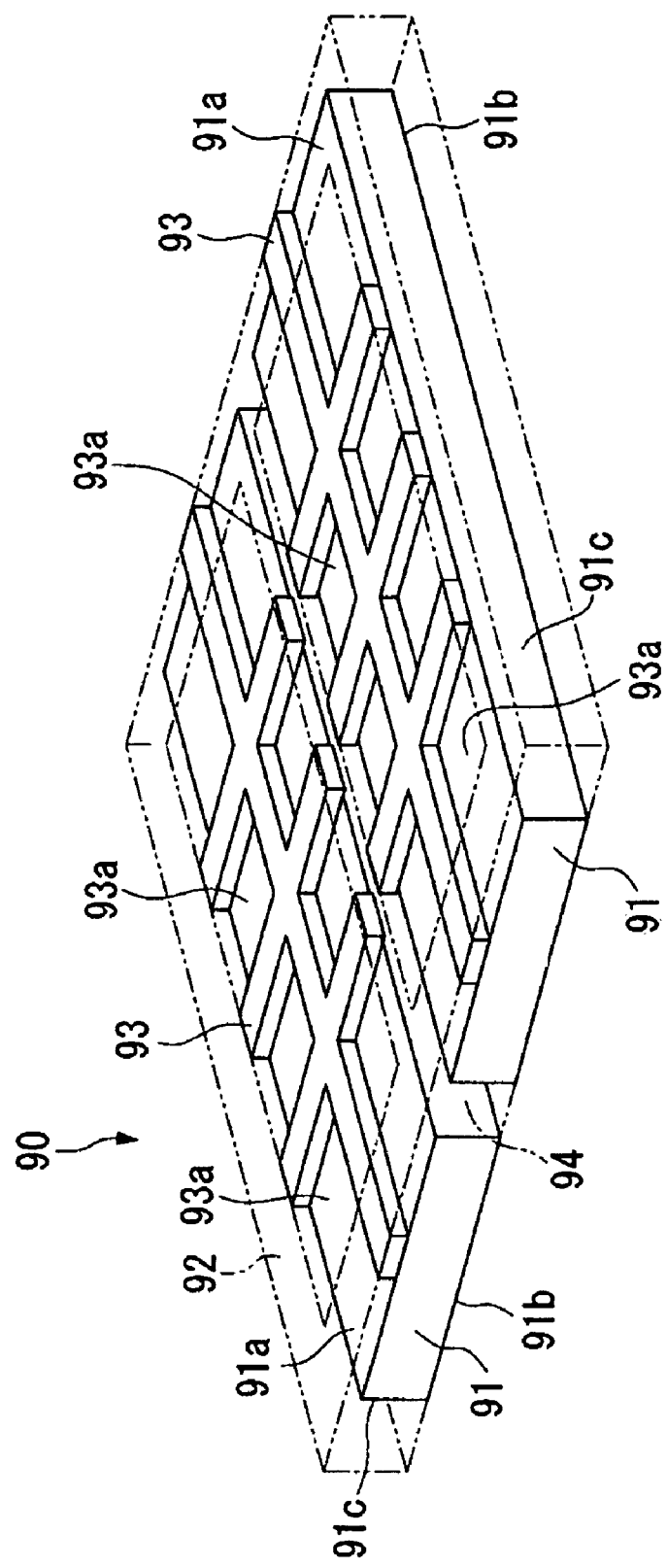
FIG. 31 is a perspective view showing a gas diffusion layer member according to still another embodiment in Example 4 of the invention.

A gas diffusion layer member 90 according to a fourth embodiment of Example 4 shown in FIG. 31 includes two split gas diffusion electrodes 91 each having an oxygen supply surface 91$a$ and a fuel supply surface 91$b$. Two side parts 91$c$ of each gas diffusion electrode are protected by a resin portion 92, and the oxygen supply surface 91$a$ is opened through the openings 93$a$ while being protected by a lattice-shaped frame portion 93. Also, the gas diffusion electrodes 91 and 91 are integrally connected and fixed to each other by a connecting part 94, and the entire electrode surface 91$b$ is opened.

In the gas diffusion layer member 90, the lattice-shaped frame portion 93 is formed of a wire netting (latticework) as a conductive member. In order to prevent short-circuiting between the gas diffusion electrodes 91, two split lattice-shaped frame portions 93 are provided corresponding to the gas diffusion electrodes 91 and 91. Also, the gas diffusion layer member 90 is formed integrally by forming resin portions 92 made of non-conductive resin connected to the two lattice-shaped frame portions 93, respectively.

In other words, the gas diffusion layer member 90 is manufactured as an integral part by performing insert molding using a conductive porous body and a latticework as inserted parts, and by forming other portions (resin portion 92 and connecting part 94) using the conductive porous body as the gas diffusion electrode 91 and the latticework as the lattice-shaped frame portion 93.

In addition, if a conductive porous body and a latticework are integrally fixed by welding or the like prior to the insert molding, it is possible to easily dispose the inserted parts in the molds.

Example 5

One embodiment of the gas diffusion layer member 10 of a polymer electrolyte fuel cell according to Example 5 of the invention will be described with reference to FIG. 32.

Meanwhile, there are two kinds of fuel, i.e., hydrogen gas and a methanol aqueous solution, as typical fuel used in the polymer electrolyte fuel cell. When the methanol aqueous solution is used, the fuel flowing through the conductive porous body is liquid, but the conductive porous body is commonly called a gas diffusion layer. In this case, even though the fuel includes liquid fuel, the conductive porous body is commonly called a gas diffusion layer. Therefore, the fuel is not limited to gaseous fuel.

The gas diffusion layer member 10 generally includes a plurality of (four in the present embodiment) oxygen diffusion electrodes (conductive porous bodies) 11 arranged in the in-plane direction at predetermined intervals, a resin portion 12 coating outer peripheral edges of the oxygen diffusion electrodes 11, and terminal parts 3 connected to the oxygen diffusion electrodes 11.

Each oxygen diffusion electrode 11 has a sheet-like conductive porous body 14 having a three-dimensional mesh structure, and a collector 15 disposed on one surface of the conductive porous body 14 and having two-dimensional mesh structure extending in the in-plane direction. The oxygen diffusion electrode is configured such that at least a portion of the collector 15 bites into the surface of the conductive porous body 14, and the conductive porous body 14 and the collector 15 are electrically connected to each other. In the present embodiment, the surface of the conductive porous body 14 opposite to its surface on which the collector 15 is a disposed serve as an electrode surface 11*a*. Hereinafter, for the convenience of description, the surface of the gas diffusion layer member 10 on which the electrode surface 11*a* is located is referred to as an electrode surface 10*a* of the gas diffusion layer member 10. In addition, the surface of the oxygen diffusion electrode 11 on which the collector 15 is disposed may be the electrode surface 11*a*.

The conductive porous body 14 is formed of a foamed-metal sintered sheet of which porosity or thickness can be appropriately adjusted and available raw material metals are also various. As will be described below, the foamed-metal sintered sheet is obtained by adding a binder, a solvent and the like to a metal powder to knead them, then mixing the kneaded material with a foaming agent to obtain a foaming slurry, and then sintering the slurry after foamed molding thereof.

Figure 32A:
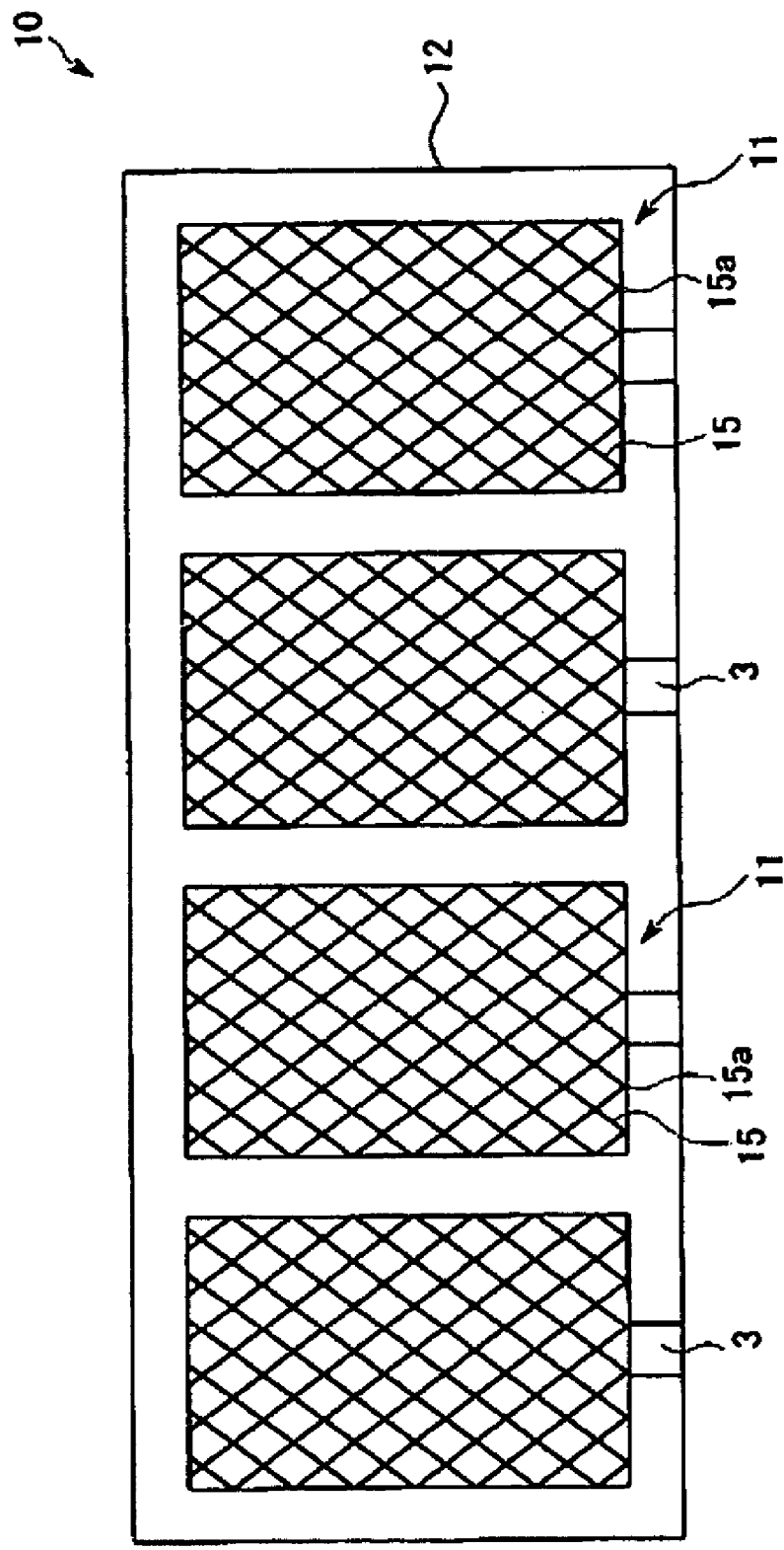
FIGS. 32A and 32B are a plan view and a cross-sectional view of a gas diffusion layer member of a polymer electrolyte fuel cell shown as a first embodiment of Example 5 of the invention.
Figure 32B:
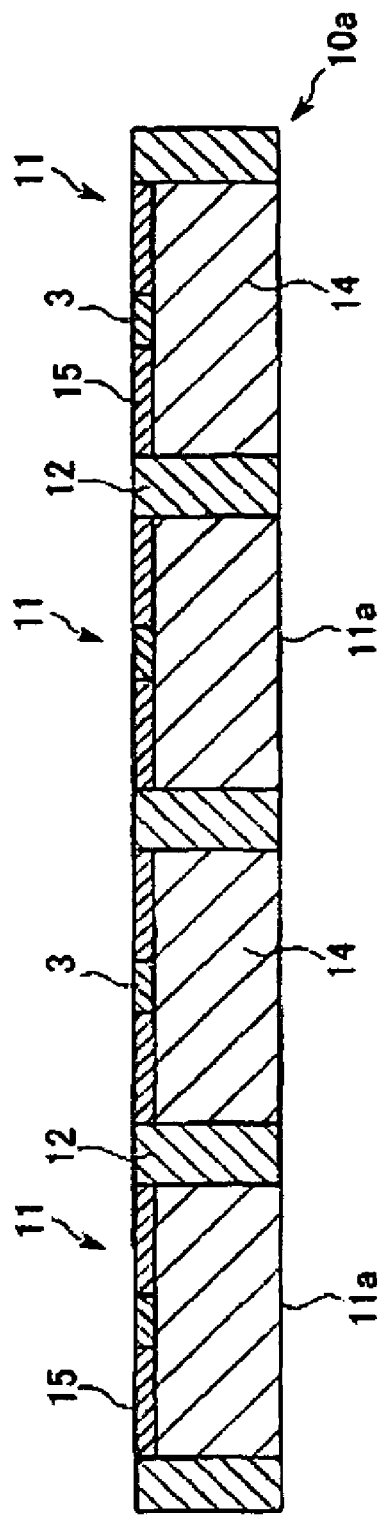
Figure 33:
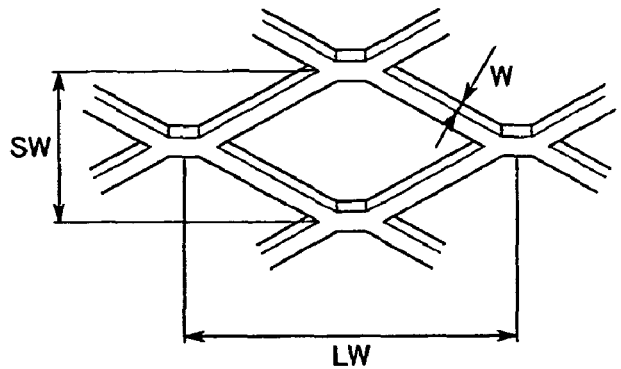
FIG. 33 is an enlarged plan view of a collector shown in FIG. 32.

As shown in FIGS. 32 and 33, the collector 15 is formed of an expanded metal or a wire netting, both of which are made of SUS316L.

When the collector is formed of the expanded metal, in FIG. 33, an LW value is about 3.0 mm, an SW value is 1.0 mm, a W value is 0.6 mm, and a thickness is 0.2 mm. Furthermore, when the collector is formed of the wire netting, a wire diameter is 0.05 mm and a mesh size is in the range of 50 meshes to 300 meshes.

The resin portion 12 is made of resin having no electrical conductivity and air permeability (thermoplastic resin in the present embodiment), and is integrally formed so as to extend in the in-plane direction at the outer peripheral edge of each oxygen diffusion electrode 11, i.e., the conductive porous body 14 and the collector 15, whereby the entire outer peripheral edge of the conductive porous body 14 and the collector 15 is coated with the resin portion 12 so that the oxygen diffusion electrodes 11 are insulated from each other. Moreover, mutually facing surfaces of the conductive porous body 14 and the collector 15 are adapted to be uniformly connected to each other by the resin portion 12.

Each terminal part 3 is a thin plate-shaped metallic member that has electrical conductivity and no air permeability, and is joined to an end face 15*a* of the collector 15 by spot welding.

In addition, as described above, although the foamed-metal sintered sheet is adopted in the present embodiment as the conductive porous body 14, a metallic non-woven fabric or a carbon porous body called as carbon paper or carbon cloth may be used instead of this. In this case, since the conductive porous body 14 used for a polymer electrolyte fuel cell is required to have an excellent gas diffusivity and electrical conductivity, it is preferable to use a foamed-metal sintered sheet, a metallic non-woven fabric, a stacked mesh, or the like. Among these, as described above, the foamed-metal sintered sheet is more preferable because its porosity or thickness can be appropriately adjusted, available raw material metals are also various, and the sheet can be manufactured with a high porosity.

Although the expanded metal or wire netting is illustrated as the collector 15, the collector is not limited thereto, but may be, for example, a punching metal. That is, the collector is not particularly limited as long as it is a configuration having electrical conductivity in the in-plane direction and in the thickness direction, particularly having more excellent electrical conductivity in the in-plane direction that the conductive porous body 14 (having small electrical resistance) and having air permeability in the thickness direction, that is, a conductive body having a two-dimensional mesh structure extending in the in-plane direction.

Moreover, when the gas diffusion layer member 10 is used in the polymer electrolyte fuel cell, electrons by the electrode reaction flow through the terminal part 3, the conductive porous body 14 and the collector 15. Thus, it is preferable to use a corrosion-resistant material, such as stainless steel, as the material of the members 13, 14 and 15.

Figure 34:
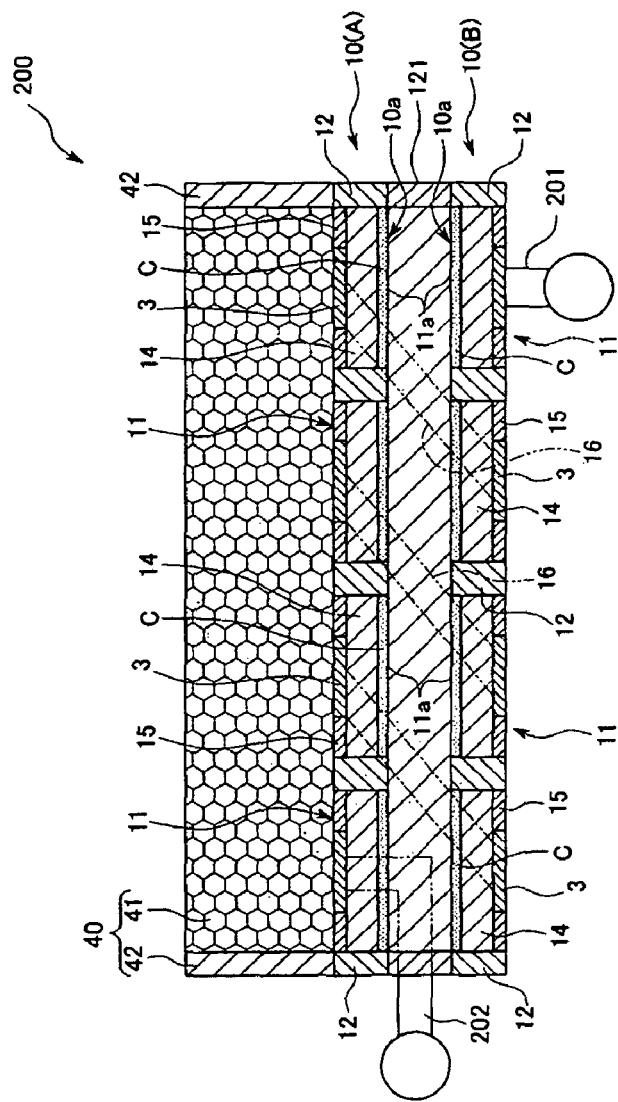
FIG. 34 shows one embodiment of a polymer electrolyte fuel cell using the gas diffusion layer member shown in FIG. 32.

FIG. 34 shows a cross-sectional view of principal parts of a polymer electrolyte fuel cell 200 to which the gas diffusion layer member 10 is applied.

The fuel cell 200 generally includes a pair of gas diffusion layer members 10A and 10B, an electrolyte layer 121 sandwiched between electrode surfaces 10*a* and 10*a* of the pair of gas diffusion layer members 10A and 10B, and a fuel supply part 40 which supplies fuel to one gas diffusion layer member 10 as a fuel electrode A. The electrolyte layer 121 is formed of, for example, a fluorocarbon-resin-based polymeric electrolytic membrane, and has a property that hydrogen ions are migrated in the membrane, while electrons are not allowed to pass through the membrane. In addition, the other one of the pair of gas diffusion layer members 10A and 10B serves as an air electrode B.

In the fuel electrode A, the electrode surface 11*a* of each fuel diffusion electrode (conductive porous body) 11 is connected to the electrolyte layer 121 via a catalyst layer C, and the surface opposite to the electrode surface 11*a* is adapted to be connected to the fuel supply part 40 which holds and supplies fuel. The catalyst layer C is formed by coating the surface of the surface of the electrode surface 11*a* of the fuel diffusion electrode 11 with a polymeric electrolyte solution containing carbon particles having palladium-based catalyst particles carried therein.

Four gas diffusion electrodes 11 joined to the fuel electrode A and the air electrode B are connected to the terminal parts 3 of the gas diffusion electrode 11 located adjacent to the joined direction with the electrolyte layer 121 interposed therebetween through wiring lines 16 so as to be connected in series in the joined direction of the gas diffusion electrodes 11 by the terminal parts 3 individually provided in the electrodes 11. Also, the terminal parts 3 located at both ends of the above-mentioned assembly, which includes the fuel electrode A, the air electrode B and the electrolyte layer 121, are adapted to function as a positive electrode 201 and a negative electrode 202.

The fuel supply part 40 has a structure in which a porous part 41 made of felt for holding fuel (here, a methanol aqueous solution) and for supplying it to the fuel diffusion electrode 11 of the fuel electrode A is coated with a resin frame 42. Also, the porous part 41 of the fuel supply part 40 is disposed in contact with the collector 15 of the fuel diffusion electrode 11 of the fuel electrode A, whereby the fuel held in the porous part 41 can be supplied to the fuel diffusion electrode 11 by osmotic pressure. The resin frame 42 of the fuel supply part 40 and the resin portion 12 of the gas diffusion layer member 10 is fixed to each other by, for example, ultrasonic joining.

In other words, in the polymer electrolyte fuel cell 200, the conductive porous body 14 having a three-dimension mesh structure has air permeability and electrical conductivity, and the collector 15 having a two-dimensional mesh structure also has air permeability and electrical conductivity, particularly electrical conductivity in the in-plane direction, whereby the gas diffusion electrodes 11 of the fuel electrode A and the air electrode B serve as both so-called a gas diffusion layer and a collector.

In addition, here, the catalyst layer C is coated on the electrode surfaces 11*a* of the gas diffusion electrodes 11. However, the catalyst layer C may be formed on the surface of the electrolyte layer 121 as long as it is provided on the interface between the gas diffusion electrode 11 and the electrolyte layer 121.

In the fuel cell 200 configured as above, the hydrogen in the fuel supplied to the fuel diffusion electrode 11 of the fuel electrode A from the fuel supply part 40 is ionized by an electrode reaction on the catalyst layer C to move toward the air electrode B through the electrolyte layer 121. Then, the hydrogen ion which has reached the air electrode B disposed on the other side of the electrolyte layer 121 reacts with the oxygen in the air supplied from the surface of the oxygen diffusion electrode 11 opposite to its electrode surface 11a, on the interface between the electrolyte layer 121 and the catalyst layer C, thereby generating water.

On the other hand, electrons generated by the ionization of hydrogen moves through a circuit (not shown) provided outside of the gas diffusion layer member 10 to the air electrode B via the terminal part 3 from the fuel electrode A. This movement of the electrons makes it possible to generate electric energy.

Hereinafter, a manufacturing method of a foamed-metal sintered sheet suitable for the gas diffusion electrode 11 will be described. For example, to produce the green sheet G, the molding slurry S containing a metal powder is shaped into a thin sheet, and is dried. Thereby, the thin sheet becomes the green sheet G. Then, the foamed-metal sintered sheet can be manufactured by sintering the green sheet G.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based organic solvent with five to eight carbons (for example, neopentane, hexane, and heptane)) that are evaporated or sublimated by heating treatment or a defoaming agent (ethanol) can be added if needed. FIG. 12 shows a green-sheet manufacturing apparatus 80 that molds the slurry S thinly by the doctor blade method.

In the green-sheet manufacturing apparatus 80, first, the slurry S is supplied from a hopper 81 that stores the slurry S onto a carrier sheet 83. The carrier sheet 83 is conveyed by rollers 82, and the slurry S on the carrier sheet 83 is extended between the carrier sheet 83 to be moved and a doctor blade 84 so as to be formed with a required thickness.

The molded slurry S is further conveyed by the carrier sheet 83 to pass through a foaming bath 85 and a heating furnace 86 performing heat treatment sequentially. In the foaming bath 85, the slurry is subjected to heating treatment in a high humidity atmosphere. Thus, the slurry S can be foamed with a foaming agent without being cracked. Then, when the slurry S having cavities formed by the foaming is dried in the heating furnace 86, a green sheet G in which metal powder particles defining the cavities among them are joined together by an organic binder is formed.

After the green sheet G is detached from the carrier sheet 83, it is degreased and calcinated in a vacuum furnace (not shown) whereby the organic binder is removed to form a foamed-metal sintered sheet (conductive porous body 14) of a three-dimensional mesh structure in which the metal powder particles are sintered together.

Next, a manufacturing method of a gas diffusion layer member according to an embodiment of the invention will be described.

This method performs insert molding using the terminal part 3, the conductive porous body 14 and the collector 15 as inserted parts. It is assumed herein that four sets of terminal parts 3, conductive porous bodies 14 and collectors 15 are inserted into one gas diffusion layer member 10.

Figure 35:
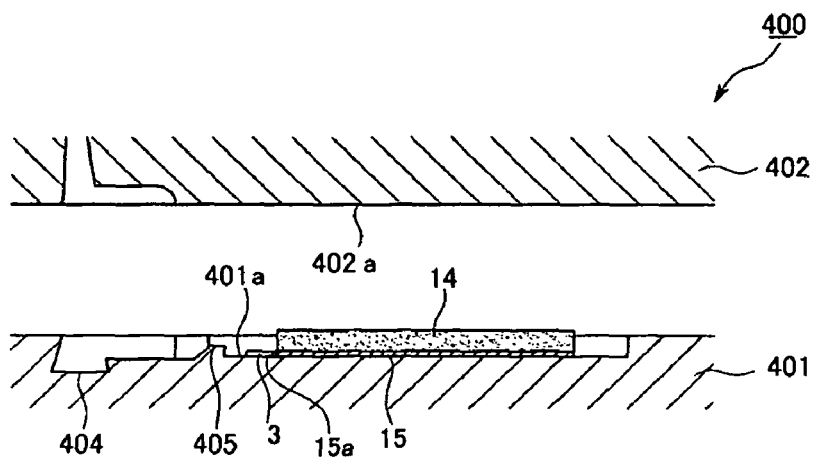
FIG. 35 is a view showing a first process in insert-molding the gas diffusion layer member of a polymer electrolyte fuel cell shown as the first embodiment of Example 5 of the invention.
Figure 36:
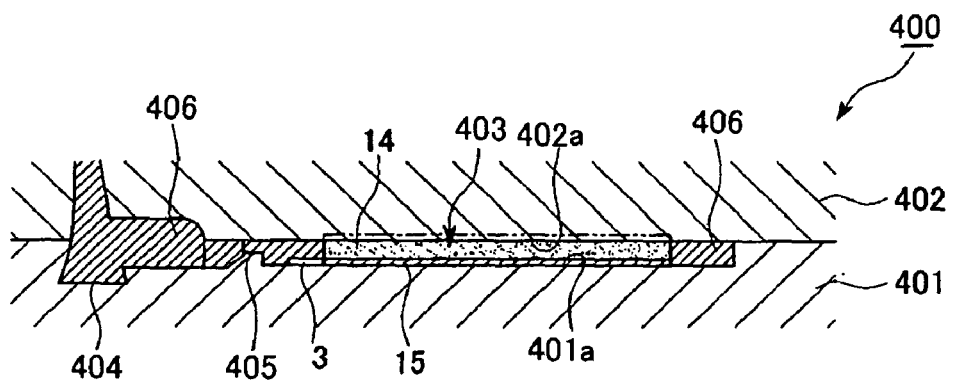
FIG. 36 is a view showing a second process in insert-molding the gas diffusion layer member of a polymer electrolyte fuel cell shown as the first embodiment of Example 5 of the invention.

First, the schematic configuration of a mold apparatus 400 for insert molding which implements the insert molding will be described with reference to FIGS. 35 and 36.

The mold apparatus 400 for insert molding generally includes a pair of movable mold 401 and fixed mold 402. The movable mold 401 and fixed mold 402 are arranged such that a movable mold surface 401a and a fixed mold surface 402a face each other. The movable mold 401 is supported so as to be capable of being advanced toward or retreated from the fixed mold 402. Also, when the movable mold 401 is advanced toward the fixed mold 402 so as to bring the molds into clamping, a cavity 403 is defined between the mold surfaces 401a and 402a. In addition, although not shown, positioning pins for positioning the inserted parts along the mold surfaces 401a and 402a are supported so as to be capable of rising or falling with respect to the movable mold surface 401a.

When the gas diffusion layer member 10 shown in FIG. 32 is formed by the mold apparatus 400 for insert molding configured as above, first, terminal parts 3 are welded onto end faces 15a of the collectors 15 in advance. Then, four conductive porous bodies 14 are stacked on the surfaces of the collector 15, respectively. Then, the four conductive porous bodies 14 are arranged in alignment with the positioning pins protruded from the movable mold surface 401a at predetermined intervals in the in-plane direction so that the surfaces of the collectors 15 and the terminal part 3 abut against the movable mold surface 401a.

It should be noted that the total sum of the thickness of each conductive porous body 14 and the thickness of each collector 15 is set to be larger than the depth of the cavity 403 (the size of the cavity in a direction that molds are opened or closed) defined at the time of closing of the molds, and specifically, to be larger than the depth of the cavity 403 by a size below the thickness of the collector 15.

Next, the cavity 403 is defined by advancing the movable mold 401 toward the fixed mold 402 to perform clamping of the molds. In this case, as described above, since the size of the conductive porous body 14 and the collector 15 in their stacked direction is set to be larger than the depth of the cavity 403, the conductive porous body 14 and the fixed mold surface 402a, and the collector 15 and the movable mold surface 401a are brought into uniform close contact with each other, respectively, at the time of closing of the molds, and the conductive porous body 14 is plastically deformed in the clamping direction of the molds, thereby securely fixing the conductive porous body 14, the collector 15 and the terminal part 3 between the mold surfaces 401a and 402a. In that case, the conductive porous body 14 is compressed up to 3 to 90%, which allows adjustment to the porosity of a conductive porous body 14 constituting a gas diffusion layer member 10 to be manufactured. Also, the conductive porous body 14 and the collector 15 are connected to each other in a state where the conductive porous body 14 individually bites into a plurality of pores of the collector 15 constituting a two-dimensional mesh structure, thereby bringing mutually facing surfaces of the members 14 and 15 into close contact with each other.

Then, after the positioning pins are retreated from the movable mold surface 401a, melted resin 406 injected through a gate 405 from a runner 404 is filled in the cavity 403, whereby the conductive porous body 14, the collector 15, the terminal part 3, and the resin portion 12 are joined together to form a gas diffusion layer member 10 that is an integrated, inserted molding product.

In addition, injection molding conditions such as injection pressure and molding temperature are appropriately selected according to kinds of resin. For example, if the injection pressure is too high, a conductive porous body cannot exhibit its function as a porous body well because the resin may be excessively filled in the conductive porous body, which deteriorates the air permeability. Further, for example, when thermoplastic resin is used, surfaces of molds touching the thermoplastic resin are partially cooled, and when thermosetting resin such as silicon rubber is used, the surfaces of the molds are partially cooled. Accordingly, it is possible to control infiltration of resin into a conductive porous body. Specifically, for example, when polypropylene is adopted as the resin portion 12, such a gas diffusion layer member 10 is obtained when molds are clamped together with 80 kN at a molding temperature of 180° C., and injection molding is performed at a molding pressure of 250 kg/cm$^2$.

As described above, according to the gas diffusion layer member 10 of the present embodiment, since the collector 15 bites the surface of the conductive porous body 14, a good electrical connection between the conductive porous body 14 and the collector 15 can be established. Further, since the collector 15 has a two-dimensional mesh structure extending in the in-plane direction, a current generated in the polymer electrolyte fuel cell 200 can be conducted well in the in-plane direction by the collector 15.

From the foregoing, it is possible to realize a polymer electrolyte fuel cell 200 with a small electrical resistance and a high output.

Further, since the resin portion 12 is integrally formed with the outer peripheral edge of the conductive porous body 14, the handleability of the gas diffusion layer member 10 can be improved, the number of assembling processes when the polymer electrolyte fuel cell 200 is assembled using the gas diffusion layer member 10 can be reduced, and the assembling precision can be improved.

Moreover, since the collector 15 has a two-dimensional mesh structure extending in the in-plane direction, a current generated in the polymer electrolyte fuel cell 200 can be conducted well in the in-plane direction by the collector 15.

Particularly, in the present embodiment, since the resin portion 12 is integrally formed with the outer peripheral edge of the collector 15 as well as the outer peripheral edge of the conductive porous body 14, mutually facing surfaces of the conductive porous body 14 and the collector 15 can be substantially uniformly connected to each other, and the connected state between the surfaces can be maintained over a prolonged period of time. Moreover, in this case, the connected state between the conductive porous body 14 and the collector 15 can be maintained over a prolonged period of time. Accordingly, as the collector 15 bites into the surface of the conductive porous body 14, the electrical resistance between the conductive porous body 14 and the collector 15 can be suppressed to a minimum, the output of the polymer electrolyte fuel cell 200 can be further increased, and the life span of the fuel cell 200 can be prolonged. In addition, since the resin portion 12 is disposed, only the resin portion 12 can be processed to easily give shape such as holes for fixation to an apparatus.

Further, according to the manufacturing method of the gas diffusion layer method of the present embodiment, since the melted resin 406 is injected into the cavity 403 in a state in which the conductive porous body 14 and the collector 15 are compressed in their stacked direction and fixed, positions of the conductive porous body 14 and the collector 15 can be inhibited from being deviated in a direction along the mold surface 401a and 402a due to the injection pressure of the melted resin 406 within the cavity 403.

Moreover, since the conductive porous body 14 is plastically deformed in its thickness direction at the time of closing of the molds and the collector 15 has a two-dimensional mesh structure, the conductive porous body 14 is allowed to bite into the pores in the surface of the collector 15. Accordingly, the aforementioned uniformly connected state between the conductive porous body 14 and the collector 15 can be realized, and occurrence of the positional deviation can be surely suppressed.

Further, since the melted resin 406 is injected into the cavity 403 in a state where the conductive porous body 14 is brought into close contact with the fixed mold surface 402a, and the collector 15 is brought into close contact with the movable mold surface 401a, the melted resin 406 can be inhibited from entering spaces between the members 14 and 402a and the members 15 and 401a.

From the foregoing, a gas diffusion layer member 10 capable of suppressing the electrical resistance between the conductive porous body 14 and the collector 15 to a minimum can be surely formed with a high precision.

Particularly, when a punching metal is adopted as the collector 15, edge portions of through holes in one surface of the front and back surfaces of the collector 15 protrude from the one surface in a manufacturing process of the punching metal. Accordingly, if the collector 15 and the conductive porous body 14 are compressed in a state where the one surface of the collector 15 is disposed to face the conductive porous body 14, it is possible to make the collector 15 bite into the surface of the conductive porous body 14 well.

Further, according to the manufacturing method of the gas diffusion layer member of the present embodiment, since the collector 15 is caused to bite into the surface of the conductive porous body 14 at the time of closing of the molds, it is possible to realize a close contact state between the mold surfaces 401a and 402a and the surfaces of the inserted parts during injection. Accordingly, the melted resin 406 can be inhibited from entering a space between the mold surfaces 401a and 402a, and positions of the inserted parts can be inhibited from being deviated. As a result, a good electrical connection state between the collector 15 and the conductive porous body 14 can be surely realized, and the gas diffusion layer member 10 can be formed with a high precision without causing any inconvenience in its manufacture.

Particularly, when a punching metal is adopted as the collector 15, edge portions of through holes in one surface of the front and back surfaces of the collector 15 protrude from the one surface in a manufacturing process of the punching metal. Accordingly, if the collector 15 and the conductive porous body 14 are compressed in a state where the one surface of the collector 15 is disposed to face the conductive porous body 14, it is possible to make the collector 15 bite into the surface of the conductive porous body 14 well.

Also, since the melted resin is impregnated into and cured in the pores opened to the side portion of the conductive porous body 14 to a depth of about 5 μm to 1000 μm at a portion where the conductive porous body 14 and the resin portion 12 are connected to each other, the conductive porous body 14 and the resin portion 12 are securely connected to each other by an anchoring effect. Accordingly, as the collector 15 bites into the surface of the conductive porous body 14, the strength of connection between respective members of the gas diffusion layer member 10 composed of the conductive porous body 14, the collector 15 and the resin portion 12 can be increased, and the life span of these members can be prolonged.

In addition, the shapes or combinations of these members shown in the above-described embodiments are just exemplary. Therefore, various modifications may be made thereto based on design requirements without departing from the sprit and scope of the invention.

For example, although the configuration in which thermoplastic resin is adopted as the material of the resin portion 12 is illustrated in the above embodiment, the invention is not limited thereto. That is, since the material of the resin portion 12 is simply required to be a material, such as elastomer (including rubber), which can be injection-molded and to have no electrical conductivity and air permeability, it can be appropriately selected in consideration of allowable temperature limit, hardness, and the like. When soft resin is used as the material of the resin portion, the sealing performance can be improved.

Moreover, the resin portion 12 and the terminal part 3 can also be formed by two-color molding. That is, conductive resin is injection-molded to form a terminal part 3, and thereafter, non-conductive resin may be injection-molded to form a resin portion 12.

In addition, prior to the aforementioned insert molding, the conductive porous body 14 and the collector 15 may be welded, spot-welded, or diffusively joined in advance. In this case, it is possible to surely suppress occurrence of relative positional deviation of the conductive porous body 14 and the collector 15 when the positioning pins are retreated before the melted resin 406 is injected into the cavity 403.

Further, it is possible to utilize the surface of the gas diffusion layer member 10 where the collector 15 is disposed as the electrode surface 11a in forming a polymer electrolyte fuel cell using the gas diffusion layer member 10.

Figure 37:
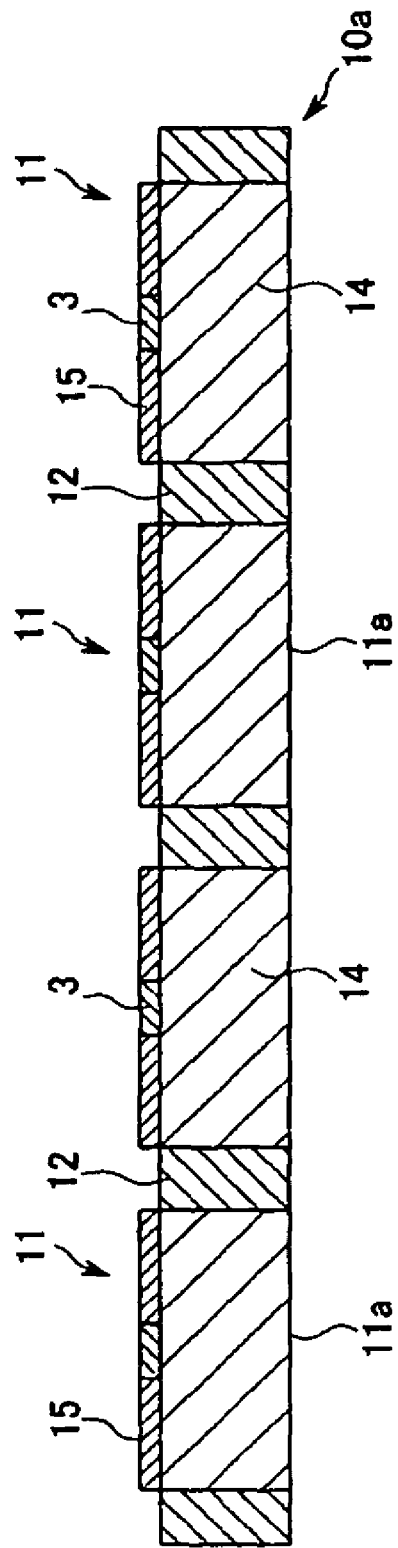
FIG. 37 is a cross-sectional view of a gas diffusion layer member of a polymer electrolyte fuel cell shown as a second embodiment of Example 5 of the invention.

Moreover, although the configuration in which the resin portion 12 is integrally formed at both the outer peripheral edges of the conductive porous body 14 and the collector 15 is illustrated in the above embodiment, as shown in FIG. 37, the resin portion 12 may be formed at only the outer peripheral edge of the conductive porous body 14. Even in this case, the number of assembling processes when a fuel cell is assembled using the gas diffusion layer member 10 can be reduced, and the assembling precision can be improved.

Furthermore, the manufacturing method of the gas diffusion layer member 10 by making the collector 15 bites into the surface of the conductive porous body 14 is not limited to the method of plastically deforming the conductive porous body 14 as in the above embodiment. For example, the gas diffusion layer member 10 can also be manufactured in the following way.

First, the schematic configuration of a manufacturing apparatus for implementing the manufacturing method will be described referring to FIGS. 38 and 39. This apparatus generally includes a slurry bath 310 filled with slurry S, a scraping member 320 disposed above an upper opening of the slurry bath 310, a foaming bath (not shown) which foams the slurry S to form a foam, a drying furnace (not shown) which performs drying treatment on the foam, a pressing roller (not shown) which presses an undried foam, a calcinating furnace part which degreases and calcinates the pressed foam, and a collector running means (not shown) which runs a long collector 15. The collector running means has a plurality of rollers (not shown) around which the long collector 15 is wound. This collector 15 is caused to pass through the respective elements 310, 320, . . . of the above apparatus continuously and sequentially.

The scraping member 320 is adapted to scrape the slurry S attached in a buildup form to the front and back surfaces of the collector 15 which has passed through the slurry bath 310. A pair of the scraping members 320 is provided so as to face the front and back surfaces of the collector 15, and the spacing between the scraping members is adjustable. In addition, by making the distance between tips of the pair of scraping members 320 smaller than the thickness of the collector 15, the slurry S is pushed into a plurality of pores (hereinafter, referred to as "meshes") of the collector 15 constituting a two-dimensional mesh structure, from the front and back surfaces of the collector by the tips of the scraping members 320. Even if pores are included in the slurry S attached to the collector 15, the pores can be excluded from the slurry S. In this case, it is desirable to form the scraping member 320 of a rubber material having flexibility.

The pressing roller is supported so as to be capable of rotating around a horizontal rotational axis, which extends in a width direction of the collector 15 in a traveling state, and is adapted to press the traveling collector 15 from the front and back surfaces thereof while it is rotated.

The calcinating furnace part includes a degreasing furnace (not shown), which degreases a foam and a calcinating furnace 330 which calcinates the degreased foam. An energizing roller part 340 that heats the foam is adapted to be disposed within the calcinating furnace 330.

The energizing roller part 340 is supported so as to be capable of rotating around a horizontal rotational axis which extends in a width direction of the collector 15 in a traveling state in the calcinating furnace 330, and generally includes an energizing roller 340A which is brought into contact with the foam filled into the meshes of the collector 15 to allow a current to flow through the foam, in other words, to energize and heat the foam, and a power source 340B which supplies a current to the energizing roller 340A. A plurality of the energizing rollers 340A is provided at two places in a traveling direction F of the collector 15 (in an example of FIG. 39, two places at the front side and rear side with respect to the traveling direction F). The rollers 340A, . . . are adapted to touch the collector 15 and the front and back surfaces of the foam over their entire width direction.

A manufacturing method of the gas diffusion layer member 10 by the above manufacturing apparatus will be described.

Figure 38:
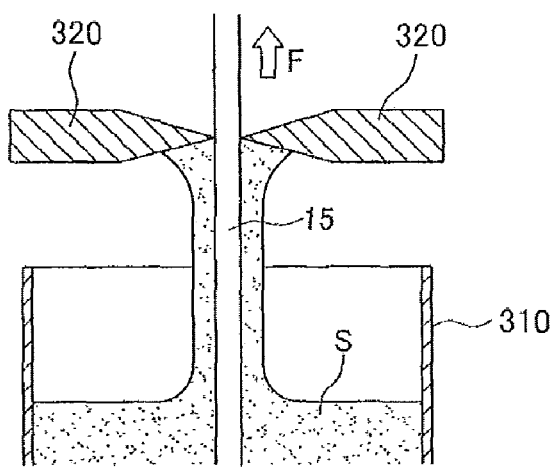
FIG. 38 is a schematic diagram showing an example of filling slurry into meshes of a collector in a manufacturing method of the gas diffusion layer member shown as the first embodiment of Example 5 of the invention.
Figure 39:
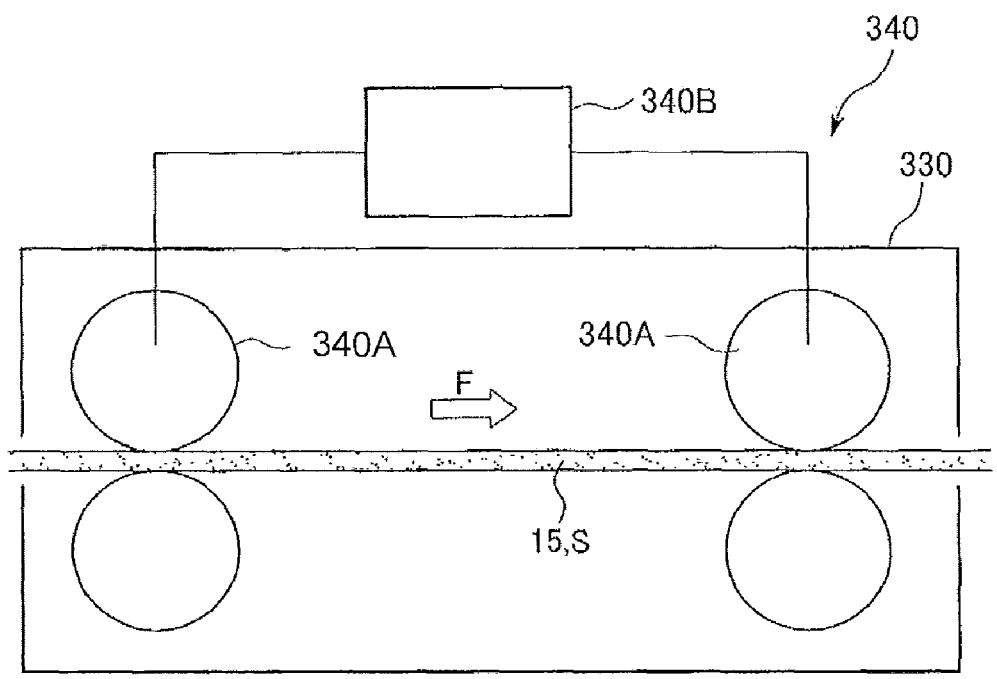
FIG. 39 is a schematic diagram showing an example of calcinating a foam in the manufacturing method of the gas diffusion layer member shown as the first embodiment of Example 5 of the invention.

First, as shown in FIG. 38, a long collector 15 is caused to enter the slurry bath 310 from the bottom of the slurry bath 310 filled with the slurry S. Thereafter, the collector 15 is moved upwardly, while the collector 15 is drawn out of an upper end opening of the slurry bath 310. At this time, the slurry S is attached in a buildup form to the front and back surfaces of the long collector 15. Then, the collector 15 is further moved upwardly, whereby the slurry S attached in a buildup form is scraped by the tips of the pair of scraping members 320 disposed above the upper end opening of the slurry bath 310.

Next, the collector 15 having the slurry S is caused to further travel to pass through the foaming bath. In this foaming bath, the slurry S is heated at a temperature of 25° C. to 80° C. in a high humidity atmosphere set to a humidity of about 65% or higher so as to allow the slurry S to be foamed with a foaming agent contained therein. At this time, since the humidity is set to about 65% or higher, the slurry S is foamed well without being cracked. Also, at this time, one surface of the collector 15 is placed and constrained on a placing surface within the foaming bath and the other surface thereof is not constrained, whereby the slurry S filled in the meshes of the collector 15 bulges from the other surface.

Thereafter, the collector 15 having the foamed slurry S (hereinafter, simply referred to as "foam") is caused to travel to pass through the drying furnace. In this drying furnace, its interior is heated to 30° C. to 150° C. by, for example, a far-infrared-ray heater lamp, and its interior is furnished with a drying air having approximately the same temperature as a heating temperature by the heater lamp. In this environment, the foam is dried, and the metal powder particles defining cavities therebetween by the foaming are joined together by an organic binder.

Next, the collector 15 having the foam is caused to travel to pass through a position where the pressing roller is disposed, thereby foaming the slurry S in the foaming bath. As a result, even when the foam bulges in an unconstrained state from the other surface of the collector 15, the bulged portion is crushed to adjust the thickness or porosity of the foam.

Thereafter, the collector 15 with the foam of which thickness and porosity are adjusted is caused to further travel to pass through the calcinating furnace part. At this time, first, the collector is caused to pass through the degreasing furnace. In this degreasing furnace, its interior is set to a temperature of 400° C. to 700° C., and its interior is turned into a reduction atmosphere or a vacuum atmosphere when a metal powder contained in the slurry S is SUS 316L powder or Ti powder.

Then, the degreased foam is caused to further travel to pass through the calcinating furnace 330. In the calcinating furnace 330, its interior is turned into a reduction atmosphere, an inert gas atmosphere, or a vacuum atmosphere, and its internal temperature is set to about 1100° C. to 1350° C. The energizing roller 340A disposed in the calcinating furnace 330 as described above causes a current to flow through the entire foam in its in-plane direction and its thickness direction to generate Joule's heat in the foam. This Joule's heat calcinates the foam. Thus, metal powder particles from which the binder is removed are sintered together to form conductive porous body 14 having a three-dimensional structure, and to form a long gas diffusion layer member in which the conductive porous body 14 is joined to the meshes of the collector 15. Thereafter, the long gas diffusion layer member is cut into a predetermined length of pieces, and then the aforementioned insert molding is performed to form the gas diffusion layer member 10 shown in FIG. 32 or FIG. 37.

In the gas diffusion layer member 10 formed as described by the above manner similar to the aforementioned embodiment, the collector 15 can enter into the conductive porous body 14. In other words the conductive porous body 14 can protrude into the collector 15. Therefore, the conductive porous body 14 and the meshes of the collector 15 can make contact with one another.

In addition, in the above embodiment, when the gas diffusion layer member 10 is manufactured, the foam is pressed by pressing roller before the foam is degreased and calcinated by the calcinating furnace part after the foam is dried by the drying furnace. However, the pressing does not need to be necessarily implemented, but it only needs to be implemented if necessary. Further, in the manufacturing method of the present embodiment, a form in which the thickness of the conductive porous body 14 is made smaller than the thickness of the collector 15 and a form in which the collector 15 is completely buried in the conductive porous body 14 other than the forms shown in FIG. 32 and FIG. 37 can also be implemented as the form in which the collector 15 is made to bite into the surface of the conductive porous body 14. The collector 15 enters into the surface of the conductive porous body 14. In other words, the surface of the conductive porous body 14 protrudes into the collector 15.

Example 6

Figure 40:
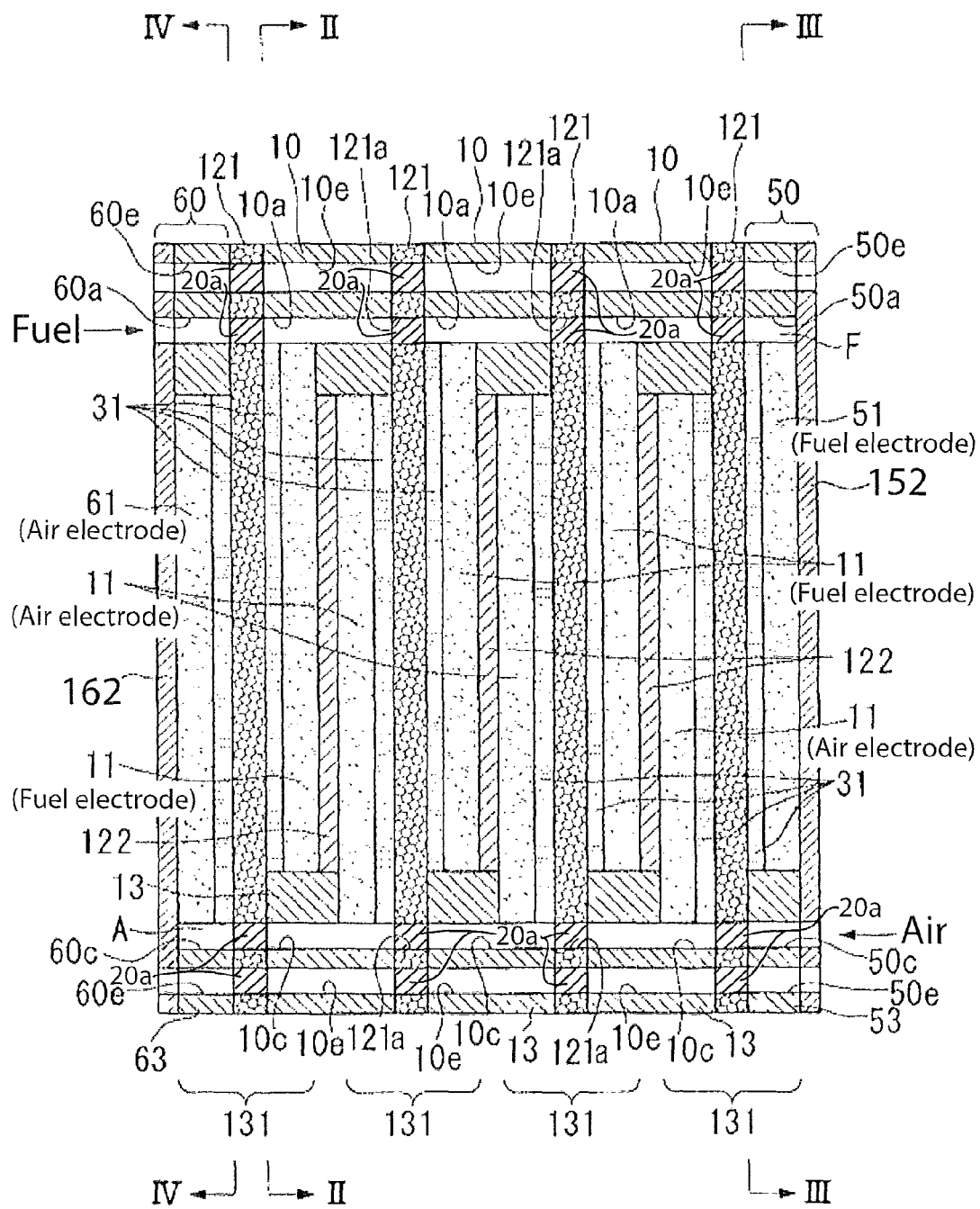
FIG. 40 is a cross-sectional view showing an example of a fuel cell according to Example 6 of the invention.

FIG. 40 shows principal parts of a polymer electrolyte fuel cell using the gas diffusion layer members 10, 50 and 60 according to Example 6 of the invention. The fuel cell has a so-called stacked structure in which four sets of unit cells 131 are stacked on each other, and can cause an electrode reaction by supply of fuel (for example, a methanol aqueous solution) and air as an oxidizing agent, thereby generating power.

As shown in FIG. 40, the gas diffusion layer member 10 has a structure in which gas diffusion electrodes 11 and 11 and a separator plate 122 are stacked in the thickness direction, and a resin frame 13 are integrally formed so as to cover the peripheries of the oxygen diffusion electrode and the separator plate in the in-plane direction. Also, as shown in FIGS. 40 and 41, the gas diffusion layer member 10 is provided with first fluid channels 10a and 10b for allowing a first fluid (fuel) to pass therethrough, and second fluid channels 10c and 10d for allowing a second fluid (air) to pass therethrough, all of which penetrate the resin frame 13.

Figure 41:
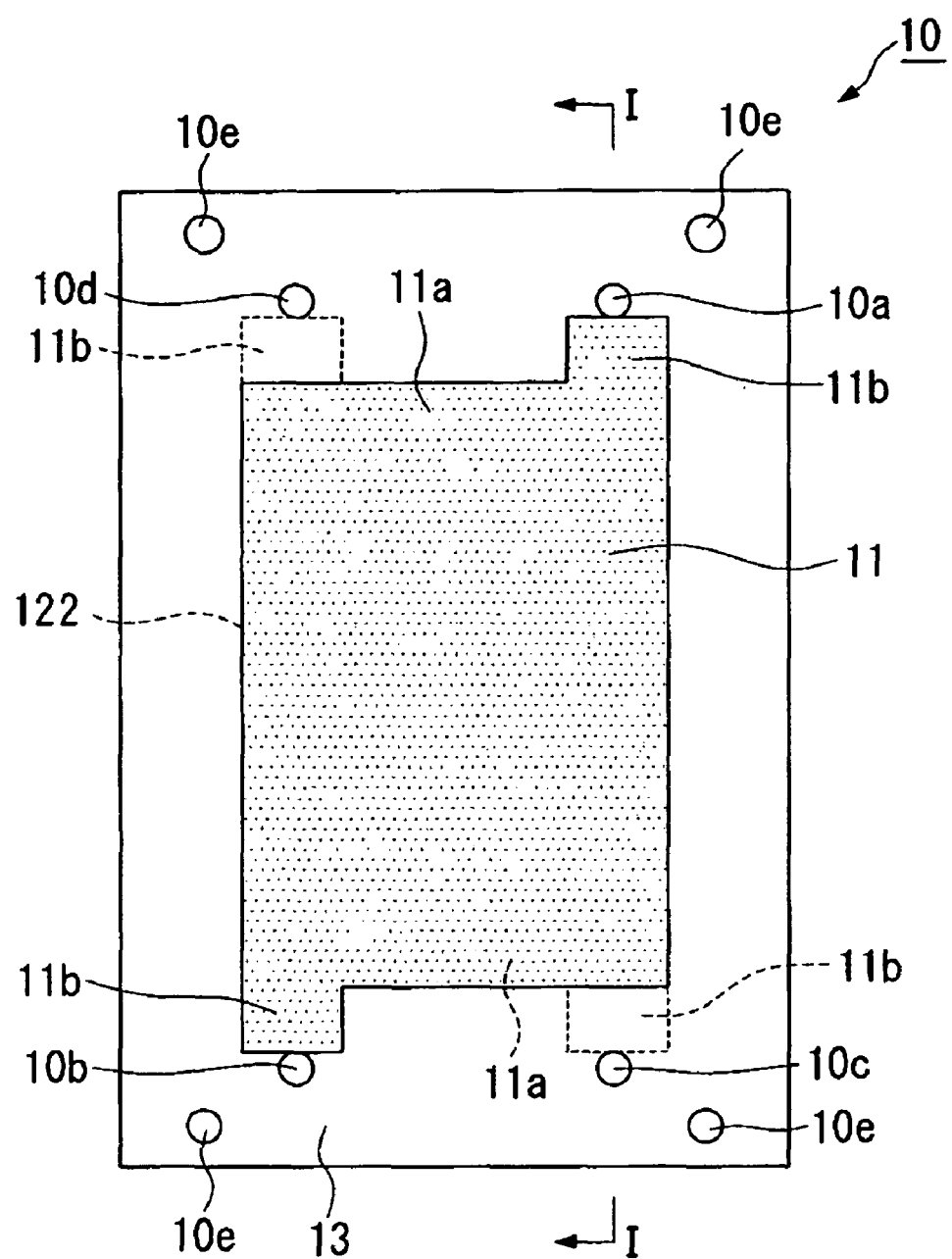
FIG. 41 is a cross-sectional view showing the gas diffusion layer member according to the invention, taken along a line II-II shown in FIG. 40.

In addition, FIG. 41 is a cross-sectional view taken along a line II-II shown in FIG. 40, and FIG. 40 is a cross-sectional view taken along a line I-I shown in FIG. 41.

Each gas diffusion electrodes 11 is a rectangular thin plate made of a conductive porous body having a three-dimensional mesh structure, and has characteristics of being air-permeable by communication between pores opened to the surface in various directions, lightweight and large in surface area. In the gas diffusion electrodes 11, ends of a substantially rectangular electrode body 11a is provided with connecting parts 11b and 11b in the shape of a tab for connection to any one of the first fluid channels 10a and 10b and the second fluid channels 10c and 10d.

The gas diffusion electrodes 11 and 11 are disposed such that their electrode bodies 11a overlap each other, and the connecting parts 11b and 11b does not overlap each other. Also, any one of the first fluid channels 10a and 10b and the second fluid channels 10c and 10d which penetrate the resin frame 13 is connected to the connecting parts 11b. That is, in each gas diffusion electrode 11, different channels are respectively connected to two connecting parts 11b provided in the electrode body 11a.

Accordingly, the fuel supplied to the first fluid channel 10a passes through communicating pores of the fuel diffusion electrode 11 and flows out to the first channel 10b. In addition, the air supplied to the second fluid channel 10c passes through communicating pores of the oxygen diffusion electrode 11 and flows out to the first fluid channel 10d.

The separator plate 122 is, for example, a carbon plate, a corrosion-resistant metal plate, or the like which does not permit passage of a gas or a fluid serving as air or fuel and has electrical conductivity, and is formed to be larger than at least an H-shape that overlaps both the gas diffusion electrodes 11 and 11. Also, by disposing the separator plate between the gas diffusion electrodes 11 and 11, as shown in FIG. 40, unit cells 131 formed by the gas diffusion electrodes 11 and 11 are connected in series while circulation of fluid between the electrodes is blocked.

In addition, the gas diffusion electrodes 11 and the separator plate 122 can be closely fixed to each other by diffusion joining.

The resin frame 13 is integrally provided so as to cover the peripheries, in the in-plane direction, of the gas diffusion electrode 11, the separator plate 122 and the gas diffusion electrode 11 which are stacked in the thickness direction. Both surfaces of the resin frame are the same surfaces connected to the surfaces, respectively, of the gas diffusion electrodes 11 and 11. The resin frame 13 is formed in the shape of a substantially rectangular parallelepiped which buries the oxygen diffusion electrodes 11 and the separator plate 122, and its four corners are provided with bolt insertion holes 10e penetrating the resin frame in the thickness direction. The bolts can be inserted through the bolt insertion holes 10e for fixing a plurality of gas diffusion layer members 10 and electrolyte layers 121 when they are stacked in multi-layers.

In addition, gas diffusion layer members 50 and 60 are respectively disposed on both end faces of the fuel cells.

Figure 42:
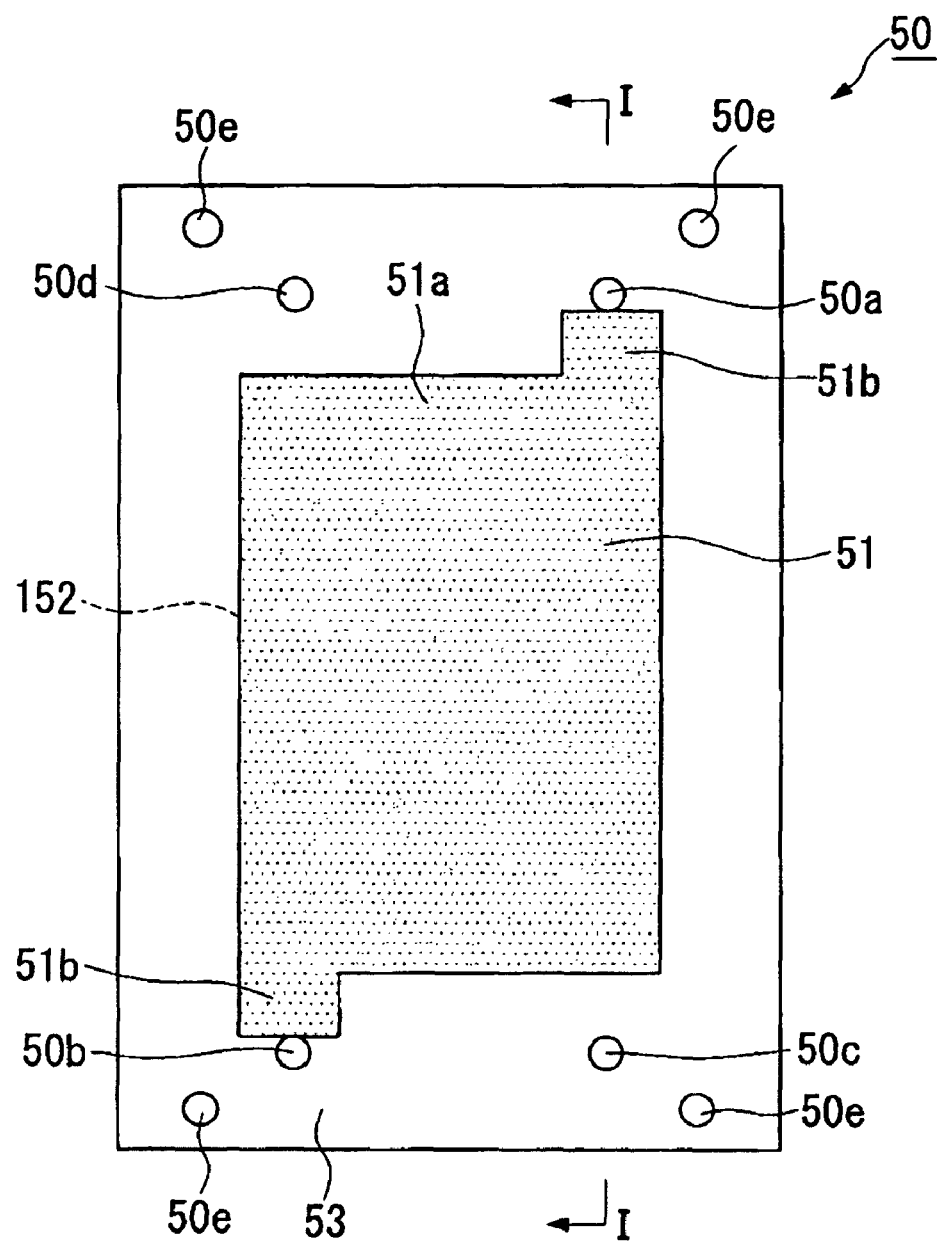
FIG. 42 is a cross-sectional view showing the gas diffusion layer member according to the invention, taken along a line shown in FIG. 40.

As shown in FIGS. 40 and 42, the gas diffusion layer member 50 has a structure in which an fuel diffusion electrode 51 and a separator plate 152 are stacked in the thickness direction, and a resin frame 53 are integrally formed so as to cover the peripheries of the oxygen diffusion electrode and the separator plate in the in-plane direction. Also, the gas diffusion layer member 50 is provided with first fluid channels 50a and 50b for allowing a first fluid (fuel) to pass through the fuel diffusion electrode 51, and second fluid channels 50c and 50d for allowing a second fluid (air) to pass therethrough, all of which penetrate the resin frame 53.

Similar to the oxygen diffusion electrode 11, the oxygen diffusion electrode 51 is a thin plate made of a conductive porous body having a three-dimensional mesh structure, and has characteristics of being air-permeable by communication between pores opened to the surface in various directions, lightweight and large in surface area. In the oxygen diffusion electrode 51, ends of a substantially rectangular electrode body 51a are provided with connecting parts 51b and 51b in the shape of a tab for connection to any one of the first fluid channels 50a and 50b.

Accordingly, the fuel supplied to the fluid channel 50a passes through communicating pores of the oxygen diffusion electrode 51 and flows out to the fluid channel 50b.

Similar to the separator plate 122, the separator plate 152 is, for example, a carbon plate, a corrosion-resistant metal plate, or the like which does not permit passage of a gas or a fluid serving as air or fuel and has electrical conductivity, and is formed to be larger than at least the surface of oxygen diffusion electrode 51. Also, by disposing the separator plate in contact with the oxygen diffusion electrode 51, circulation of fluid to the outside of the cell from the oxygen diffusion electrode 51 is blocked.

In addition, the oxygen diffusion electrode 51 and the separator plate 152 can be closely fixed to each other by diffusion joining.

The resin frame 53 is integrally provided so as to cover the peripheries, in the in-plane direction, of the oxygen diffusion electrode 51 and the separator plate 152 which are stacked in the thickness direction. One surface of the resin frame is the same surface connected to the surface of the oxygen diffusion electrode 51. The resin frame 53 is formed in the shape of a substantially rectangular parallelepiped which buries the oxygen diffusion electrode 51 and the separator plate 152, and its four corners are provided with bolt insertion holes 50e penetrating the resin frame in the thickness direction. The bolts can be inserted through the bolt insertion holes 50e for fixing a plurality of gas diffusion layer members 10 and 50 and electrolyte layers 121 when they are stacked in multi-layers.

Figure 43:
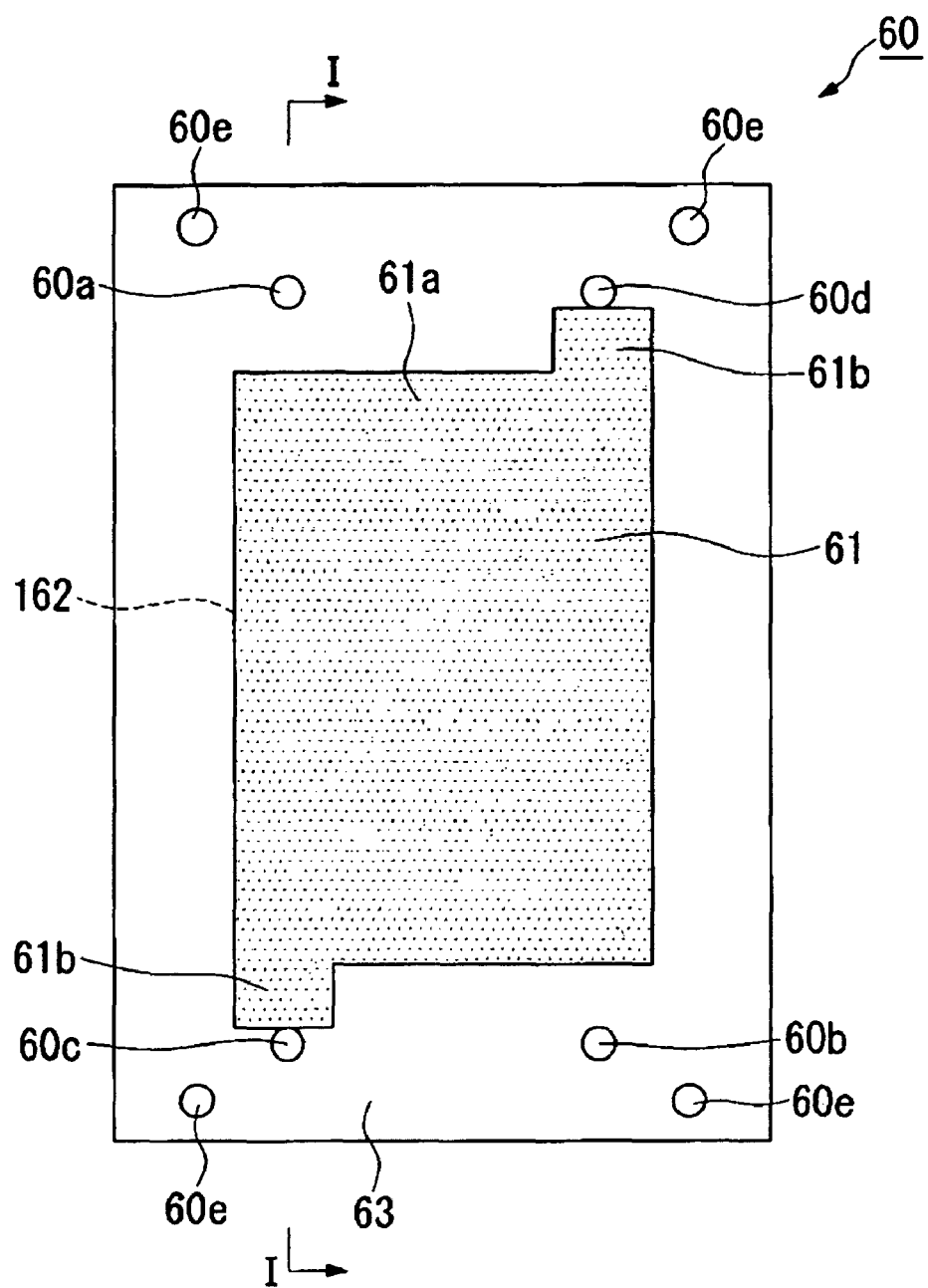
FIG. 43 is a cross-sectional view showing the gas diffusion layer member according to the invention, taken along a line IV-IV shown in FIG. 40.

Further, as shown in FIGS. 40 and 43, the gas diffusion layer member 60 has a structure in which an oxygen diffusion electrode 61 and a separator plate 162 are stacked in the thickness direction, and a resin frame 63 are integrally formed so as to cover the peripheries of the oxygen diffusion electrode and the separator plate in the in-plane direction. Also, the gas diffusion layer member 60 is provided with first fluid channels 60a and 60b for allowing a first fluid (fuel) to pass through the oxygen diffusion electrode 61, and second fluid channels 60c and 60d for allowing a second fluid (air) to pass therethrough, all of which penetrate the resin frame 63.

Similar to the oxygen diffusion electrodes 11 and 51, the oxygen diffusion electrode 61 is a thin plate made of a conductive porous body having a three-dimensional mesh structure, and has characteristics of being air-permeable by communication between pores opened to the surface in various directions, lightweight and large in surface area. In the oxygen diffusion electrode 61, ends of a substantially rectangular electrode body 61a are provided with connecting parts 61b and 61b in the shape of a tab for connection to the second fluid channels 60c and 60d.

Accordingly, the air supplied to the fluid channel 60c passes through communicating pores of the oxygen diffusion electrode 61 and flows out to the fluid channel 60d.

Similar to the separator plates 122 and 152, the separator plate 162 is, for example, a carbon plate, a corrosion-resistant metal plate, or the like which does not permit passage of a gas or a fluid serving as air or fuel and has electrical conductivity, and is formed to be larger than at least the surface of oxygen diffusion electrode 61. Also, by disposing the separator plate in contact with the oxygen diffusion electrode 61, circulation of fluid to the outside of the cell from the oxygen diffusion electrode 61 is blocked.

In addition, the oxygen diffusion electrode 61 and the separator plate 162 can be closely fixed to each other by diffusion joining.

The resin frame 63 is integrally provided so as to cover the peripheries, in the in-plane direction, of the oxygen diffusion electrode 61 and the separator plate 162 which are stacked in thee thickness direction. One surface of the resin frame is the same surface connected to the surface of the oxygen diffusion electrode 61. The resin frame 63 is formed in the shape of a substantially rectangular parallelepiped which buries the oxygen diffusion electrode 61 and the separator plate 162, and its four corners are provided with bolt insertion holes 60e penetrating the resin frame in the thickness direction. The bolts can be inserted through the bolt insertion holes 60e for fixing a plurality of gas diffusion layer members 10, 50 and 60 and electrolyte layers 121 when they are stacked in multi-layers.

In the fuel cell shown in FIG. 40, the electrolyte layers 121 disposed in close contact with the gas diffusion electrodes 11, 51 and 61 of the gas diffusion layer members 10, 50 and 60 are formed of for example, a fluorocarbon-resin-based polymeric electrolytic membrane. The electrolyte layers 121 are provided with through holes 20a which communicate with the first fluid channels 10a, 10b, 50a, 50b, 60a or 60b and the second fluid channels 10c, 10d, 50c, 50d, 60a and 60d when the gas diffusion layer members 10, 50 and 60 are overlapped with each other.

A catalyst layer 31 is provided on an interface (on the surface of the gas diffusion electrode 11, 51 or 61 in the present embodiment) between each electrolyte layer 121 and the gas diffusion electrodes 11, 51 or 61 of the gas diffusion layer member 10, 50 or 60.

The catalyst layer 31 is formed so as to coat the surface of the oxygen gas electrode 11, 51 or 61 with a polymeric electrolyte solution containing carbon particles having palladium-based catalyst particles carried therein. The catalyst layer 31 and the electrolyte layer 121 can be closely fixed to each other by hot pressing. Further, the electrolyte layer 121 and resin portion 13, 53 or 63 of the gas diffusion layer member 10, 50 or 60 can be closely fixed to each other by ultrasonic joining.

In addition, the catalyst layer 31 only needs to be interposed between the electrolyte layer 121 and the gas diffusion electrodes 11, 51 or 61. In the present embodiment, the catalyst layer is provided on the surface of the gas diffusion electrodes 11, 51 or 61, but it can be formed on a surface of the electrolyte layer 121.

The fuel cell shown in FIG. 40 is configured such that the above-descried gas diffusion layer members 10, 50 and 60 and electrolyte layers 121 disposed therebetween are stacked, and both sides of the fuel cell are closed by separator plates 152 and 162, as shielding plates having no air permeability and electrical conductivity, provided in the gas diffusion layer members 50 and 60. Since the gas diffusion layer members 10, 50 and 60 which becomes an integral part by the resin portions 13, 53 and 63 are easily handled and hardly damaged, it is possible to realize a fuel cell in which waste caused by damage hardly occurs, handling by automatic machines is easy, and the productivity is high.

In this fuel cell, the gas diffusion layer members 10, 50 and 60 and the electrolyte layers 121 are stacked whereby a fuel supply channel F is formed such that the first fluid channels 10*a*, 50*a* and 60*a* and the through holes 20*a* communicate with each other, a fuel discharge channel (not shown) is formed such that the first fluid channels 10*b*, 50*b* and 60*b* and the through holes 20*a* communicate with each other, an air supply channel A is formed such that the second fluid channels 10*c*, 50*c* and 60*c* and the through holes 20*a* communicate with each other, and an air discharge channel (not shown) is formed such that the second fluid channels 10*d*, 50*d* and 60*d* and the through holes 20*a* communicate with each other.

In this fuel cell, when the fuel (here, a methanol aqueous solution) is fed in from the from the fuel supply channel F, the fuel is supplied to the oxygen diffusion electrodes (fuel electrodes) 11 and 51 through the first fluid channels 10*a*, 50*a* and 60*a*. While the fuel passes through the oxygen diffusion electrodes 11 and 51, hydrogen in the fuel is ionized by a catalyst reaction on the interfaces of the catalyst layers 31, and the remaining fluid (non-reacted portion) is discharged from the fuel discharge channel through the first fluid channels 10*b* and 50*b*.

On the other hand, as for the oxygen diffusion electrodes (air electrodes) 11 and 61 facing the fuel electrodes 11 and 51, respectively, air is supplied from the air supply channel A through the second fluid channels 10*c*, 50*c* and 60*c*. The hydrogen ionized at the fuel electrodes 11 and 51 moves through the electrolyte layers 121 to reach the air electrodes 11 and 61, and reacts with oxygen in the air on the interfaces of the catalyst layers 31 of the air electrodes 11 and 61 to generate water. This water is discharged from the air discharge channel through the second fluid channels 10*d* and 60*d*. Further, the remaining gas (non-reacted portion) of the air after the electrode reaction also is discharged from the air discharge channel through the second fluid channel 10*d* and 60*d*.

Electrons generated by the ionization of hydrogen moves to the air electrode (oxygen diffusion electrode) 11 from the fuel electrode (fuel diffusion electrode) 11 through the separator plate 122. The movement of the electrons makes it possible to generate electric energy, by using the fuel electrode 51 as a positive electrode and using the air electrode 61 as a negative electrode.

Meanwhile, in the polymer electrolyte fuel cell, the gas diffusion electrode 11, 51 or 61 is a member serving as both the gas diffusion layer and the collector plate because it has electrical conductivity and air permeability by virtue of the three-dimensional mesh structure. Although a carbon porous body called as carbon paper or carbon cloth may be used as the conductive porous body for forming the gas diffusion electrode 11, 51 or 61, it is desirable to use a metallic porous body having a three-dimensional mesh structure, which are excellent in both gas diffusivity and electrical conductivity, for example, a metal-powder sintered sheet, a metallic non-woven fabric, a stacked mesh, or the like. Among these, the metal-powder sintered sheet of which porosity or thickness can be appropriately adjusted and available raw material metals are also various is more suitable as the conductive porous body of the gas diffusion layer member.

Furthermore, a foamed-metal sintered sheet obtained by adding a binder, a solvent and the like to a metal powder to knead them, then mixing the kneaded material with a foaming agent to obtain a foaming slurry, and then sintering the slurry after foamed molding thereof is more preferable because it can be manufactured with a high porosity.

In the present embodiment, the foamed-metal sintered sheet of which porosity or thickness can be appropriately adjusted and available raw material metals are also various can be adopted as the conductive porous material.

Hereinafter, a manufacturing method of the foamed-metal sintered sheet will be described referring to FIG. 12.

The foamed-metal sintered sheet is obtained by adding a binder, a solvent and the like to a metal powder to knead them, then mixing the kneaded material with a foaming agent to obtain a foaming slurry S, and then sintering the slurry after foamed molding thereof.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based water solvent with five to eight carbons (for example, neopentane, hexane, and heptane)) that are evaporated or sublimated by heating treatment or a defoaming agent (ethanol) can be added if needed. FIG. 12 shows a green-sheet manufacturing apparatus 80 that molds the slurry S thinly by the doctor blade method.

In the green-sheet manufacturing apparatus 80, first, the slurry S is supplied from a hopper 81 that stores the slurry S onto a carrier sheet 83. The carrier sheet 83 is conveyed by rollers 82, and the slurry S on the carrier sheet 83 is extended between the carrier sheet 83 to be moved and a doctor blade 84 so as to be formed with a required thickness.

The molded slurry S is further conveyed by the carrier sheet 83 to pass through a foaming bath 85 and a heating furnace 86 performing heat treatment sequentially. In the foaming bath 85, the slurry is subjected to heating treatment in a high humidity atmosphere. Thus, the slurry S can be foamed with a foaming agent without being cracked. Then, when the slurry S having cavities formed by the foaming is dried in the heating furnace 86, a green sheet G in which metal powder particles defining the cavities among them are joined together by an organic binder is formed.

After the green sheet G is detached from the carrier sheet 83, it is degreased and calcinated in a vacuum furnace (not shown) whereby the organic binder is removed to form a foamed-metal sintered sheet (conductive porous body) of a three-dimensional mesh structure in which the metal powder particles are sintered together.

By performing insert molding with use of a plurality of conductive porous bodies obtained by cutting the thus formed conductive porous body in a predetermined shape the separator plates 122, 152 or 162 as inserted parts, it is possible to manufacture the gas diffusion layer member 10 in which the gas diffusion electrodes 11, 51 or 61 made of the conductive porous body, the separator plates 122, 152 or 162, and the resin portions 13, 53 or 63 is integrally formed.

Hereinafter, insert molding of manufacturing the gas diffusion layer member 10 will be described referring to FIG. 6.

First, the conductive porous bodies (oxygen diffusion electrodes 11 and 11) and the separator plate 122 are integrally fixed to each other by diffusion joining to obtain an inserted part P. Then, the inserted part P is disposed in a cavity 72 defined between a pair of molds 70 and 71 shown in FIG. 44, and a melted resin 75 injected through a gate 74 from a runner 73 is then filled in the cavity 72, thereby forming a composite porous body 10 in which the gas diffusion electrodes 11 made of the conductive porous bodies, the separator plate 122 and the resin frame 13 are integrated into one body.

Figure 44:
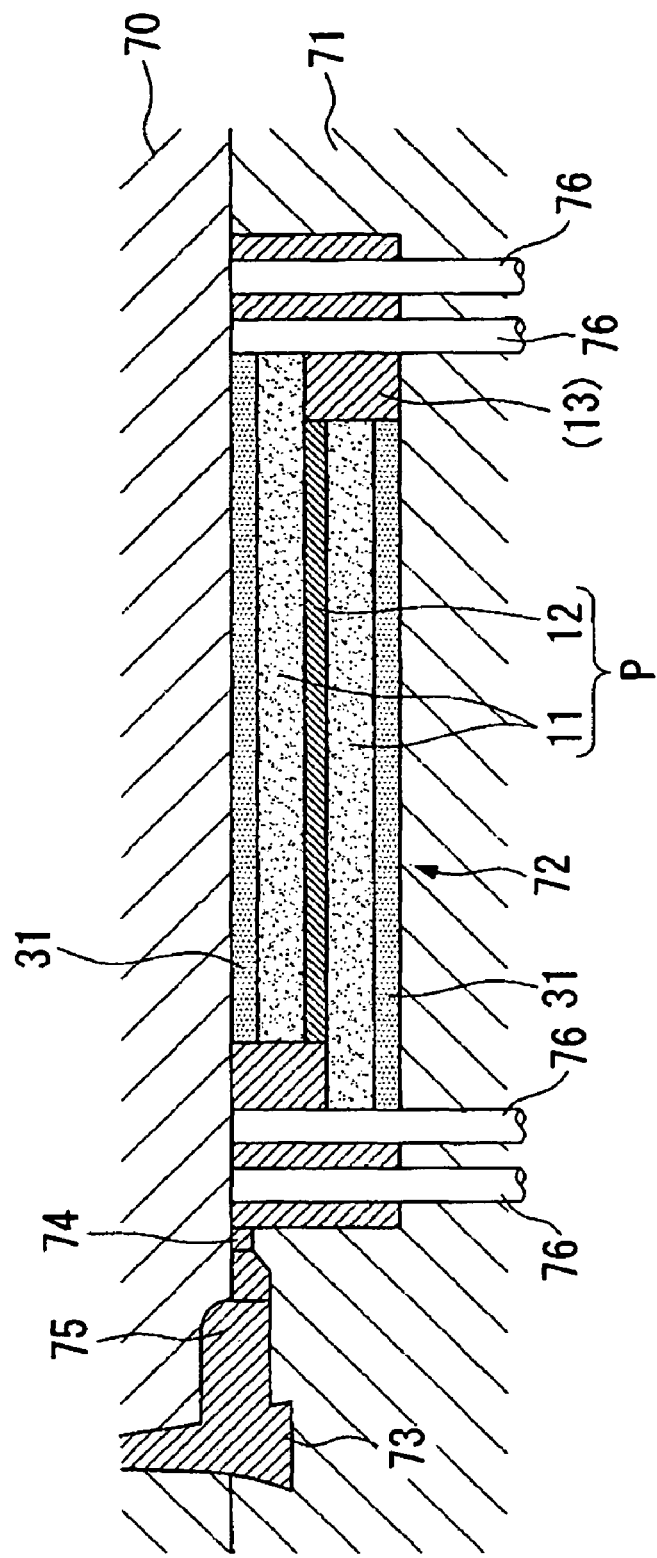
FIG. 44 is a schematic diagram showing an example of an apparatus for manufacturing a conductive porous body used for the gas diffusion layer member shown in FIG. 41 to FIG. 43.
Figure 45:
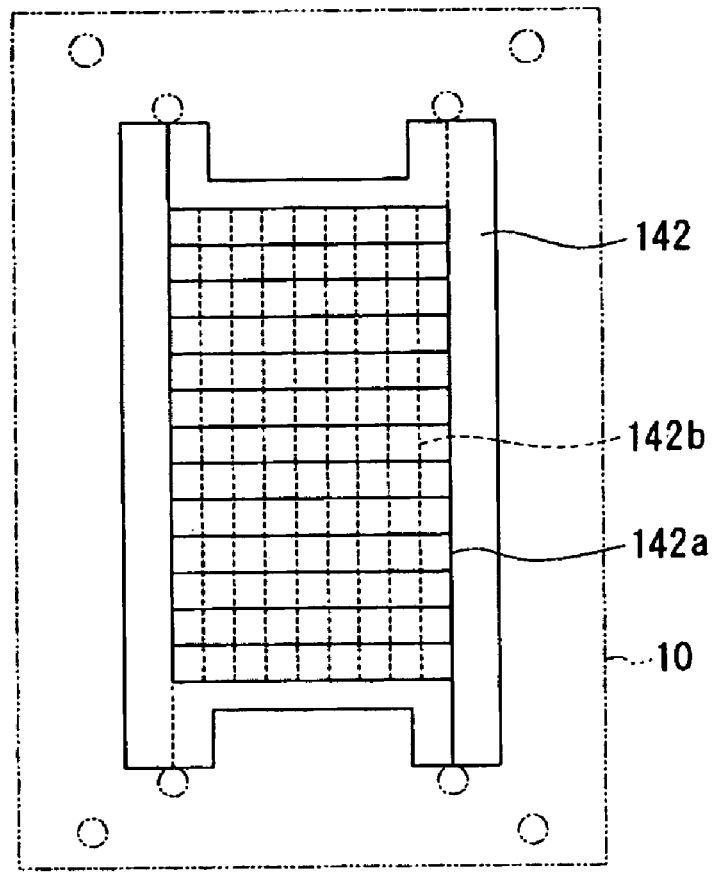
FIG. 45 is a plan view showing a separator plate used for the gas diffusion layer member according to another embodiment of Example 6.

In addition, although FIG. 44 shows that the gas diffusion electrode 11 having the catalyst layer 31 formed on the surface thereof is used, the catalyst layer 31 does not need to be necessarily formed on the electrolyte layer 121, and it may be formed on the gas diffusion electrode 11. Further, when the catalyst layer is provided on the gas diffusion electrode 11, it can also be formed after the insert molding.

Similar to the above, the gas diffusion layer member 50 or 60 can be also manufactured by insert molding.

That is, the conductive porous bodies (gas diffusion electrodes 51 and 61) and the separator plate 152 or 162 are integrally fixed to each other by diffusion joining to obtain an inserted part. Then, the inserted part is disposed in a cavity 72 defined between a pair of molds 70 and 71 shown in FIG. 44, and a melted resin 75 injected through a gate 74 from a runner 73 is then filled in the cavity 72, thereby forming a composite porous body 50 or 60 in which the gas diffusion electrodes 51 or 61 made of the conductive porous body, the separator plate 152 or 162, and the resin portion 53 or 63 are integrated into one body.

As described above, the resin portion 13, 53 or 63 is formed by insert molding, whereby the gas diffusion electrode 11, 51 or 61 and the resin portion 13, 53 or 63 are securely joined together by impregnation and curing of the melted resin into the pores opened to the side portion of the gas diffusion electrode 11, 51 or 61 to a depth of about 5 μm to 1000 μm. The channels 10a, 10b, 10c, 10d, 50a, 50b, 50c, 50d, 60a, 60b, 60c and 60d and the insertion holes 10e, 50e and 60e, all of which penetrates the resin frames, can be formed during the insert molding by pin members 76 provided in the molds.

In the insert molding, for example, when polypropylene is adopted as the material of the resin frame 13, 53 or 63, the composite porous body 10, 50 or 60 is obtained when molds are clamped together with 80 kN at a molding temperature of 180. degree. C., and injection molding is performed at a molding pressure of 250 kg/cm.sup.2.

In addition, when the gas diffusion layer member 10, 50 or 60 is formed by insert molding, the thickness of the cavity 72 (the size of the cavity in a direction that molds are opened or closed) at the time of closing of the molds is slightly smaller than that of the inserted part P, and the oxygen gas electrode 11, 51 or 61 is compressed up to 3 to 90% between the molds 70 and 71 at the time of closing of the molds. Then, the gas diffusion electrode 11, 51 or 61 is fixed to the cavity 72 so that they can be prevented from being deviated due to the injection molding pressure, and the flatness of the gas diffusion electrode 11, 51 or 61 can be improved.

Further, if the pore diameter or porosity of the gas diffusion electrode 11, 51 or 61 is too small, melted resin will not enter the pores. Thus, there is a fear that the anchoring effect becomes insufficient so that the joining strength between the oxygen diffusion electrode and the resin frame 13, 53 or 63 cannot be sufficiently obtained, which leads to peeling in a joined portion between the oxygen diffusion electrode and the resin frame. On the other hand, if the pore diameter or porosity is too large, there is a fear that the oxygen diffusion electrode may be deformed because it cannot endure the molding pressure of the resin or compression during curing of the resin due to its insufficient strength. Accordingly, the oxygen diffusion electrode has more preferably a pore diameter of about 10. mu.m to 2 mm, and a porosity of about 40 to 98%.

Meanwhile, since the material of the resin frame 13, 53 or 63 is not particularly limited as long as it is a material, such as thermoplastic resin or elastomer, which can be injection-molded, it can be appropriately selected according to use in consideration of allowable temperature limit, hardness, and the like.

In addition, the shapes or combinations of these members shown in the above-described embodiments are just exemplary. Therefore, various modifications may be made thereto based on design requirements without departing from the sprit and scope of the invention. Although the above embodiment has been described about the fuel cell including four sets of unit cells, the invention is not limited thereto, and if gas diffusion layer members 10 and electrolyte layers 121 are stacked as needed, a high-output fuel cell can be obtained.

Further, the above embodiment has been described about the configuration in which fluid such as fuel or air is discharged from the channels through only the pores of the gas diffusion electrode 11, 51 and 61. However, if the porosity of the gas diffusion electrode 11, 51 and 61 is lowered or the number of communicating pores is reduced, the fluid channels become narrow and become long in the in-plane direction. Therefore, there is a fear that supply of the fluid may become difficult. In this case, as shown in FIG. 7, if it is configured such that grooves as third fluid channels 142a and 142b are formed in both surfaces of the separator plate 142 and fluid is allowed to flow through the third channels 142a and 142b, the fluid channels in the gas diffusion electrode 11 becomes shorter than those in the thickness direction. Thus, even if supply pressure is not increased, fluid can be smoothly supplied. Further, a pump, which increases the supply pressure of fuel, may not be provided.

Further, in the above embodiment, a plurality of unit cells 131 are formed using gas diffusion layer members 10 in which gas diffusion electrodes are provided on both surfaces of a separator. However, it is possible to use unit cells in which the gas diffusion layer member 50 or 60 having a gas diffusion electrode provided only on one surface thereof is adhered to the back of a separator.

Example 7

Figure 46:
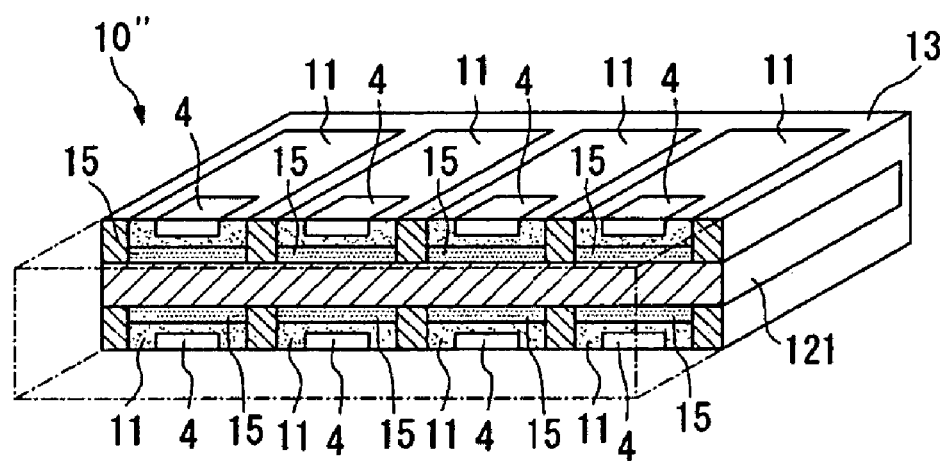
FIG. 46 is a perspective view showing a first embodiment of a cell member according to Example 7 of the invention.

FIG. 46 shows a polymer electrolyte fuel cell (flat cell member) 10" according to Example 7 of the invention. This flat cell member 10" includes one electrolyte layer 121, four pairs of (eight) sheet-like conductive porous bodies 11 which are arranged to sandwich the electrolyte layer 121 therebetween, a resin frame 13 which encloses each periphery of the conductive porous bodies 11, abuts on the periphery, and extends in porous bodies 11 and extending in the in-plane direction, and terminal tabs (terminals) 4 connected to the conductive porous bodies 11 and exposed to the outer face of the resin frame 13.

In the flat cell member 10", when fuel (here, a methanol aqueous solution) is supplied to the conductive porous bodies 11 as fuel electrodes disposed on one side of the electrolyte layer 121, hydrogen in the fuel is ionized by catalyst reaction to move through the electrolyte layer 121, and then reaches the conductive porous bodies 11 as air electrodes disposed on the other side of the electrolyte layer 121 to react with oxygen in air by a catalyst reaction to generate water. Meanwhile, electrons generated by the ionization of hydrogen moves through a circuit provided outside to the air electrodes (conductive porous bodies 11) via the terminals 4 from the fuel electrodes (conductive porous bodies 11). The movement of the electrons makes it possible to generate electric energy.

The electrolyte layer 121 that conducts hydrogen ions is formed of, for example, a fluorocarbon-resin-based polymeric electrolytic membrane. The conductive porous bodies 11 are arranged as electrodes that serve as both a gas electrode layer and a collector plate touching the electrolyte layer 121.

In the polymer electrolyte fuel cell, each conductive porous body 11 is a sheet-like member that serves as both a gas diffusion layer and a collector plate because it has electrical conductivity and air permeability by virtue of the three-dimensional mesh structure. Specifically, the conductive porous body is obtained, for example, by forming a metal-powder sintered sheet, a foamed-metal sintered sheet, a metallic non-woven fabric, a stacked mesh, or the like in a required shape.

The surface of each conductive porous body 11 facing the electrolyte layer 121 is provided with a catalyst layer 15. The catalyst layer 15 (collector) is formed by coating the surface of each conductive porous body 11 with a polymeric electrolyte solution containing carbon particles having palladium-based catalyst particles carried therein.

In addition, the catalyst layer 15 only needs to be interposed between the electrolyte layer 121 and the conductive porous bodies 11. In the present embodiment, the catalyst layer 15 is provided on the surface of each of the conductive porous bodies 11, but it can be formed on a surface of the electrolyte layer 121.

Further, the tab-shaped terminals 4 are provided for connection to the conductive porous bodies 11. The terminals 4 are connecting terminals for electrically connecting the conductive porous bodies 11 and terminals that serves as a positive terminal or a negative terminal of a fuel cell at their both ends connected in series. In the present embodiment, the terminals are formed of a metallic thin plate, and fixed to the conductive porous bodies 11 by spot welding, resistance welding, ultrasonic joining or the like.

In addition, in the flat cell member 10″, since electrons generated by a reaction on the catalyst layer 15 flow through the conductive porous bodies 11 and the terminals 4, the conductive porous bodies 11 and the terminals 4 is formed of a material having excellent electrical conductivity. In addition, when corrosion is problematic, a corrosion-resistant material such as stainless steel is preferably used for these members (conductive porous bodies 11 and terminals 4).

The electrolyte layer 121, the conductive porous bodies 11, the terminals 4 are integrally molded by the resin frame 13. The resin frame 13 buries portions between the conductive porous bodies 11 arranged at predetermined intervals, and extends in the in-plane direction of the conductive porous bodies 11.

The resin frame 13 has functions of integrally fixing the electrolyte layer 121 and the conductive porous bodies 11, electrically insulating the conductive porous bodies 11 from each other, and sealing side faces of the conductive porous bodies 11 to prevent leakage of air or fuel (methanol) to be supplied to the conductive porous bodies 11. Accordingly, since the material of the resin frame 13 is simply required to be a material, such as thermoplastic resin or elastomer (including rubber), which can be injection-molded, and to have no air permeability and electrical conductivity, it can be appropriately selected in consideration of allowable temperature limit, hardness, and the like. For example, when soft resin is used, the sealing performance can be improved.

In addition, since the terminals 4 exposed to the outer face (the side face in the present embodiment) of the resin frame 13 should not permit leakage of the fuel or air passing through the conductive porous bodies 11, they are formed of a material (metal in the present invention) having no air permeability.

The resin frame 13 may be provided with screw holes for fixing these members together or fixing positions. Also, in order to further improve the sealing performance against the peripheries, the resin frame may be provided with grooves for O-rings, or convex portions made of soft resin.

Figure 47:
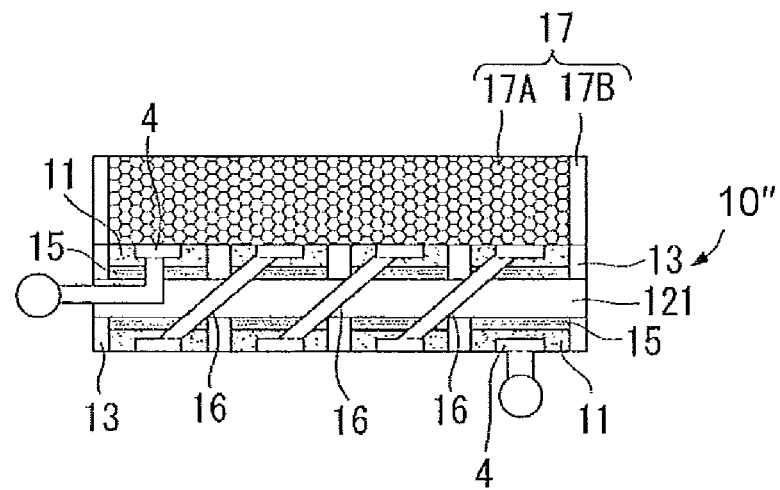
FIG. 47 is a perspective view showing a fuel cell using the cell member shown in FIG. 46.

As shown in FIG. 47, the flat cell member (cell member for a polymer electrolyte fuel cell) 10″ configured as described above can constitute a polymer electrolyte fuel cell by using the conductive porous bodies 11 on one side of the electrolyte layer 121 as fuel electrodes and the conductive porous bodies 11 on the other side thereof as air electrodes, and by being provided with wiring lines 16 sequentially connecting the fuel electrodes and the air electrodes in series and a fuel supply part 17 in which a porous part 17A made of felt or the like for supplying fuel to the fuel electrodes is coated with a resin frame 17B.

Figure 48:
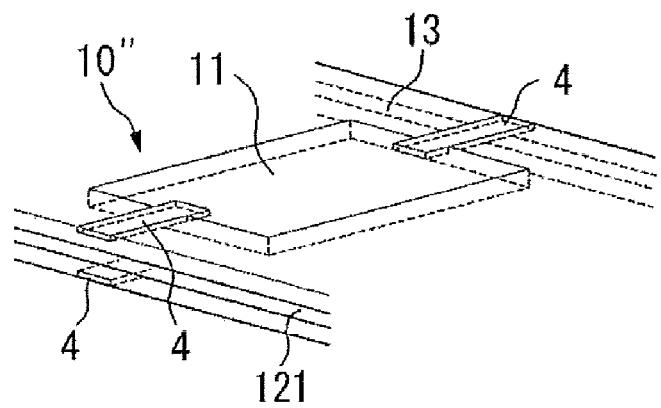
FIG. 48 is a perspective view showing an example of the shape of a terminal.
Figure 49:
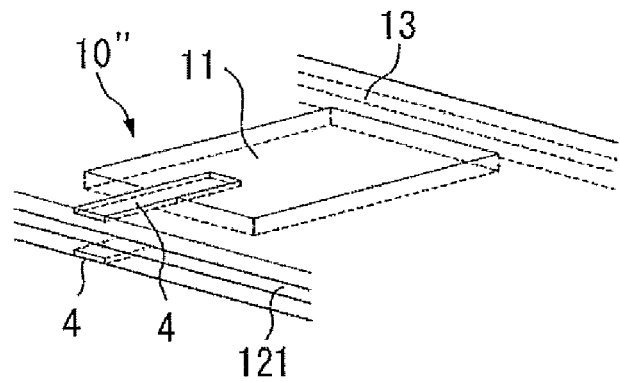
FIG. 49 is a perspective view showing an example of the shape of a terminal.
Figure 50:
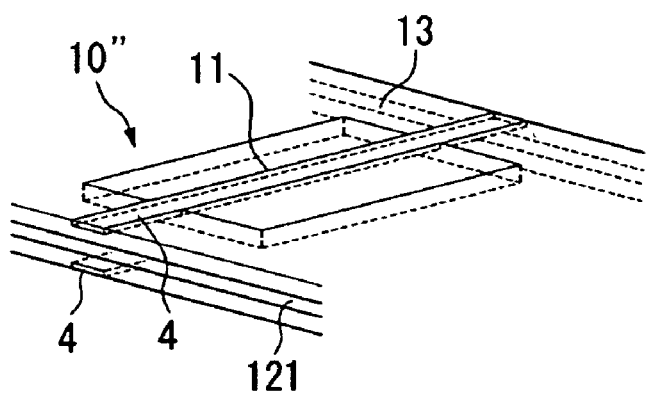
FIG. 50 is a perspective view showing an example of the shape of a terminal.

In addition, for example, when the electrical conductivity of the conductive porous bodies 11 is low, in order to improve collecting efficiency, various configurations can be adopted in such a manner that a terminal 4 is caused to protrude from each of both ends of a conductive porous body 11 as shown in FIG. 48, a terminal 4 having a larger contact surface with the conductive porous body 11 is provided as shown in FIG. 49, or the shape of a terminal 4 is formed so as to extend in the longitudinal direction of a conductive porous body 11 and protrude from both ends thereof as shown in FIG. 50, or the like.

Figure 51:
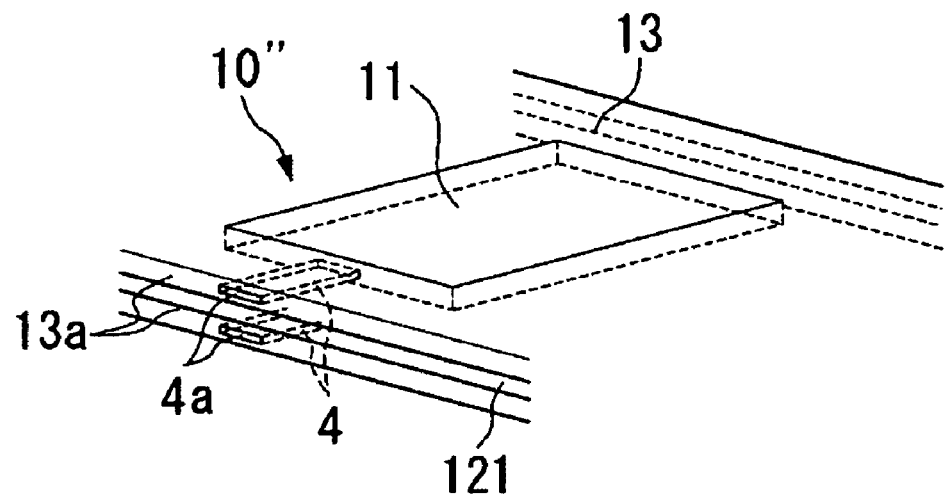
FIG. 51 is a perspective view showing an example of the shape of a terminal.
Figure 52:
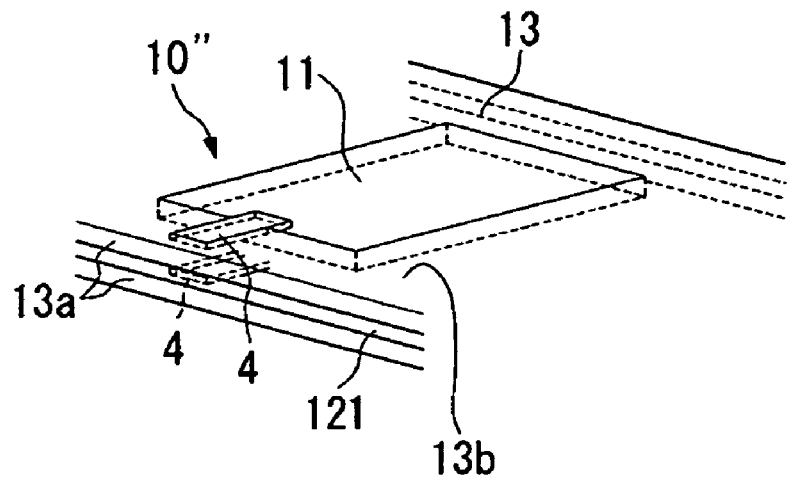
FIG. 52 is a perspective view showing an example of the shape of a terminal.
Figure 53:
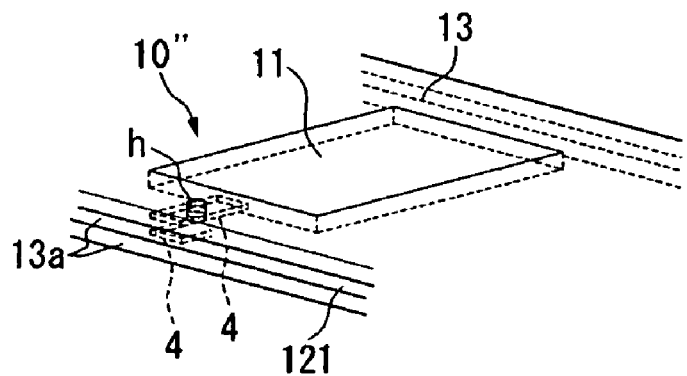
FIG. 53 is a perspective view showing an example of the shape of a terminal.

Further, a terminal 4 may be exposed at any one of surfaces of a resin frame 13. For example, only an end 4a of a terminal 4 may be exposed while the whole terminal is buried in the resin frame 13 (FIG. 51), or a terminal may be exposed at only a top face 13b of the resin frame 13 without being exposed at a side face 13a (FIG. 52). Moreover, as shown in FIG. 53, it is possible to adopt a configuration in which a whole terminal 4 is buried in the resin frame 13, the terminal 4 is provided with a through hole h penetrating the resin frame 13, and the terminal 4 is exposed to the inner peripheral surface of the through hole h.

Figure 54:
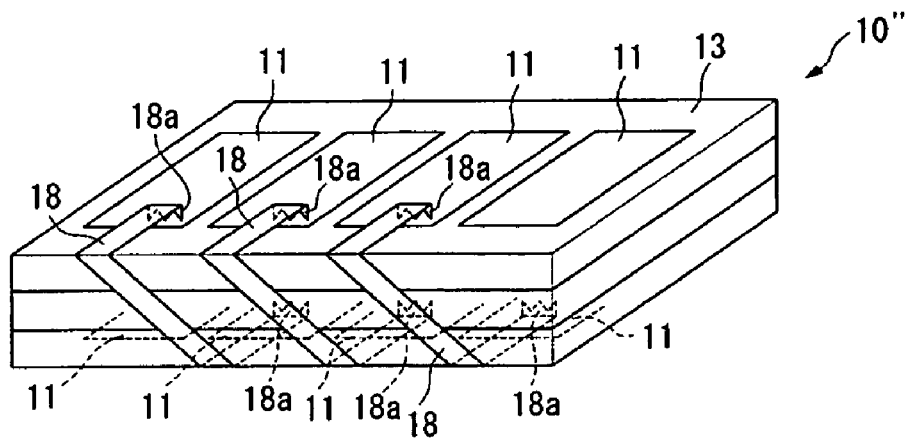
FIG. 54 is a perspective view showing another embodiment of the cell member according to Example 7 of the invention.
Figure 55:
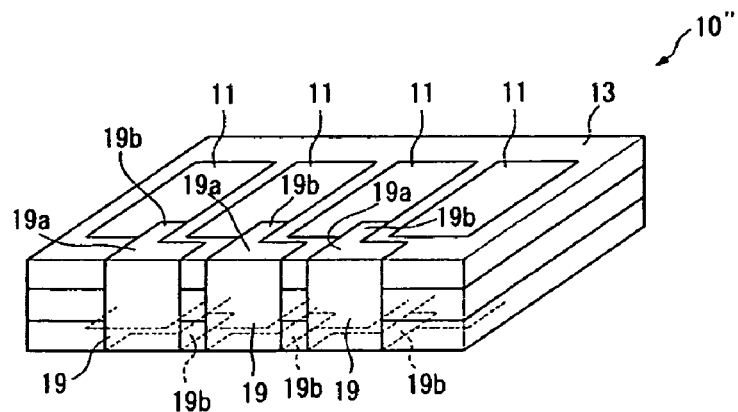
FIG. 55 is a perspective view showing still another embodiment of the cell member according to Example 7 of the invention.

Further, as shown in FIGS. 54 and 55, if wiring lines are directly connected to the conductive porous bodies 11, the conductive porous bodies 11 has a function as terminals. Thus, terminals 4 of separates members do not need to be provided. In this case, connecting members, such as U-shaped conductive connecting members 18 (FIG. 54) which have protrusions 18a biting into the conductive porous bodies 11 and connect the conductive porous bodies 11 located opposite to an adjacent cell to each other in a cross-shape, or conductive clips 19 (FIG. 55) each having a pinching portion 19a which pinches a portion of a resin frame 13 in the vicinity of two pairs of the adjacent conductive porous bodies 11 and a connecting portion 19b which extends toward each conductive porous body 11 from the pinching portion 19a, can be used to connected the conductive porous bodies 11 to each other.

Hereinafter, a manufacturing method of the flat cell member 10″ according to Example 7 of the invention will be described.

The manufacturing method is a method of insert-molding the electrolyte layer 121, the conductive porous bodies 11 and the terminals 4 as inserted parts.

Figure 56:
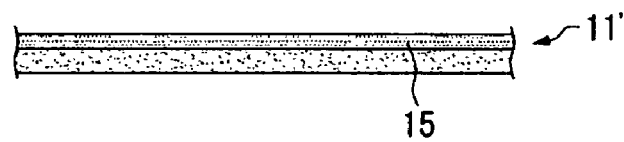
FIG. 56 is a cross-sectional view showing a process of coating a catalyst layer on a conductive porous body in manufacturing a cell member.

First, as shown in FIG. 56, a catalyst layer 15 is formed on the surface of a conductive porous sheet 11'. The catalyst layer 15 is formed, for example, by mixing carbon powder having palladium carried therein with a polymeric electrolytic solution forming the electrolyte layer 121, and then coating the mixture on the surface of the conductive porous sheet 11'. A catalyst coated on the conductive porous sheet 11' is attached to the surfaces of open pores to form the catalyst layer 15 having a large surface area.

Figure 57:
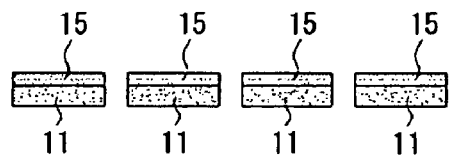
FIG. 57 is a cross-sectional view showing a state where the conductive porous body is cut into a predetermined size of pieces.
Figure 58:
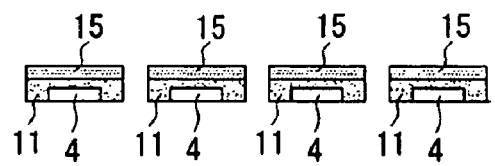
FIG. 58 is a cross-sectional view showing a state where terminals are attached to a plurality of conductive porous bodies.

Next, as shown in FIG. 57, the conductive porous sheet 11' having the catalyst layer 15 formed thereon is cut into a predetermined size of conductive porous bodies 11. Then, as shown in FIG. 58, terminals 4 made of sheet metal are spot-welded to the cut conductive porous bodies 11, respectively.

Figure 59:
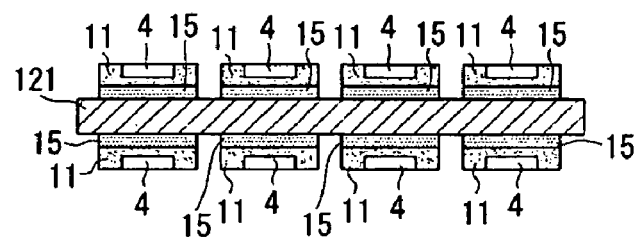
FIG. 59 is a cross-sectional view showing a state where an electrolyte layer is disposed between the conductive porous bodies.

Then, as shown in FIG. 59, four pairs of (eight) conductive porous bodies 11 having each terminal 4 fixed thereto are arranged such that the catalyst layers 15 are caused to face each other with the electrolyte layer 121 interposed therebetween. Then, insert molding is performed using the resulting product as an inserted part.

If the conductive porous bodies 11 and the electrolyte layer 121 are fixed to each other by hot pressing prior to the insert molding, loading of the inserted part into molds for insert molding is facilitated. At this time, since hot pressing is performed to push the electrolyte layer 121 into the pores opened to the surfaces of the catalyst layers 15 to bring the catalyst layers 15 into contact with the electrolyte layer 121 with a large contact area, the electrical resistance between the catalyst layers 15 and the electrolyte layer 121 can be reduced. Further, the molds for inset molding can be heated to the 100 to 120° C. to simultaneously perform hot press joining between the conductive porous bodies 11 and the electrolyte layer 121 and injection molding of resin.

Figure 60:
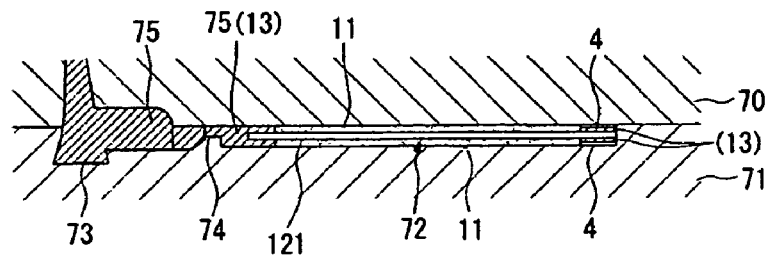
FIG. 60 is a schematic diagram showing injection molds for manufacturing a cell member.

As shown in FIG. 60, the molds which performs inset molding is configured to perform insert molding by sandwiching the inserted parts (the electrolyte layer 121, the conductive porous bodies 11 and the terminals 4) in a cavity 72 defined between a pair of molds 70 and 71, and by fixing the conductive porous bodies 11 and the electrolyte layer 121 so as to not to move in the cavity due to pressure of resin to be injected.

In this molds for insert molding, a melted resin 75 injected through a gate 74 from a runner 73 is filled into the cavity 72 after the inserts parts are loaded and the molds are closed, whereby a resin frame 13 is integrally formed around the conductive porous bodies 11.

Accordingly, since the melted resin is filled with almost the same thickness as the conductive porous bodies 11, most of one surface of each of the conductive porous bodies 11 is exposed to the surface of the flat cell member 10".

In addition, if the thickness of the cavity 72 at the time of closing of the molds is slightly smaller than that of three layers including the conductive porous bodies 11 and the electrolyte layer 121 so that the conductive porous bodies 11 are compressed up to 3 to 90% between the molds 70 and 71 at the time of closing of the molds, the inserted parts can be more surely fixed with respect to the cavity, and the flatness of the conductive porous bodies 11 can be improved.

At this time, since the surfaces of the molds touch the surfaces of the conductive porous bodies 11, the resin portion 13 is formed such that the whole surface of each of the conductive porous bodies 11 is not coated with the resin, but the surface 13b of each of the conductive porous bodies 11 is exposed.

Further, the melted resin enters the pores opened to the side portion of each of the conductive porous bodies 11 to a depth of about 5 μm to 1000 μm and is cured whereby the conductive porous bodies 11 and the resin frame 13 are securely joined together (anchoring effect) and the entire side portion of the conductive porous bodies 11 is covered by the resin frame 13.

In that case, the end of the terminal 4 is not required to coincide with the outer face (side face 13a and the surface 13b) of the resin frame 13, but the terminal 4 may protrude from the resin frame 3. Further, when the end of the terminal 4 is not exposed to the outer face of the resin frame 13 because melted resin goes around to the end of the terminal 4, the end may be exposed, for example, by grinding the resin frame 13.

In addition, since the melted resin will not enter the pores if the pore diameter or porosity of the conductive porous bodies 11 is too small, there is a fear that a gas-sealing effect and an anchoring effect become insufficient. In contrast, if the pore diameter or porosity is too large, there is a fear that the conductive porous body may be deformed because it cannot endure the molding pressure of the resin or compression during curing of the resin due to its insufficient strength. Accordingly, the conductive porous bodies 11 have more preferably a pore diameter of about 10 μm to 2 mm, and a porosity of about 40 to 98%.

Further, the cell member 10" according to Example 7 of the invention can also be manufactured by the following manufacturing method. The manufacturing method described herein is a method of forming a so-called membrane-electrode composite body (MEA) from an electrolyte layer 121 and a pair of conductive porous bodies 11, arranging a plurality of the membrane-electrode composite bodies (MEAs) in the in-plane direction, and performing insert molding using the MEAs as inserted parts.

Figure 61:
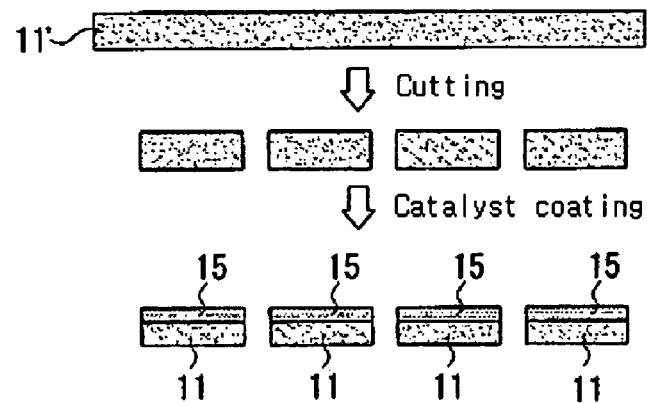
FIG. 61 is a cross-sectional view showing a manufacturing process of a cell member, wherein the cutting of a conductive porous sheet and the coating a catalyst layer on the cut conductive porous bodies in manufacturing a cell member is shown.

That is, as shown in FIG. 61, a conductive porous sheet 11' is cut into a predetermined size of pieces, and the surfaces of the cut pieces are then coated with catalyst, thereby forming conductive porous bodies 11 each having a catalyst layer 15 thereon. The catalyst layers 15 are formed, for example, by mixing carbon powder having palladium carried therein with a polymeric electrolytic solution forming an electrolyte layer 121, and then coating the mixture on the surfaces of the conductive porous bodies. The catalyst coated on the conductive porous bodies is attached to the surfaces of open pores to form the catalyst layers 15 having a large surface area.

Figure 62:
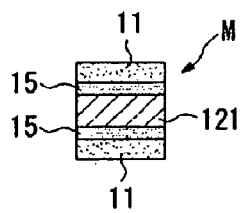
FIG. 62 is a cross-sectional view showing a state where a membrane-electrode composite body is formed by conductive porous bodies and an electrolyte layer.

Next, as shown in FIG. 62, a pair of conductive porous bodies 11 having the catalyst layer 15 is arranged such that the catalyst layers 15 are caused to face each other with the electrolyte layer 121 interposed therebetween. Then, these are joined together by hot pressing to form a membrane-electrode composite body M.

Figure 63:
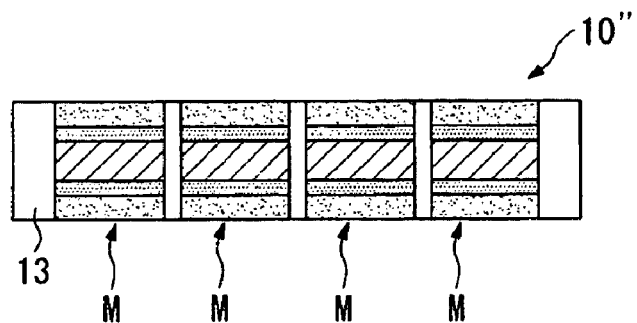
FIG. 63 is a side view showing another embodiment of the cell member according to Example 7 of the invention.

Then, insert molding is performed using four pairs of membrane-electrode composite bodies M as inserted parts to manufacture a flat cell member 10" having four pairs of cells (membrane-electrode composite bodies M) as shown in FIG. 63. The insert molding has already been described with reference to FIG. 60.

Further, in the flat cell member 10", the conductive porous bodies 11 can be connected to each other using the connecting members 18 shown in FIG. 54, the clips 19 shown in FIG. 55, or the like.

Hereinafter, a manufacturing method of a foamed-metal sintered sheet suitable for the conductive porous body 11 will be described. For example, the foamed-metal sintered sheet can be manufactured by calcinating the resulting green sheet G that is obtained molding slurry S containing a metal powder thinly, drying it.

The slurry S is obtained by mixing a metal powder, for example, SUS316L powder, etc., an organic binder (for example, methyl cellulose or hydroxypropylmethyl cellulose), and a solvent (water) together. In addition to these, a foaming agent (for example, nonaqueous hydrocarbon-based organic solvent with five to eight carbons (for example, neopentane, hexane, and heptane)) that are evaporated or sublimated by heating treatment or a defoaming agent (ethanol) can be added if needed. FIG. 12 shows a green-sheet manufacturing apparatus 80 that molds the slurry S thinly by the doctor blade method.

In the green-sheet manufacturing apparatus 80, first, the slurry S is supplied from a hopper 81 that stores the slurry S onto a carrier sheet 82. The carrier sheet 82 is conveyed by rollers 83, and the slurry S on the carrier sheet 82 is extended between the carrier sheet 82 to be moved and a doctor blade 84 so as to be formed with a required thickness.

The molded slurry S is further conveyed by the carrier sheet 82 to pass through a foaming bath 85 and a heating furnace 86 performing heat treatment sequentially. In the foaming bath 85, the slurry is subjected to heating treatment in a high humidity atmosphere. Thus, the slurry S can be foamed with a foaming agent without being cracked. Then, when the slurry S having cavities formed by the foaming is dried in the heating furnace 86, a green sheet G in which metal powder particles defining the cavities among them are joined together by an organic binder is formed.

After the green sheet G is detached from the carrier sheet 82, it is degreased and calcinated in a vacuum furnace (not shown) whereby the organic binder is removed to form a foamed-metal sintered sheet (conductive porous body 11) in which the metal powder particles are sintered together.

In addition, there are, for examples, the following ones as configurations of the polymer electrolyte fuel cell using the cell member of the invention.

As shown in FIGS. 64 and 65, if a fuel supply part 30 having a porous part 31 to hold and supply fuel and a resin frame 32 to cover the porous part is disposed in the in-plane direction of a flat cell member 110 having fuel electrodes A and air electrodes B, the whole thickness of the fuel cell can be suppressed.

In this case, since conductive porous bodies 112 of the fuel electrodes A do not come into direct contact with the porous part 31 of the fuel supply part 30, as shown in FIG. 65 (cross-sectional view taken along a line a-a shown in FIG. 64), communicating holes 113a are provided so as to penetrate the resin frame 113 in its in-plane direction. Through the communicating holes 113a, the porous part 31 are caused to communicate with the conductive porous bodies 112 of the fuel electrodes A, whereby fuel can be supplied and a carbon dioxide gas as a by-product during power generation can be discharged.

Moreover, as shown in FIG. 65, since a plate-shaped member 115 covering the surfaces of the conductive porous bodies 112 on the side of the fuel electrodes A can be attached so as to seal the space between itself and the resin portion 32 of the fuel supply part 30 to prevent fuel from leaking from the conductive porous bodies 112 of the fuel electrodes A, for example, it is possible to realize a structure in which the plate-shaped member 115 is disposed on the back surface of a liquid crystal display device, thereby realizing application of the flat cell member to a thin notebook computer.

Further, as a structure which communicates the porous part 31 with the conductive porous bodies 112 on the side of the fuel electrodes A, as shown in FIG. 66, grooves 113b may be provided in the surface of the resin frame 113 so as to extend in the in-plane direction thereof. In this case, if grooves 115a extending in the in-plane direction thereof are also formed in the surface of the plate-shaped member 115 so that the grooves 115a can be communicated with the grooves 113b of the resin frame 113 and the surfaces of the conductive porous bodies 112 on the side of the fuel electrodes A, fuel can be more efficiently supplied to the surfaces of the conductive porous bodies 112 on the side of the fuel electrodes A, and carbon dioxides can be exhausted therefrom.

In addition, as shown FIGS. 67 and 68, when a member, such as a plat-shaped member 116, is also disposed at the air electrodes B of the cell member 110 so as to cover the surface of conductive porous bodies 112, in order to supply the conductive porous bodies 112 with air, it is advantageous to adopt a structure in which grooves 116a leading to the conductive porous bodies 112 are formed in the surface of the plat-shaped member 116 (FIG. 67), or grooves 213a are formed in the surface of a resin frame 113 of the cell member 110 (FIG. 68).

According to the invention, there is provided a composite porous body and its manufacturing method in which the effective use area of the composite porous body is ensured and its handleability is improved.

Further, it is possible to easily realize a so-called flat cell member that a structure in which a plurality of conductive porous bodies arranged on a plane are integrally held by a resin frame is easily embodied in a gas diffusion layer member of the invention.

Furthermore, there is provided a gas diffusion layer member of a polymer electrolyte fuel cell and its manufacturing method in which the number of assembling processes of a fuel cell having a conductive porous body can be reduced, and the assembling precision can be improved.

In addition, it is possible to realize a simple-structured, small-sized, lightweight, high-productive, and high-performance fuel cell with reduced number of parts, improved handleability, and low probability of leakage of fuel by virtue of realization of a high-strength gas diffusion layer member.

What is claimed is:

1. A composite porous body structure comprising:
   a plurality of plane conductive porous bodies having three-dimensional mesh structures; and
   a resin frame portion extending in an in-plane direction around the conductive porous bodies, the conductive porous bodies and the resin portion being integrally formed.

2. The composite porous body structure according to claim 1, wherein inorganic filler is contained in the resin portion.

3. The composite porous body structure according to claim 2, wherein the inorganic filler is fibrous, and the inorganic filler is contained in a ratio of about 5 wt % to 60 wt % of the resin portion in the resin portion.

4. A gas diffusion layer member of a polymer electrolyte fuel cell comprising the composite porous body structure according to claim 1.

5. The gas diffusion layer member of a polymer electrolyte fuel cell according to claim 4,
   wherein the resin portion is a resin frame which surrounds the periphery of the conductive porous bodies.

6. The gas diffusion layer member of a polymer electrolyte fuel cell according to claim 5,
   wherein a terminal tab is provided so as to protrude from the conductive porous bodies, and the terminal tab is exposed to an outer face of the resin frame.

7. The gas diffusion layer member of a polymer electrolyte fuel cell according to claim 5,
   wherein the resin frame is provided with a first fluid supply channel and a first fluid discharge channel which are connected to a gas diffusion electrode using one surface of the conductive porous bodies as an electrode surface, and a second fluid supply channel and a second fluid discharge channel which are not connected to the gas diffusion electrode.

8. The gas diffusion layer member of a polymer electrolyte fuel cell according to claim 7,
wherein the first fluid supply channel, the first fluid discharge channel, the second fluid supply channel, and the second fluid discharge channel are provided as four through holes penetrating the resin frame.

9. The gas diffusion layer member of a polymer electrolyte fuel cell according to claim 8,
wherein any two of the through holes are provided at positions line-symmetrical with respect to the other two.

10. The gas diffusion layer member of a polymer electrolyte fuel cell according to claim 4, further comprising:
an oxygen diffusion electrode using one surface of the conductive porous bodies as an oxygen supply surface and the other surface thereof as an electrode surface;
a resin portion made of a nonconductive material and provided in at least two of side portions of the oxygen diffusion electrode; and
a lattice-shaped frame portion provided on the oxygen diffusion surface, connected to the resin portion and having openings which open the oxygen supply surface to the outside.

11. The gas diffusion layer member of a polymer electrolyte fuel cell according to claim 10,
wherein a plurality of the split oxygen diffusion electrodes are provided, and a connecting frame made of a nonconductive material is provided to connect the oxygen diffusion electrodes to each other.

12. The gas diffusion layer member of a polymer electrolyte fuel cell according to claim 10,
wherein the lattice-shaped frame portion is made of a nonconductive material.

13. The gas diffusion layer member of a polymer electrolyte fuel cell according to claim 10,
wherein the lattice-shaped frame portion is made of a conductive material, and a plurality of the split lattice-shaped frame portions are provided corresponding to the plurality of oxygen diffusion electrodes.

14. The gas diffusion layer member of a polymer electrolyte fuel cell according to claim 4,
wherein a collector having a two-dimensional structure extending in the in-plane direction is disposed on the surface of the conductive porous bodies.

15. The gas diffusion layer member of a polymer electrolyte fuel cell according to claim 14,
wherein at least a portion of the collector bites into the surface of the conductive porous bodies.

16. A polymer electrolyte fuel cell comprising at least one unit cell formed by disposing the gas diffusion layer member according to claim 7 on each of front and back surfaces of an electrolyte layer made of a polymer electrolyte,
wherein the unit cell is provided with a fuel supply channel which communicates the first fluid supply channel provided in one of the gas diffusion layer members with the second fluid supply channel provided in the other gas diffusion layer member;
an oxygen supply channel which communicates the second fluid supply channel provided in the one gas diffusion layer member with the first fluid supply channel provided in the other gas diffusion layer member,
a fuel discharge channel which communicates the first fluid discharge channel provided in the one gas diffusion layer member with the second fluid discharge channel provided in the other gas diffusion layer member; and
an oxygen discharge channel which communicates the second fluid discharge channel provided in the one gas diffusion layer member with the first fluid discharge channel provided in the other gas diffusion layer member.

17. A gas diffusion layer member of a polymer electrolyte fuel cell comprising:
a separator plate; and
a conductive porous body placed on at least one surface of the separator plate, wherein a resin frame is integrally provided so as to cover the peripheries of the separator plate and the conductive porous body.

18. The gas diffusion layer member of a polymer electrolyte fuel cell according to claim 17,
wherein the resin frame is provided with a first fluid channel for allowing a first fluid to pass therethrough, and a second fluid channel for allowing a second fluid to pass therethrough.

19. A polymer electrolyte fuel cell comprising:
a plurality of the gas diffusion layer members according to claim 17, which are overlapped with each other in their thickness direction,
an electrolyte layer made of a polymer electrolyte and disposed between the gas diffusion layer members, and
a catalyst layer provided on an interface between the electrolyte layer and the oxygen diffusion electrode of each of the gas diffusion layer members.

20. A cell member of a polymer electrolyte fuel cell comprising:
an electrolyte layer made of a polymer electrolyte;
a plurality of conductive porous bodies which pinch the electrolyte layer, with a catalyst layer interposed between each conductive porous body and the electrolyte layer; and
a resin frame extending in an in-plane direction so as to surround the peripheries of the conductive porous bodies.

21. The gas diffusion layer member of a polymer electrolyte fuel cell according to claim 20,
wherein the resin frame is provided so as to surround the peripheries of the conductive porous bodies and the electrolyte layer.

22. A composite porous body manufacturing method of manufacturing the composite porous body structure according to claim 1, by using the conductive porous body as an inserted part to perform insert-molding that injects resin so as to be connected to an edge of the conductive porous body.

23. A manufacturing method of a gas diffusion layer member of a polymer electrolyte fuel cell of manufacturing the gas diffusion layer member according to claim 4, by using the conductive porous bodies as an inserted part to perform insert-molding that injects resin so as to be connected to an edge of the conductive porous bodies.

24. A manufacturing method of a gas diffusion layer member of a polymer electrolyte fuel cell of manufacturing the gas diffusion layer member according to claim 10, by using the conductive porous bodies as an inserted part to inject resin onto an edge of the conductive porous bodies and the oxygen supply surface, thereby integrally forming a resin portion and a lattice-shaped frame portion.

25. A manufacturing method of a gas diffusion layer ember of a polymer electrolyte fuel cell according to claim 14, the method comprising:
a mold clamping step of using, as an inserted part, a stacked body in which the collector is disposed on the surface of the conductive porous bodies, compressing and fixing the inserted part disposed on molds in a thickness direction of the stacked body by surfaces of the molds, and forming a cavity by the mold surfaces; and after the mold clamping step, injecting a melted resin into the cavity to integrally form a resin portion extending in an in-plane direction with an outer peripheral edge of the stacked body over its entire periphery.

26. A manufacturing method of a cell member for a polymer electrolyte fuel cell of manufacturing the cell member according to claim 20, by using, as inserted parts, the electrolyte layer, and the a plurality of conductive porous bodies which pinch the electrolyte layer, with the catalyst layer interposed between the conductive porous bodies and the electrolyte layer, to perform insert-molding that injects resin so as to be connected to edges of the conductive porous bodies to mold the resin frame.

27. The manufacturing method of a cell member for a polymer electrolyte fuel cell according to claim 26, wherein the electrolyte layer and the conductive porous bodies are joined together by hot pressing during insert molding, with the catalyst layer interposed therebetween.

28. A manufacturing method of a gas diffusion layer member of a polymer electrolyte fuel cell of manufacturing the gas diffusion layer member according to claim 17, by using, as an inserted part, a stacked body in which the separator plate is disposed on the surface of the conductive porous bodies to perform insert-molding that injects resin so as to be connected to an edge of the conductive porous bodies.

* * * * *